(12) United States Patent
Kuroki et al.

(10) Patent No.: US 9,528,735 B2
(45) Date of Patent: Dec. 27, 2016

(54) METHOD FOR FILLING MIXED REFRIGERANT CONTAINING 2,3,3,3-TETRAFLUOROPROPENE

(71) Applicant: DAIKIN INDUSTRIES, LTD., Osaka (JP)

(72) Inventors: Hitomi Kuroki, Osaka (JP); Tatsumi Tsuchiya, Osaka (JP); Yasufu Yamada, Osaka (JP); Takashi Shibanuma, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/425,485

(22) PCT Filed: Sep. 4, 2013

(86) PCT No.: PCT/JP2013/073851
§ 371 (c)(1),
(2) Date: Apr. 14, 2015

(87) PCT Pub. No.: WO2014/038604
PCT Pub. Date: Mar. 13, 2014

(65) Prior Publication Data
US 2015/0211773 A1    Jul. 30, 2015

Related U.S. Application Data

(60) Provisional application No. 61/696,419, filed on Sep. 4, 2012.

(51) Int. Cl.
F25B 45/00 (2006.01)
C09K 5/04 (2006.01)
F25B 1/00 (2006.01)

(52) U.S. Cl.
CPC ............... *F25B 45/00* (2013.01); *C09K 5/04* (2013.01); *C09K 5/045* (2013.01); *F25B 1/00* (2013.01); *C09K 2205/126* (2013.01); *C09K 2205/22* (2013.01); *F25B 2345/001* (2013.01)

(58) Field of Classification Search
CPC ......... F25B 45/00; F25B 1/00; F25B 2345/00; F25B 2345/003; F25B 2345/007; F25B 2345/001; C09K 5/04; C09K 5/045
USPC .................................................. 62/77; 252/67
See application file for complete search history.

(56) References Cited

U.S. PATENT DOCUMENTS

| 6,018,952 | A | 2/2000 | Ide et al. | |
|---|---|---|---|---|
| 8,496,845 | B2 * | 7/2013 | Tsuchiya | C09K 5/045 252/67 |
| 9,303,198 | B2 * | 4/2016 | Tsuchiya | C09K 5/045 |
| 2010/0122545 | A1 * | 5/2010 | Minor | C08J 9/146 62/324.1 |
| 2010/0319377 | A1 | 12/2010 | Moriwaki et al. | |
| 2011/0011126 | A1 * | 1/2011 | Fujino | F28D 1/0477 62/513 |
| 2011/0095224 | A1 | 4/2011 | Rached | |
| 2011/0108756 | A1 | 5/2011 | Tsuchiya et al. | |
| 2011/0186772 | A1 | 8/2011 | Rached | |
| 2011/0312101 | A1 * | 12/2011 | Tsuchiya | C09K 5/045 436/101 |
| 2012/0049104 | A1 | 3/2012 | Rached | |
| 2012/0267564 | A1 * | 10/2012 | Leck | C09K 5/045 252/68 |
| 2014/0248706 | A1 * | 9/2014 | Tsuchiya | C09K 5/045 436/101 |
| 2016/0025394 | A1 | 1/2016 | Rached | |

FOREIGN PATENT DOCUMENTS

| CA | 2 674 256 | 7/2009 |
|---|---|---|
| CN | 102171309 | 8/2011 |
| EP | 0 979 855 | 2/2000 |
| JP | 8-157810 | 6/1996 |
| JP | 10-160296 | 6/1998 |
| JP | 10-197108 | 7/1998 |
| JP | 3186065 | 5/2001 |
| JP | 2008-531836 | 8/2008 |
| JP | 2009-222360 | 10/2009 |
| JP | 2010/47754 | 3/2010 |
| JP | 2011-522947 | 8/2011 |
| JP | 2011-525204 | 9/2011 |
| JP | 2012-509390 | 4/2012 |
| WO | 2006/094303 | 9/2006 |
| WO | 2009/110228 | 9/2009 |
| WO | WO 2010002016 A1 * | 1/2010 |
| WO | 2010/059677 | 5/2010 |
| WO | 2011/084813 | 7/2011 |

OTHER PUBLICATIONS

International Search Report issued Dec. 17, 2013 in International (PCT) Application No. PCT/JP2013/073851.

* cited by examiner

*Primary Examiner* — Douglas McGinty

(74) *Attorney, Agent, or Firm* — Wenderoth, Lind & Ponack, L.L.P.

(57) ABSTRACT

A principal object of the present invention is to provide a method for filling a refrigerant mixture. According to this method, when a non-azeotropic refrigerant mixture comprising HFC-32 and HFO-1234yf is transferred, changes in the composition that occur during the transfer can be made to fall within an acceptable range in terms of refrigerant properties.

9 Claims, No Drawings

METHOD FOR FILLING MIXED REFRIGERANT CONTAINING 2,3,3,3-TETRAFLUOROPROPENE

TECHNICAL FIELD

The present invention relates to a method for filling a refrigerant mixture comprising 2,3,3,3-tetrafluoropropene.

BACKGROUND ART

Recently, review of refrigerants is progressing in the fields of refrigeration and air conditioning from the viewpoint of preventing global warming. In the field of car air conditioners, refrigerants with a global warming potential (GWP) of 150 or more are regulated by the EU F-Gas Regulation. Then 2,3,3,3-tetrafluoropropene (HFO-1234yf, $CF_3CF=CH_2$) that has a GWP of 4 has been used.

As for fixed-type refrigeration and air-conditioning systems, currently used refrigerants, such as R-410A (GWP: 2,088), R-404A (GWP: 3,922), R-407C (GWP: 1,770), and 1,1,1,2-tetrafluoroethane (hereinafter, HFC-134a) (GWP: 1,430), have high GWP and are thus being regulated in developed countries from the viewpoint of not only cutting $CO_2$, but also reducing HFC (hydrofluorocarbons or fluorinated hydrocarbons). The development of alternative refrigerants is an urgent issue. Refrigerants should be selected from various refrigerants, taking into consideration the application, operating conditions, and other conditions, from multiple viewpoints, including environmental friendliness, safety, performance, and economic efficiency. Various types of refrigerants are currently proposed, together with fluorocarbon and natural refrigerants; however, currently no refrigerants satisfy all requirements, including flammability, efficiency, and GWP value. It is necessary to select the right refrigerant for the right place, depending on the application, operating conditions, and other conditions.

Among refrigerants, HFO-1234yf refrigerants have attracted attention because of their low GWP and low toxicity in fields other than the field of car air conditioners. HFO-1234yf refrigerants are a major candidate for an alternative to HFC-134a refrigerants in the field of large refrigeration and air-conditioning systems. However, as alternatives to R-410A and other refrigerants for use, for example, in fixed-type refrigeration and air-conditioning systems, HFO refrigerants alone have low vapor pressure and raise concerns of insufficient capability or performance degradation, as compared to conventional refrigerants. In addition, HFO refrigerants are known to be slightly flammable.

Accordingly, non-azeotropic refrigerant mixtures of various refrigerants have been proposed recently to improve performance and achieve non-flammability (PTL 1 to PTL 3).

However, many of the mixtures of HFC and HFO-1234yf are non-azeotropic mixtures and therefore undergo composition changes during phase changes, such as evaporation and condensation. This is because low-boiling-point components are more likely to be evaporated, and high-boiling-point components are more likely to be condensed. This tendency is prominent in the case of evaporation, i.e., a phase change from liquid to vapor, and is particularly remarkable when the components of the mixture have a large difference in their boiling points. For this reason, when such a non-azeotropic mixture is transferred from a container to another container, the mixture is usually extracted from the liquid phase so as not to induce phase changes.

Nevertheless, a mixture of components that have a large difference in boiling points undergoes a composition change of a few percent, even when the mixture is extracted from the liquid phase. This is because the reduced pressure and the increased gas phase space due to the extraction of the mixture lead to evaporation of low-boiling-point components in the liquid phase. A composition change of a few percent not only causes a significant change in refrigerant performance to thereby reduce capability and efficiency, but also has a major impact on the safety of the refrigerant, such as on flammability (PTL 4 and PTL 5).

In particular, difluoromethane (HFC-32, $C_2F_2$), which is likely to be used as a refrigerant mixture with HFO-1234yf, has a very high refrigerating capacity; however, the difference in boiling point between HFC-32 and HFO-1234yf is at least 20 K. Composition changes that occur during the transfer of such a refrigerant mixture from a feeding container (e.g., a gas cylinder or tank truck) to a refrigeration and air-conditioning system or other tanks are at a non-negligible level in terms of performance. Moreover, in terms of not only performance, but also quality assurance of the refrigerant mixture, it is important to control composition changes within the set tolerance of the refrigerant mixture.

For example, when a refrigerant mixture comprising HFO-1234yf and HFC-32 is transferred at 40° C., without taking any measures, a composition gap of up to 3 to 4 wt % from the target composition develops when the entire liquid before transfer is extracted. In this case, the composition change rate is about ±4 wt % from the target composition, and refrigeration capacity and refrigerant capacity (e.g., COP) expected from the target composition cannot be ensured. Therefore, it is important to control the composition change rate within a range as narrow as possible.

Furthermore, composition changes significantly vary depending on the type and composition ratio of non-azeotrope refrigerant, and it is difficult to predict the range of composition changes without actual measurement.

CITATION LIST

Patent Literature

PTL 1: JP2010-47754A
PTL 2: JP2011-525204A
PTL 3: JP2011-522947A
PTL 4: JP10-197108A
PTL 5: JP3186065B

SUMMARY OF INVENTION

Technical Problem

A primary object of the present invention is to provide a method for filling a refrigerant mixture that enables composition changes of a non-azeotropic refrigerant mixture comprising 2,3,3,3-tetrafluoropropene and difluoromethane during the transfer of the mixture to fall within an acceptable range of refrigerant performance.

Solution to Problem

The present inventors conducted extensive research on methods for filling a liquefied gas in order to solve the problem of composition changes that occur in a non-azeotropic mixture comprising two liquefied gases having different boiling points when the mixture is stored in a hermetically sealed container and transferred from the liquid phase to another container.

Specifically, the present invention provides a method for filling a non-azeotropic refrigerant mixture comprising difluoromethane and 2,3,3,3-tetrafluoropropene.

Method for filling a refrigerant mixture (100 wt % filling) at 65° C.

Item 1. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to $x+y_1$ wt % (minimum value) to $x+a$ wt % (maximum value), so that the proportion of the difluoromethane in the liquid phase of the refrigerant mixture in the feeding container falls within a range of $\pm a$ wt % of a target composition (x) of the difluoromethane during initiation and completion of the transfer, wherein $\pm a$ is a set tolerance ($a \geq 0$); x is a target composition with the proviso that $10 \leq x \leq 90$, excluding a range satisfying an inequality: $y_1 > a$;

and $y_1$ is a lower limit of a gap between the target composition and the initial composition, and is represented by Equation (1) below:

$$1000y_1 = L_1 x^3 - M_1 x^2 + N_1 x - P_1 \quad (1),$$

wherein $L_1 = 0.0002a + 0.016$, $M_1 = 0.072a + 3.4761$, $N_1 = 7.914a + 187.52$, and $P_1 = 1194.8a - 9.58$.

Item 2. The method for filling a refrigerant mixture according to Item 1, wherein the value a satisfies $0.5 \leq a \leq 3.0$.

Item 3. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to $x+y_A$ wt % to $x+2.5$ wt %, so that the proportion of the difluoromethane in the liquid phase of the refrigerant mixture in the feeding container falls within a range of $\pm 2.5$ wt % of a target composition (x) of the difluoromethane during initiation and completion of the transfer, wherein x is a target composition with the proviso that $10 \leq x \leq 90$; and $y_A$ is a lower limit of a gap between the target composition and the initial composition, and is represented by Equation (2) below:

$$1000y_A = 0.0166x^3 - 3.6757x^2 + 208.97x - 3006.3 \quad (2).$$

Item 4. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to $x+y_B$ wt % to $x+2.0$ wt %, so that the proportion of the difluoromethane in the liquid phase of the refrigerant mixture in the feeding container falls within a range of $\pm 2.0$ wt % of a target composition (x) of the difluoromethane during initiation and completion of the transfer, wherein x is a target composition with the proviso that $10 \leq x \leq 90$; and $y_B$ is a lower limit of a gap between the target composition and the initial composition, and is represented by Equation (3) below:

$$1000y_B = 0.0162x^3 - 3.5639x^2 + 200.6x - 2347.6 \quad (3).$$

Item 5. A method (a gas transfer filling method) for filling a refrigerant mixture comprising difluoromethane and 2,3,3,3-tetrafluoropropene, the difluoromethane being present in a liquid phase in an amount of 10 to 32 wt % or 42 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to $x+y_C$ wt % to $x+1.5$ wt %, so that the proportion of the difluoromethane in the liquid phase of the refrigerant mixture in the feeding container falls within a range of $\pm 1.5$ wt % of a target composition (x) of the difluoromethane during initiation and completion of the transfer, wherein x is a target composition with the proviso that $10 \leq x \leq 32$ or $42 \leq x \leq 90$; and $y_C$ is a lower limit of a gap between the target composition and the initial composition, and is represented by Equation (4) below:

$$1000y_C = 0.0169x^3 - 3.6374x^2 + 199.88x - 1760.3 \quad (4).$$

Item 6. A method (a gas transfer filling method) for filling a refrigerant mixture comprising difluoromethane and 2,3,3,3-tetrafluoropropene, the difluoromethane being present in a liquid phase in an amount of 10 to 14 wt % or 65 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to $x+Y_D$ wt % to $x+1.0$ wt %, so that the proportion of the difluoromethane in the liquid phase of the refrigerant mixture in the feeding container falls within a range of $\pm 1.0$ wt % of a target composition (x) of the difluoromethane during initiation and completion of the transfer, wherein x is a target composition with the proviso that $10 \leq x \leq 14$ or $65 \leq x \leq 90$; and $Y_D$ is a lower limit of a gap between the target composition and the initial composition, and is represented by Equation (5) below:

$$1000y_D = 0.0160x^3 - 3.5312x^2 + 196.02x - 1210.8 \quad (5).$$

Method for filling a refrigerant mixture (70 wt % of the maximum filling amount) at 65° C.

Item 7. A method (a gas transfer filling method) for filling a refrigerant mixture comprising difluoromethane and 2,3, 3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 70 wt % of a maximum filling amount of the refrigerant mixture, adjusting, immediately before the transfer, the proportion (initial composition) of the difluoromethane in the liquid phase of the refrigerant mixture in the feeding container to $x+y_2$ wt % (minimum value) to $x+a$ wt % (maximum value), so that the proportion of the difluoromethane in the liquid phase of the refrigerant mixture in the feeding container falls within a range of $\pm a$ wt % of a target composition (x) of the difluoromethane during initiation and completion of the transfer, wherein $\pm a$ is a set tolerance ($a \geq 0$); x is a target composition with the proviso that $10 \leq x \leq 90$, excluding a range satisfying $y_2 > a$;

and $y_2$ is a lower limit of a gap between the target composition and the initial composition, and is represented by Equation (6) below:

$$1000y_2 = L_2 x^3 - M_2 x^2 + N_2 x - P_2 \qquad (6),$$

wherein $L_2 = -0.0016a + 0.0169$, $M_2 = -0.1765a + 3.4316$, $N_2 = -1.87a + 180.08$, and $P_2 = 1119.5a + 148.9$.

Item 8. The method for filling a refrigerant mixture according to Item 7, wherein the value a satisfies $0.5 \leq a \leq 3.0$.

Item 9. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 70 wt % of a maximum filling amount of the refrigerant mixture, adjusting, immediately before the transfer, the proportion (initial composition) of the difluoromethane in the liquid phase of the refrigerant mixture in the feeding container to $x+y_E$ wt % to $x+2.5$ wt %, so that the proportion of the difluoromethane in the liquid phase of the refrigerant mixture in the feeding container falls within a range of $\pm 2.5$ wt % of a target composition (x) of the difluoromethane during initiation and completion of the transfer, wherein x is a target composition with the proviso that $10 \leq x \leq 90$; and $y_E$ is a lower limit of a gap between the target composition and the initial composition, and is represented by Equation (7) below:

$$1000y_E = 0.013x^3 - 3.0285x^2 + 177.93x - 2975.4 \qquad (7).$$

Item 10. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 70 wt % of a maximum filling amount of the refrigerant mixture, adjusting, immediately before the transfer, the proportion (initial composition) of the difluoromethane in the liquid phase of the refrigerant mixture in the feeding container to $x+y_F$ wt % to $x+2.0$ wt %, so that the proportion of the difluoromethane in the liquid phase of the refrigerant mixture in the feeding container falls within a range of $\pm 2.0$ wt % of a target composition (x) of the difluoromethane during initiation and completion of the transfer, wherein x is a target composition with the proviso that $10 \leq x \leq 90$; and $y_F$ is a lower limit of a gap between the target composition and the initial composition, and is represented by Equation (8) below:

$$1000y_F = 0.0132x^3 - 2.991x^2 + 171.39x - 2327.0 \qquad (8).$$

Item 11. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 70 wt % of a maximum filling amount of the refrigerant mixture, adjusting, immediately before the transfer, the proportion (initial composition) of the difluoromethane in the liquid phase of the refrigerant mixture in the feeding container to $x+y_G$ wt % to $x+1.5$ wt %, so that the proportion of the difluoromethane in the liquid phase of the refrigerant mixture in the feeding container falls within a range of $\pm 1.5$ wt % of a target composition (x) of the difluoromethane during initiation and completion of the transfer, wherein x is a target composition with the proviso that $10 \leq x \leq 90$; and $y_G$ is a lower limit of a gap between the target composition and the initial composition, and is represented by Equation (9) below:

$$1000y_G = 0.0149x^3 - 3.2273x^2 + 179.57x - 1866.7 \qquad (9).$$

Item 12. A method (a gas transfer filling method) for filling a refrigerant mixture comprising difluoromethane and 2,3,3,3-tetrafluoropropene, the difluoromethane being present in a liquid phase in an amount of 10 to 18 wt % or 60 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 70 wt % of a maximum filling amount of the refrigerant mixture, adjusting, immediately before the transfer, the proportion (initial composition) of the difluoromethane in the liquid phase of the refrigerant mixture in the feeding container to $x+y_H$ wt % to $x+1.0$ wt %, so that the proportion of the difluoromethane in the liquid phase of the refrigerant mixture in the feeding container falls within a range of $\pm 1.0$ wt % of a target composition (x) of the difluoromethane during initiation and completion of the transfer, wherein x is a target composition with the proviso that $10 \leq x \leq 18$ or $60 \leq x \leq 90$; and $y_H$ is a lower limit of a gap between the target composition and the initial composition, and is represented by Equation (10) below:

$$1000y_H = 0.0151x^3 - 3.2439x^2 + 178.32x - 1263.0 \qquad (10).$$

Method for filling a refrigerant mixture (100 wt % filling) at 45° C.

Item 13. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to $x+y_3$ wt % (minimum value) to $x+a$ wt % (maximum value), so that the proportion of the difluoromethane in the liquid phase of the refrigerant mixture in the feeding container falls within a range of $\pm a$ wt % of a target composition (x) of the difluoromethane during initiation and completion of the transfer, wherein $\pm a$ is a set tolerance ($a \geq 0$); x is a target composition with the proviso that $10 \leq x \leq 90$, excluding a range satisfying an inequality: $y_3 > a$;

and $y_3$ is a lower limit of a gap between the target composition and the initial composition, and is represented by Equation (11) below:

$$1000y_3 = L_3x^3 - M_3x^2 + N_3x - P_3 \quad (11),$$

wherein $L_3 = 0.0003a + 0.0172$, $M_3 = 0.0962a + 3.6851$, $N_3 = 9.704a + 196.9$, and $P_3 = 1241.2a - 93.54$.

Item 14. The method for filling a refrigerant mixture according to Item 13, wherein the value a satisfies $0.5 \leq a \leq 3.0$.

Item 15. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to $x+y_I$ wt % to $x+2.5$ wt %, so that the proportion of the difluoromethane in the liquid phase of the refrigerant mixture in the feeding container falls within a range of $\pm 2.5$ wt % of a target composition (x) of the difluoromethane during initiation and completion of the transfer, wherein x is a target composition with the proviso that $10 \leq x \leq 90$; and $y_I$ is a lower limit of a gap between the target composition and the initial composition, and is represented by Equation (12) below:

$$1000y_I = 0.0181x^3 - 3.9611x^2 + 223.1x - 3040.4 \quad (12).$$

Item 16. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to $x+y_J$ wt % to $x+2.0$ wt %, so that the proportion of the difluoromethane in the liquid phase of the refrigerant mixture in the feeding container falls within a range of $\pm 2.0$ wt % of a target composition (x) of the difluoromethane during initiation and completion of the transfer, wherein x is a target composition with the proviso that $10 \leq x \leq 90$; and $y_J$ is a lower limit of a gap between the target composition and the initial composition, and is represented by Equation (13) below:

$$1000y_J = 0.0177x^3 - 3.8614x^2 + 215.42x - 2373.5 \quad (13).$$

Item 17. A method (a gas transfer filling method) for filling a refrigerant mixture comprising difluoromethane and 2,3,3,3-tetrafluoropropene, the difluoromethane being present in a liquid phase in an amount of 10 to 26.5 wt % or 47.5 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to $x+y_K$ wt % to $x+1.5$ wt %, so that the proportion of the difluoromethane in the liquid phase of the refrigerant mixture in the feeding container falls within a range of $\pm 1.5$ wt % of a target composition (x) of the difluoromethane during initiation and completion of the transfer, wherein x is a target composition with the proviso that $10 \leq x \leq 26.5$ or $47.5 \leq x \leq 90$; and $y_K$ is a lower limit of a gap between the target composition and the initial composition, and is represented by Equation (14) below:

$$1000y_K = 0.0172x^3 - 3.7549x^2 + 207.43x - 1705.9 \quad (14).$$

Item 18. A method (a gas transfer filling method) for filling a refrigerant mixture comprising difluoromethane and 2,3,3,3-tetrafluoropropene, the difluoromethane being present in a liquid phase in an amount of 10 to 13.5 wt % or 67 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to $x+y_L$ wt % to $x+1.0$ wt %, so that the proportion of the difluoromethane in the liquid phase of the refrigerant mixture in the feeding container falls within a range of $\pm 1.0$ wt % of a target composition (x) of the difluoromethane during initiation and completion of the transfer, wherein x is a target composition with the proviso that $10 \leq x \leq 13.5$ or $67 \leq x \leq 90$; and $y_L$ is a lower limit of a gap between the target composition and the initial composition, and is represented by Equation (15) below:

$$1000y_L = 0.0178x^3 - 3.8363x^2 + 209.59x - 1194.3 \quad (15).$$

Method for filling a refrigerant mixture (set tolerance: $\pm 2.0$ wt %)

Item 19. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to $x+y_4$ wt % (minimum value) to $x+2.0$ wt % (maximum value), so that the proportion of the difluoromethane in the liquid phase of the refrigerant mixture in the feeding container falls within a range of ±2.0 wt % of a target composition (x) of the difluoromethane during initiation and completion of the transfer, wherein b is an amount (wt %) initially filled into the feeding container; x is a target composition with the proviso that $10 \leq x \leq 90$, excluding a range satisfying an inequality: $y_4 > 2$;

and $y_4$ is a lower limit of a gap between the target composition and the initial composition, and is represented by Equation (16) below:

$$1000y_4 = L_4 x^3 - M_4 x^2 + N_4 x - P_4 \quad (16),$$

wherein $L_4 = 0.0001b + 0.0081$, $M_4 = 0.0195b + 1.958$, $N_4 = 0.9878b + 118.91$, and $P_4 = -0.176b + 2408.7$.

Item 20. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 100 wt % of a maximum filling amount of the refrigerant mixture, adjusting, immediately before the transfer, the proportion (initial composition) of the difluoromethane in the liquid phase of the refrigerant mixture in the feeding container to $x+y_{P1}$ wt % to $x+2.0$ wt %, so that the proportion of the difluoromethane in the liquid phase of the refrigerant mixture in the feeding container falls within a range of ±2.0 wt % of a target composition (x) of the difluoromethane during initiation and completion of the transfer, wherein x is a target composition with the proviso that $10 \leq x \leq 90$; and $y_{P1}$ is a lower limit of a gap between the target composition and the initial composition, and is represented by Equation (17) below:

$$1000y_{P1} = 0.0177x^3 - 3.8614x^2 + 215.42x - 2373.5 \quad (17).$$

Item 21. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 90 wt % of a maximum filling amount of the refrigerant mixture, adjusting, immediately before the transfer, the proportion (initial composition) of the difluoromethane in the liquid phase of the refrigerant mixture in the feeding container to $x+y_{P2}$ wt % to $x+2.0$ wt %, so that the proportion of the difluoromethane in the liquid phase of the refrigerant mixture in the feeding container falls within a range of ±2.0 wt % of a target composition (x) of the difluoromethane during initiation and completion of the transfer, wherein x is a target composition with the proviso that $10 \leq x \leq 90$; and $y_{P2}$ is a lower limit of a gap between the target composition and the initial composition, and is represented by Equation (18) below:

$$1000y_2 = 0.0172x^3 - 3.7532x^2 + 210.1x - 2419.3 \quad (18).$$

Item 22. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 80 wt % of a maximum filling amount of the refrigerant mixture, adjusting, immediately before the transfer, the proportion (initial composition) of the difluoromethane in the liquid phase of the refrigerant mixture in the feeding container to $x+y_m$ wt % to $x+2.0$ wt %, so that the proportion of the difluoromethane in the liquid phase of the refrigerant mixture in the feeding container falls within a range of ±2.0 wt % of a target composition (x) of the difluoromethane during initiation and completion of the transfer, wherein x is a target composition with the proviso that $10 \leq x \leq 90$; and $y_m$ is a lower limit of a gap between the target composition and the initial composition, and is represented by Equation (19) below:

$$1000y_3 = 0.016x^3 - 3.5202x^2 + 198.2x - 2382.2 \quad (19).$$

Item 23. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 70 wt % of a maximum filling amount of the refrigerant mixture, adjusting, immediately before the transfer, the proportion (initial composition) of the difluoromethane in the liquid phase of the refrigerant mixture in the feeding container to $x+y_{P4}$ wt % to $x+2.0$ wt %, so that the proportion of the difluoromethane in the liquid phase of the refrigerant mixture in the feeding container falls within a range of ±2.0 wt % of a target composition (x) of the difluoromethane during initiation and completion of the transfer, wherein x is a target composition with the proviso that $10 \leq x \leq 90$; and $y_{P4}$ is a lower limit of a gap between the target composition and the initial composition, and is represented by Equation (20) below:

$$1000y_{P4} = 0.0152x^3 - 3.3513x^2 + 189.76x - 2412.5 \quad (20).$$

Item 24. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 60 wt % of a maximum filling amount of the refrigerant mixture, adjusting, immediately before the transfer, the proportion (initial composition) of the difluoromethane in the liquid phase of the refrigerant mixture in the feeding container to x+y$_{P5}$ wt % to x+2.0 wt %, so that the proportion of the difluoromethane in the liquid phase of the refrigerant mixture in the feeding container falls within a range of ±2.0 wt % of a target composition (x) of the difluoromethane during initiation and completion of the transfer, wherein x is a target composition with the proviso that 10≤x≤90; and y$_{P5}$ is a lower limit of a gap between the target composition and the initial composition, and is represented by Equation (21) below:

$$1000y_{P5}=0.0138x^3-3.0892x^2+176.2x-2385.7 \quad (21).$$

Method for a refrigerant mixture (set tolerance: ±1.5 wt %)

Item 25. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to x+y$_5$ wt % (minimum value) to x+1.5 wt % (maximum value), so that the proportion of the difluoromethane in the liquid phase of the refrigerant mixture in the feeding container falls within a range of ±1.5 wt % of a target composition (x) of the difluoromethane during initiation and completion of the transfer, wherein b is an amount (wt %) initially filled into the feeding container; x is a target composition with the proviso that 10≤x≤90, excluding a range satisfying an inequality: y$_5$>1.5;

and y$_5$ is a lower limit of a gap between the target composition and the initial composition, and is represented by Equation (22) below:

$$1000y_5=L_5x^3-M_5x^2+N_5x-P_5 \quad (22),$$

wherein L$_5$=0.00005b+0.0092, M$_5$=0.0171b+2.1013, N$_5$=0.8528b+125.11, and P$_5$=−2.372b+1972.3.

Item 26. A method (a gas transfer filling method) for filling a refrigerant mixture comprising difluoromethane and 2,3,3,3-tetrafluoropropene, the difluoromethane being present in a liquid phase in an amount of 10 to 26.5 wt % to 47.5 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 100 wt % of a maximum filling amount of the refrigerant mixture, adjusting, immediately before the transfer, the proportion (initial composition) of the difluoromethane in the liquid phase of the refrigerant mixture in the feeding container to x+y$_{Q1}$ wt % to x+1.5 wt %, so that the proportion of the difluoromethane in the liquid phase of the refrigerant mixture in the feeding container falls within a range of ±1.5 wt % of a target composition (x) of the difluoromethane during initiation and completion of the transfer, wherein x is a target composition with the proviso that 10≤x≤26.5 or 47.5≤x≤90; and y$_{Q1}$ is a lower limit of a gap between the target composition and the initial composition, and is represented by Equation (23) below:

$$1000y_{Q1}=0.0172x^2-3.7549x^2+207.43x-1705.9 \quad (23).$$

Item 27. A method (a gas transfer filling method) for filling a refrigerant mixture comprising difluoromethane and 2,3,3,3-tetrafluoropropene, the difluoromethane being present in a liquid phase in an amount of 10 to 30 wt % to 44 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 90 wt % of a maximum filling amount of the refrigerant mixture, adjusting, immediately before the transfer, the proportion (initial composition) of the difluoromethane in the liquid phase of the refrigerant mixture in the feeding container to x+y$_{Q2}$ wt % to x+1.5 wt %, so that the proportion of the difluoromethane in the liquid phase of the refrigerant mixture in the feeding container falls within a range of ±1.5 wt % of a target composition (x) of the difluoromethane during initiation and completion of the transfer, wherein x is a target composition with the proviso that 10≤x≤30 or 44≤x≤90; and y$_{Q2}$ is a lower limit of a gap between the target composition and the initial composition, and is represented by Equation (24) below:

$$1000y_{Q2}=0.0168x^2-3.6698x^2+203.75x-1785.4 \quad (24).$$

Item 28. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 80 wt % of a maximum filling amount of the refrigerant mixture, adjusting, immediately before the transfer, the proportion (initial composition) of the difluoromethane in the liquid phase of the refrigerant mixture in the feeding container to x+y$_{Q3}$ wt % to x+1.5 wt %, so that the proportion of the difluoromethane in the liquid phase of the refrigerant mixture in the feeding container falls within a range of ±1.5 wt % of a target composition (x) of the difluoromethane during initiation and completion of the transfer, wherein x is a target composition with the proviso that 10≤x≤90; and y$_{Q3}$ is a lower limit of a gap between the target composition and the initial composition, and is represented by Equation (25) below:

$$1000y_{Q3}=0.0163x^2-3.5445x^2+197.22x-1815.9 \quad (25).$$

Item 29. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 70 wt % of a maximum filling amount of the refrigerant mixture, adjusting, immediately before the transfer, the proportion (initial composition) of the difluoromethane in the liquid phase of the refrigerant mixture in the feeding container to x+y$_{Q4}$ wt % to x+1.5 wt %, so that the proportion of the difluoromethane in the liquid phase of the refrigerant mixture in the feeding container falls within a range of ±1.5 wt % of a target composition (x) of the difluoromethane during initiation and completion of the transfer, wherein x is a target composition with the proviso that 10≤x≤90; and y$_{Q4}$ is a lower limit of a gap between the target composition and the initial composition, and is represented by Equation (26) below:

$$1000y = 0.0147x^3 - 3.2607x^2 + 183.21x - 1777.0 \quad (26).$$

Item 30. A method (a gas transfer filling method) for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 60 wt % of a maximum filling amount of the refrigerant mixture, adjusting, immediately before the transfer, the proportion (initial composition) of the difluoromethane in the liquid phase of the refrigerant mixture in the feeding container to x+y$_{Q5}$ wt % to x+1.5 wt %, so that the proportion of the difluoromethane in the liquid phase of the refrigerant mixture in the feeding container falls within a range of ±1.5 wt % of a target composition (x) of the difluoromethane during initiation and completion of the transfer, wherein x is a target composition with the proviso that 10≤x≤90; and y$_{os}$ is a lower limit of a gap between the target composition and the initial composition, and is represented by Equation (27) below:

$$1000y_{Q5} = 0.0141x^3 - 3.1058x^2 + 175.06x - 1828.7 \quad (27).$$

Method for filling a refrigerant mixture (set tolerance: ±1.0 wt %)

Item 31. A method (a gas transfer filling method) for filling a refrigerant mixture comprising difluoromethane and 2,3,3,3-tetrafluoropropene, the difluoromethane being present in a liquid phase in an amount of 10 to 18.5 wt % or 60 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to x+y$_6$ wt % (minimum value) to x+1.0 wt % (maximum value), so that the proportion of the difluoromethane in the liquid phase of the refrigerant mixture in the feeding container falls within a range of +1.0 wt % of a target composition (x) of the difluoromethane during initiation and completion of the transfer, wherein b is an amount (wt %) initially filled into the feeding container; x is a target composition with the proviso that 10≤x≤18.5 or 60≤x≤90, excluding a range satisfying an inequality: y$_6$>1;

and y$_6$ is a lower limit of a gap between the target composition and the initial composition, and is represented by Equation (28) below:

$$1000y_6 = L_6x^3 - M_6x^2 + N_6x - P_6 \quad (28)$$

wherein L$_6$=0.00009b+0.0086, M$_6$=0.0183b+2.003, N$_6$=0.9237b+117.29, and P$_6$=−1.055b+1292.7.

Item 32. A method (a gas transfer filling method) for filling a refrigerant mixture comprising difluoromethane and 2,3,3,3-tetrafluoropropene, the difluoromethane being present in a liquid phase in an amount of 10 to 13.5 wt % or 67 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 100 wt % of a maximum filling amount of the refrigerant mixture, adjusting, immediately before the transfer, the proportion (initial composition) of the difluoromethane in the liquid phase of the refrigerant mixture in the feeding container to x+y$_{R1}$ wt % to x+1.0 wt %, so that the proportion of the difluoromethane in the liquid phase of the refrigerant mixture in the feeding container falls within a range of ±1.0 wt % of a target composition (x) of the difluoromethane during initiation and completion of the transfer, wherein x is a target composition with the proviso that 10≤x≤13.5 or 67≤x≤90; and y$_{R1}$ is a lower limit of a gap between the target composition and the initial composition, and is represented by Equation (29) below:

$$1000y = 0.0178x^3 - 3.8363x^2 + 209.59x - 1194.3 \quad (29).$$

Item 33. A method (a gas transfer filling method) for filling a refrigerant mixture comprising difluoromethane and 2,3,3,3-tetrafluoropropene, the difluoromethane being present in a liquid phase in an amount of 10 to 14 wt % or 66 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 90 wt % of a maximum filling amount of the refrigerant mixture, adjusting, immediately before the transfer, the proportion (initial composition) of the difluoromethane in the liquid phase of the refrigerant mixture in the feeding container to x+y$_{R2}$ wt % to x+1.0 wt %, so that the proportion of the difluoromethane in the liquid phase of the refrigerant mixture in the feeding container falls within a range of ±1.0 wt % of a target composition (x) of the difluoromethane during initiation and completion of the transfer, wherein x is a target composition with the proviso that 10≤x≤14 or 66≤x≤90; and y$_{R2}$ is a lower limit of a gap between the target composition and the initial composition, and is represented by Equation (30) below:

$$1000y_{R2} = 0.0168x^3 - 3.6386x^2 + 200.2x - 1192.8 \quad (30).$$

Item 34. A method (a gas transfer filling method) for filling a refrigerant mixture comprising difluoromethane and 2,3,3,3-tetrafluoropropene, the difluoromethane being present in a liquid phase in an amount of 10 to 15.5 wt % or 65 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 80 wt % of a maximum filling amount of the refrigerant mixture, adjusting, immediately before the transfer, the proportion (initial composition) of the difluoromethane in the liquid phase of the refrigerant mixture in the feeding container to x+y$_{R3}$ wt % to x+1.0 wt %, so that the proportion of the difluoromethane in the liquid phase of the refrigerant mixture in the feeding container falls within a range of ±1.0 wt % of a target composition (x) of the difluoromethane during initiation and completion of the transfer, wherein x is a target composition with the proviso that $10 \leq x \leq 15.5$ or $65 \leq x \leq 90$; and $y_{R3}$ is a lower limit of a gap between the target composition and the initial composition, and is represented by Equation (31) below:

$$1000 y_{R3} = 0.0159 x^3 - 3.4616 x^2 + 191.19 x - 1196.0 \quad (31).$$

Item 35. A method (a gas transfer filling method) for filling a refrigerant mixture comprising difluoromethane and 2,3,3,3-tetrafluoropropene, the difluoromethane being present in a liquid phase in an amount of 10 to 16.5 wt % or 62.5 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 70 wt % of a maximum filling amount of the refrigerant mixture, adjusting, immediately before the transfer, the proportion (initial composition) of the difluoromethane in the liquid phase of the refrigerant mixture in the feeding container to $x + y_{R4}$ wt % to $x + 1.0$ wt %, so that the proportion of the difluoromethane in the liquid phase of the refrigerant mixture in the feeding container falls within a range of $\pm 1.0$ wt % of a target composition (x) of the difluoromethane during initiation and completion of the transfer, wherein x is a target composition with the proviso that $10 \leq x \leq 16.5$ or $62.5 \leq x \leq 90$; and $y_{R4}$ is a lower limit of a gap between the target composition and the initial composition, and is represented by Equation (32) below:

$$1000 y_{R4} = 0.015 x^3 - 3.2938 x^2 + 182.87 x - 1230.1 \quad (32).$$

Item 36. A method (a gas transfer filling method) for filling a refrigerant mixture comprising difluoromethane and 2,3,3,3-tetrafluoropropene, the difluoromethane being present in a liquid phase in an amount of 10 to 18.5 wt % or 60 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 60 wt % of a maximum filling amount of the refrigerant mixture, adjusting, immediately before the transfer, the proportion (initial composition) of the difluoromethane in the liquid phase of the refrigerant mixture in the feeding container to $x + y_{R5}$ wt % to $x + 1.0$ wt %, so that the proportion of the difluoromethane in the liquid phase of the refrigerant mixture in the feeding container falls within a range of $\pm 1.0$ wt % of a target composition (x) of the difluoromethane during initiation and completion of the transfer, wherein x is a target composition with the proviso that $10 \leq x \leq 18.5$ or $60 \leq x \leq 90$; and $Y_{R5}$ is a lower limit of a gap between the target composition and the initial composition, and is represented by Equation (33) below:

$$1000 y_{R5} = 0.0141 x^3 - 3.0949 x^2 + 172.07 x - 1228.4 \quad (33).$$

Hereinafter, the method of the present invention for filling a non-azeotropic refrigerant mixture comprising difluoromethane (HFC-32, $CH_2F_2$) and 2,3,3,3-tetrafluoropropene (HFO-1234yf, $CF_3CF=CH_2$) is described in more detail.

The method for filling a refrigerant mixture of the present invention has a feature in that, in transferring a HFC-32/HFO-1234yf refrigerant mixture, which is a non-azeotropic refrigerant and which has a composition of 10 to 90 wt % HFC-32 in the liquid phase, to a target container or equipment from a feeding container, the proportion of HFC-32 in the liquid phase of the refrigerant mixture in the feeding container is adjusted before the transfer to a specific range.

[1] Filling method for each filling amount

The mixture ratio is described below in terms of a refrigerant mixture before being transferred to a target container or equipment from a feeding container that is filled with the refrigerant mixture in an amount equal to or less than 100 wt % or 70 wt % of a maximum filling amount of the refrigerant mixture.

The term "maximum filling amount" (100 wt % of the maximum filling amount) used herein refers to a maximum amount that can be filled into a container, as defined in international law regarding transportation or in the High Pressure Gas Safety Act of Japan. According to the High Pressure Gas Safety Act of Japan, the maximum filling amount is calculated as below:

$$G = V/C$$

G: Mass (kg) of fluorocarbon
V: Capacity (L) of the container
C: Constant according to the type of fluorocarbon The fill constant C here is determined in Japan as a value obtained by dividing 1.05 by the specific gravity of the gas at 48° C. When export is involved, according to international law, fill constant C is defined as a value obtained by dividing 1.05 by the specific gravity of the gas at 65° C. when passing through tropical regions, and it is defined as a value obtained by dividing 1.05 by the specific gravity of the gas at 45° C. when only regions other than tropical regions are involved.

In transfer of a HFC-32/HFO-1234yf refrigerant mixture to a target container or equipment from a feeding container, a smaller amount of the mixture initially filled into the feeding container results in a smaller change in the composition of HFC-32 in the liquid phase of the refrigerant mixture in the feeding container during initiation and completion of the transfer.

The maximum filling amounts calculated by using the fill constants are shown below in decreasing order:

A maximum filling amount calculated by using a value obtained by dividing 1.05 by the specific gravity of the gas at 45° C. as the fill constant>a maximum filling amount calculated by using a value obtained by dividing 1.05 by the specific gravity of the gas at 48° C. as the fill constant>a maximum filling amount calculated by using a value obtained by dividing 1.05 by the specific gravity of the gas at 65° C. as the fill constant.

Hereinafter, a value obtained by dividing 1.05 by the specific gravity of the gas at 45° C. or 65° C. is used as the fill constant.

(1) Filling Method in which a refrigerant mixture is filled into a container in an amount equal to or less than the amount calculated by using a value obtained by dividing 1.05 by the specific gravity of the gas at 65° C. as the fill constant The mixture ratio is described below in terms of a refrigerant mixture before being transferred to a target container or equipment from a feeding container that is filled with the refrigerant mixture in an amount equal to or less than the maximum filling amount (100 wt %) of the refrigerant mixture, the maximum filling amount being calculated using a value obtained by dividing 1.05 by the specific gravity of the gas at 65° C. as the fill constant.

(1-1) Filling method that enables the composition of HFC-32 to fall within a range of $\pm a$ wt % of the target composition (x) of HFC-32

A method (a gas transfer filling method) of the present invention for filling a refrigerant mixture comprising HFC-32 and HFO-1234yf in such a manner that the HFC-32 is present in the liquid phase in an amount of 10 to 90 wt % based on 100 wt % of the total of HFC-32 and HFO-1234yf, the method being performed in transferring the refrigerant mixture in a liquid state to a target container or equipment from a feeding container that is filled with the refrigerant mixture in an amount equal to or less than 100 wt % of the maximum filling amount of the refrigerant mixture, has the following feature. Specifically, the proportion (initial composition) of HFC-32 in the liquid phase of the refrigerant mixture in the feeding container is adjusted immediately before the transfer to $x+y_1$ wt % (minimum value) to $x+a$ wt % (maximum value), so that the proportion of HFC-32 in the liquid phase of the refrigerant mixture in the feeding container falls within a set tolerance ($\pm a$ wt %) of a target composition (x) of HFC 32 during initiation and completion of the transfer.

$\pm a$: set tolerance ($a \geq 0$)

x: target composition (with the proviso that $10 \leq x \leq 90$, excluding a range satisfying an inequality: $y_1 > a$)

$y_1$: a lower limit of a gap between the target composition and the initial composition, $y_1$ being represented by Equation (1) below:

$$1000y_1 = L_1 x^3 - M_1 x^2 + N_1 x - P_1 \qquad (1)$$

$L_1 = 0.0002a + 0.016$
$M_1 = 0.072a + 3.4761$
$N_1 = 7.914a + 187.52$
$P_1 = 1194.8a - 9.58$.

The "$\pm a$" (set tolerance) is a difference between a reference value (a target composition (x) of HFC-32) and an acceptable maximum or minimum value of the reference value. Specifically, the "$\pm a$" is an acceptable gap relative to the target composition.

According to the method for filling a refrigerant mixture of the present invention, the proportion of HFC-32 in the liquid phase of the mixture in a feeding container is adjusted, before transfer, to a specific range; therefore, even when the feeding container is filled with the refrigerant mixture in an amount equal to 100 wt % of the maximum filling amount of the refrigerant mixture, changes in the composition in a target container or equipment fall within an acceptable range, i.e., $\pm a$ wt % of the target composition, until transfer is completed.

The "target composition" of HFC-32 is the concentration of HFC-32 in the overall composition (liquid phase and vapor phase) of the HFC-32/HFO-1234yf refrigerant mixture, and is calculated in a target container or equipment.

The boiling point of HFC-32 is lower than that of HFO-1234yf. Therefore, when the space created due to extraction of refrigerant is refilled with vapor evaporated from the liquid phase during transfer, HFC-32 evaporates in an amount greater than that of HFO-1234yf, causing a reduction in the HFC-32 concentration in the liquid phase. For this reason, HFC-32 is preferably filled into a feeding container before transfer in an amount greater than that of the target composition. The value a above is generally set to $0.5 \leq a \leq 3.0$.

Hereinafter, one example is described regarding a method that performs transfer at a handling temperature of 40° C. For example, according to the High Pressure Gas Safety Act of Japan, handling a container at a temperature of 40° C. or more is prohibited; therefore, particularly in Japan, the handling temperature is 0 to 40° C. when transfer is performed. Also in international law, etc., it is required to avoid handling high-pressure gas at a high temperature. A higher temperature during transfer (at the time of handling) causes a larger composition change associated with the transfer. Therefore, the conditions for the transfer at a handling temperature of 40° C. can be applied to the conditions for the transfer at a handling temperature ranging from 0 to 40° C.

(1-2) Filling method that enables the composition of HFC-32 to fall within a range of $\pm 2.5$ wt % of the target composition (x) of HFC-32

Hereinafter, an embodiment in which the set tolerance ($\pm a$) is $\pm 2.5$ is described.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container, the proportion (initial composition) of HFC-32 in the liquid phase of the refrigerant mixture in the feeding container is preferably adjusted, before the transfer, to $x+y_A$ wt % to $x+2.5$ wt %, so that the proportion of HFC-32 in the liquid phase of the refrigerant mixture in the feeding container falls within a range of $\pm 2.5$ wt % of a target composition (x) of HFC-32 during initiation and completion of the transfer.

(In the above, x is a target composition, with the proviso that $10 \leq x \leq 90$; and $y_A$ is a lower limit of a gap between the target composition and the initial composition, and is represented by Equation (2):

$$1000y_A = 0.0166x^3 - 3.6757x^2 + 208.97x - 3006.3 \qquad (2).)$$

In this embodiment, referring to Equation (2) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about $x-1.9$ wt % to $x+2.5$ wt %. Changes in the composition in a target container or equipment can thereby fall within the acceptable range of $\pm 2.5$ wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of $\pm 2.5$ wt % of the target composition in a target container or equipment until the transfer is completed, the upper limit of the composition of HFC-32 in the liquid phase of the HFC-32/HFO-1234yf refrigerant mixture immediately before the transfer is $+2.5$ wt % of the target composition of HFC-32.

Further, when the mixture contains HFC-32 in an amount of 90 wt %, changes in the composition of HFC-32 are small; therefore, even when the initial composition of HFC-32 is about $-1.9$ wt % of the target composition (90 wt %), the proportion of HFC-32 in the liquid phase of the mixture falls within $\pm 2.5$ wt % of the target composition until the transfer is completed.

(1-3) Filling method that enables the composition of HFC-32 to fall within a range of $\pm 2.0$ wt % of the target composition (x) of HFC-32

Hereinafter, an embodiment in which the set tolerance (±a) is ±2.0 is described.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container, the proportion (initial composition) of HFC-32 in the liquid phase of the refrigerant mixture in the feeding container is preferably adjusted, before the transfer, to $x+y_B$ wt % to $x+2.0$ wt %, so that the proportion of HFC-32 in the liquid phase of the refrigerant mixture in the feeding container falls within a range of ±2.0 wt % of the target composition (x) of HFC-32 during initiation and completion of the transfer.

(In the above, x is a target composition, with the proviso that $10 \leq x \leq 90$; and $y_B$ is a lower limit of a gap between the target composition and the initial composition, and is represented by Equation (3):

$$1000y_B = 0.0162x^3 - 3.5639x^2 + 200.6x - 2347.6 \qquad (3).)$$

In this embodiment, referring to Equation (3) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about $x-1.4$ wt % to $x+2.0$ wt %. Changes in the composition in a target container or equipment can thereby fall within the acceptable range of ±2.0 wt % of the target composition until the transfer is completed.

For the same reason as described earlier, HFC-32 is preferably filled into a feeding container before the transfer in an amount greater than that of the target composition. In the method for filling a refrigerant mixture, in which the composition of HFC-32 in the HFC-32/HFO-1234yf refrigerant mixture is made to fall within the acceptable range of ±2.0 wt % of the target composition in a target container or equipment until the transfer is completed, the upper limit of the composition of HFC-32 in the liquid phase of the HFC-32/HFO-1234yf refrigerant mixture immediately before the transfer is +2.0 wt % of the target composition of HFC-32.

Further, when the mixture contains HFC-32 in an amount of 90 wt %, changes in the composition of HFC-32 are small; therefore, even when the initial composition of HFC-32 is about −1.4 wt % of the target composition (90 wt %), the proportion of HFC-32 in the liquid phase of the mixture falls within ±2.0 wt % of the target composition until the transfer is completed.

(1-4) Filling method that enables the composition of HFC-32 to fall within a range of ±1.5 wt % of the target composition (x) of HFC-32

Hereinafter, an embodiment in which the set tolerance (±a) is ±1.5 is described.

In one embodiment of a method of the present invention for filling a refrigerant mixture comprising HFC-32 and HFO-1234yf in such a manner that HFC-32 is present in the liquid phase in an amount of 10 to 32 wt % or 42 to 90 wt % based on 100 wt % of the total of HFC-32 and HFO-1234yf, in transferring the refrigerant mixture in a liquid state to a target container or equipment from a feeding container, the proportion (initial composition) of HFC-32 in the liquid phase of the refrigerant mixture in the feeding container is preferably adjusted, before the transfer, to $x+y_C$ wt % to $x+1.5$ wt %, so that the proportion of HFC-32 in the liquid phase of the refrigerant mixture in the feeding container falls within a range of ±1.5% of the target composition (x) of HFC-32 during initiation and completion of the transfer. When a=1.5, and $32 < x < 42$, then $y_C > a$; therefore, x is within a range of 10 to 32 wt % or 42 to 90 wt %.

(In the above, x is a target composition; and $y_c$ is a lower limit of a gap between the target composition and the initial composition, and is represented by Equation (4):

$$1000y_C = 0.0169x^3 - 3.6374x^2 + 199.88x - 1760.3 \qquad (4).)$$

In this embodiment, referring to Equation (4) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about $x-0.9$ wt % to $x+1.5$ wt %. Changes in the composition in a target container or equipment can thereby fall within the acceptable range of ±1.5 wt % of the target composition until the transfer is completed.

For the same reason as described earlier, HFC-32 is preferably filled into a feeding container before the transfer in an amount greater than that of the target composition. In the method for filling a refrigerant mixture, in which the composition of HFC-32 in the HFC-32/HFO-1234yf refrigerant mixture is made to fall within the acceptable range of ±1.5 wt % of the target composition in a target container or equipment until the transfer is completed, the upper limit of the composition of HFC-32 in the liquid phase of the HFC-32/HFO-1234yf refrigerant mixture immediately before the transfer is +1.5 wt % of the target composition of HFC-32.

Further, when the mixture contains HFC-32 in an amount of 90 wt %, changes in the composition of HFC-32 are small; therefore, even when the initial composition of HFC-32 is about −0.9 wt % of the target composition (90 wt %), the proportion of HFC-32 in the liquid phase of the mixture falls within ±1.5 wt % of the target composition until the transfer is completed.

(1-5) Filling method that enables the composition of HFC-32 to fall within a range of ±1.0 wt % of the target composition (x) of HFC-32

Hereinafter, an embodiment in which the set tolerance (±a) is ±1.0 is described.

In one embodiment of a method of the present invention for filling a refrigerant mixture comprising HFC-32 and HFO-1234yf in such a manner that HFC-32 is present in the liquid phase in an amount of 10 to 14 wt % or 65 to 90 wt % based on 100 wt % of the total of HFC-32 and HFO-1234yf, in transferring the refrigerant mixture in a liquid state to a target container or equipment from a feeding container, the proportion (initial composition) of HFC-32 in the liquid phase of the refrigerant mixture in the feeding container is preferably adjusted, before the transfer, to $x+y_d$ wt % to $x+1.0$ wt %, so that the proportion of HFC-32 in the liquid phase of the refrigerant mixture in the feeding container falls within a range of ±1.0 wt % of the target composition (x) of HFC-32 during initiation and completion of the transfer. When a=1.0, and $14 < x < 65$, then $y_D > a$; therefore, x is within a range of 10 to 14 wt % or 65 to 90 wt %.

(In the above, x is as defined above; and $y_d$ is a lower limit of a gap between the target composition and the initial composition, and is represented by Equation (5):

$$1000y_D = 0.0160x^3 - 3.5312x^2 + 196.02x - 1210.8 \qquad (5).)$$

In this embodiment, referring to Equation (5) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−0.5 wt % to x+1.0 wt %. Changes in the composition in a target container or equipment can thereby fall within the acceptable range of ±1.0 wt % of the target composition until the transfer is completed.

For the same reason as described earlier, HFC-32 is preferably filled into a feeding container before the transfer in an amount greater than that of the target composition. In the method for filling a refrigerant mixture, in which the composition of HFC-32 in the HFC-32/HFO-1234yf refrigerant mixture is made to fall within the acceptable range of ±1.0 wt % of the target composition in a target container or equipment until the transfer is completed, the upper limit of the composition of HFC-32 in the liquid phase of the HFC-32/HFO-1234yf refrigerant mixture immediately before the transfer is +1.0 wt % of the target composition of HFC-32.

Further, when the mixture contains HFC-32 in an amount of 90 wt %, changes in the composition of HFC-32 are small; therefore, even when the initial composition of HFC-32 is about −0.5 wt % of the target composition (90 wt %), the proportion of HFC-32 in the liquid phase of the mixture falls within ±1.0 wt % of the target composition until the transfer is completed.

(1-6) Method for filling a non-azeotropic refrigerant mixture comprising HFC-32 and HFO-1234yf The concept of a filling method of the present invention is shown below, in relation to an embodiment performed when a container is filled with a non-azeotropic refrigerant mixture comprising HFC-32 and HFO-1234yf in an amount equal to or less than 100 wt % of the maximum filling amount.

tolerance (±a wt %) of the target composition (x) of HFC-32 during initiation and completion of the transfer.

In view of the concept of the present invention described above, when a=1.5, and 32<x<42, then $y_C$>a; therefore, x is within a range of 10 to 32 wt % or 42 to 90 wt %. Further, when a=1.0, and 14<x<65, then $y_D$>a; therefore, x is within a range of 10 to 14 wt % or 65 to 90 wt %.

±a: a set tolerance (a≥0);

x: a target composition, with the proviso that 10≤x≤90, excluding a range satisfying the inequality: $y_1$>a $y_1$: a lower limit of a gap between the target composition and the initial composition, $y_1$ being represented by Equation (1) below:

$$1000y_1 = L_1 x^3 - M_1 x^2 + N_1 x - P_1 \qquad (1)$$

$L_1$=0.0002a+0.016
$M_1$=0.072a+3.4761
$N_1$=7.914a+187.52
$P_1$=1194.8a−9.58.

(2) Filling method in which a refrigerant mixture is filled into a feeding container in an amount equal to or less than 70 wt % of the maximum filling amount calculated by using a value obtained by dividing 1.05 by the specific gravity of the as at 65° C. as the fill constant The mixture ratio is described below in terms of a refrigerant mixture before being transferred to a target container or equipment from a feeding container that is filled with the refrigerant mixture in an amount equal to 70 wt % of the maximum filling amount calculated by using a value obtained by dividing 1.05 by the specific gravity of the gas at 65° C. as the fill constant.

(2-1) Filling method that enables the composition of HFC-32 to fall within a range of ±a wt % of the target composition (x) of HFC-32

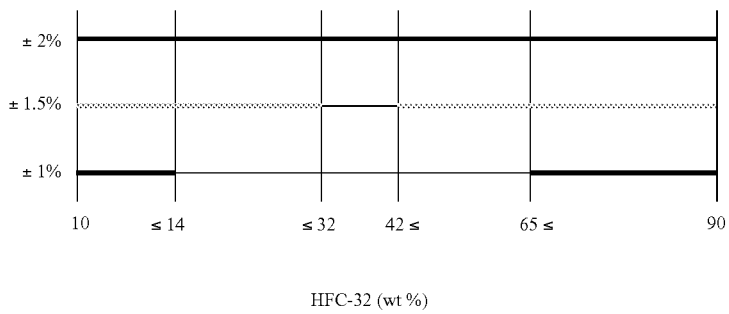

HFC-32 (wt %)

Equation (1) above can be derived from Equations (2) to (5) above. Based on the value of each coefficient of Equations (2) to (5), $L_1$ to $P_1$ of Equation (1) can be calculated from the target composition (x) with respect to the set tolerance (a).

A method of the present invention for filling a refrigerant mixture comprising HFC-32 and HFO-1234yf, the HFC-32 being present in a liquid phase in an amount of 10 to 90 wt % based on 100 wt % of the total of HFC-32 and HFO-1234yf, has the following feature. Specifically, in transferring the refrigerant mixture in a liquid state into a target container or equipment from a feeding container, the proportion (initial composition) of the HFC-32 in the liquid phase of the refrigerant mixture in the feeding container is adjusted immediately before the transfer to x+$y_1$ wt % (minimum value) to x+a wt % (maximum value), so that the proportion of the HFC-32 in the liquid phase of the refrigerant mixture in the feeding container falls within a set tolerance (±a wt %) of the target composition (x) of HFC-32

A method (a gas transfer filling method) of the present invention for filling a refrigerant mixture comprising HFC-32 and HFO-1234yf in such a manner that the HFC-32 is present in the liquid phase in an amount of 10 to 90 wt % based on 100 wt % of the total of HFC-32 and HFO-1234yf, the method being performed in transferring the refrigerant mixture in a liquid state to a target container or equipment from a feeding container that is filled with the refrigerant mixture in an amount equal to or less than 70 wt % of the maximum filling amount of the refrigerant mixture, has the following feature. Specifically, the proportion (initial composition) of HFC-32 in the liquid phase of the refrigerant mixture in the feeding container is adjusted immediately before the transfer to x+$y_2$ wt % (minimum value) to x+a wt % (maximum value), so that the proportion of HFC-32 in the liquid phase of the refrigerant mixture in the feeding container falls within a set tolerance (±a wt %) of the target composition (x) of HFC-32 during initiation and completion of the transfer.

±a: set tolerance (a≥0)

x: target composition (with the proviso that 10≤x≤90, excluding a range satisfying an inequality: $y_2$>a)

$y_2$: a lower limit of a gap between the target composition and the initial composition, $y_2$ being represented by Equation (6) below:

$$1000y_2 = L_2 x^3 - M_2 x^2 + N_2 x - P_2 \quad (6)$$

$L_2 = -0.0016a + 0.0169$ $M_2 = -0.1765a + 3.4316$ $N_2 = -1.87a + 180.08$ $P_2 = 1119.5a + 148.9$.

The "±a" (set tolerance) is a difference between a reference value (a target composition (x) of HFC-32) and an acceptable maximum or minimum value of the reference value. Specifically, the "±a" is an acceptable gap relative to the target composition.

According to the method for filling a refrigerant mixture of the present invention, the proportion of HFC-32 in the liquid phase of the mixture in a feeding container is adjusted before transfer to a specific range; therefore, even when the feeding container is initially filled with the refrigerant mixture in an amount equal to 70 wt % of the maximum filling amount of the refrigerant mixture, changes in the composition in a target container or equipment fall within an acceptable range, i.e., ±a wt % of the target composition, until transfer is completed.

The "target composition" of HFC-32 is the concentration of HFC-32 in the overall composition (liquid phase and vapor phase) of the HFC-32/HFO-1234yf refrigerant mixture, and is calculated in a target container or equipment.

The boiling point of HFC-32 is lower than that of HFO-1234yf. Therefore, when the space created due to extraction of refrigerant is refilled with vapor evaporated from the liquid phase during transfer, HFC-32 evaporates in an amount greater than that of HFO-1234yf, causing a reduction in the HFC-32 concentration in the liquid phase. For this reason, HFC-32 is preferably filled into a feeding container before transfer in an amount greater than that of the target composition. The value a above is generally set to 0.5≤a≤3.0.

Hereinafter, one example is described regarding a method that performs transfer at a handling temperature of 40° C. For the same reason as described earlier, even when the container is filled with the refrigerant mixture in an amount equal to 70 wt % of the maximum filling amount, the conditions for the transfer at a handling temperature of 40° C. can be applied to the conditions for the transfer at a handling temperature ranging from 0 to 40° C.

(2-2) Filling method that enables the composition of HFC-32 to fall within a range of ±2.5 wt % of the target composition (x) of HFC-32

Hereinafter, an embodiment in which the set tolerance (±a) is ±2.5 is described.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 70 wt % of the maximum filling amount of the refrigerant mixture, the proportion (initial composition) of HFC-32 in the liquid phase of the refrigerant mixture in the feeding container is preferably adjusted, before the transfer, to $x+y_E$ wt % to x+2.5 wt %, so that the proportion of HFC-32 in the liquid phase of the refrigerant mixture in the feeding container falls within a range of ±2.5 wt % of the target composition (x) of HFC-32 during initiation and completion of the transfer.

(In the above, x is a target composition, with the proviso that 10≤x≤90; and $y_E$ is a lower limit of a gap between the target composition and the initial composition, and is represented by Equation (7):

$$1000y_E = 0.013x^3 - 3.0285x^2 + 177.93x - 2975.4 \quad (7).$$

In this embodiment, referring to Equation (7) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−2.0 wt % to x+2.5 wt %. Changes in the composition in a target container or equipment can thereby fall within the acceptable range of ±2.5 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±2.5 wt % of the target composition in a target container or equipment until the transfer is completed, the upper limit of the composition of HFC-32 in the liquid phase of the HFC-32/HFO-1234yf refrigerant mixture immediately before the transfer is +2.5 wt % of the target composition of HFC-32.

Further, when the mixture contains HFC-32 in an amount of 90 wt %, changes in the composition of HFC-32 are small; therefore, even when the initial composition of HFC-32 is about −2.0 wt % of the target composition (90 wt %), the proportion of HFC-32 in the liquid phase of the mixture falls within ±2.5 wt % of the target composition until the transfer is completed.

(2-3) Filling method that enables the composition of HFC-32 to fall within a range of ±2.0 wt % of the target composition (x) of HFC-32

Hereinafter, an embodiment in which the set tolerance (±a) is ±2.0 is described.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 70 wt % of the maximum filling amount of the refrigerant mixture, the proportion (initial composition) of HFC-32 in the liquid phase of the refrigerant mixture in the feeding container is preferably adjusted, before the transfer, to $x+y_F$ wt % to x+2.0 wt %, so that the proportion of HFC-32 in the liquid phase of the refrigerant mixture in the feeding container falls within a range of ±2.0 wt % of the target composition (x) of HFC-32 during initiation and completion of the transfer.

(In the above, x is a target composition, with the proviso that 10≤x≤90; and $y_F$ is a lower limit of a gap between the target composition and the initial composition, and is represented by Equation (8):

$$1000y_F=0.0132x^3-2.991x^2+171.39x-2327.0 \qquad (8).$$

In this embodiment, referring to Equation (8) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−1.5 wt % to x+2.0 wt %. Changes in the composition in a target container or equipment can thereby fall within the acceptable range of ±2.0 wt % of the target composition until the transfer is completed.

For the same reason as described earlier, HFC-32 is preferably filled into a feeding container before the transfer in an amount greater than that of the target composition. In the method for filling a refrigerant mixture, in which the composition of HFC-32 in the HFC-32/HFO-1234yf refrigerant mixture is made to fall within the acceptable range of +2.0 wt % of the target composition in a target container or equipment until the transfer is completed, the upper limit of the composition of HFC-32 in the liquid phase of the HFC-32/HFO-1234yf refrigerant mixture immediately before the transfer is +2.0 wt % of the target composition of HFC-32.

Further, when the mixture contains HFC-32 in an amount of 90 wt %, changes in the composition of HFC-32 are small; therefore, even when the initial composition of HFC-32 is about −1.5 wt % of the target composition (90 wt %), the proportion of HFC-32 in the liquid phase of the mixture falls within +2.0 wt % of the target composition until the transfer is completed.

(2-4) Filling method that enables the composition of HFC-32 to fall within a range of ±1.5 wt % of the target composition (x) of HFC-32

Hereinafter, an embodiment in which the set tolerance (±a) is ±1.5 is described.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 70 wt % of the maximum filling amount of the refrigerant mixture, the proportion (initial composition) of HFC-32 in the liquid phase of the refrigerant mixture in the feeding container is preferably adjusted, before the transfer, to x+$y_G$ wt % to x+1.5 wt %, so that the proportion of HFC-32 in the liquid phase of the refrigerant mixture in the feeding container falls within a range of ±1.5 wt % of the target composition (x) of HFC-32 during initiation and completion of the transfer.

(In the above, x is a target composition, with the proviso that 10≤x≤90; and $y_G$ is a lower limit of a gap between the target composition and the initial composition, and is represented by Equation (9):

$$1000y_G=0.0149x^3-3.2273x^2+179.57x-1866.7 \qquad (9)).$$

In this embodiment, referring to Equation (9) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−1.0 wt % to x+1.5 wt %. Changes in the composition in a target container or equipment can thereby fall within the acceptable range of +1.5 wt % of the target composition until the transfer is completed.

For the same reason as described earlier, HFC-32 is preferably filled into a feeding container before the transfer in an amount greater than that of the target composition. In the method for filling a refrigerant mixture, in which the composition of HFC-32 in the HFC-32/HFO-1234yf refrigerant mixture is made to fall within the acceptable range of ±1.5 wt % of the target composition in a target container or equipment until the transfer is completed, the upper limit of the composition of HFC-32 in the liquid phase of the HFC-32/HFO-1234yf refrigerant mixture immediately before the transfer is +1.5 wt % of the target composition of HFC-32.

Further, when the mixture contains HFC-32 in an amount of 90 wt %, changes in the composition of HFC-32 are small; therefore, even when the initial composition of HFC-32 is about −1.0 wt % of the target composition (90 wt %), the proportion of HFC-32 in the liquid phase of the mixture falls within ±1.5 wt % of the target composition until the transfer is completed.

(2-5) Filling method that enables the composition of HFC-32 to fall within a range of ±1.0 wt % of the target composition (x) of HFC-32

Hereinafter, an embodiment in which the set tolerance (±a) is ±1.0 is described.

In one embodiment of a method of the present invention for filling a refrigerant mixture comprising HFC-32 and HFO-1234yf in such a manner that HFC-32 is present in the liquid phase in an amount of 10 to 18 wt % or 60 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 70 wt % of the maximum filling amount of the refrigerant mixture, the proportion (initial composition) of HFC-32 in the liquid phase of the refrigerant mixture in the feeding container is preferably adjusted, before the transfer, to x+$y_H$ wt % to x+1.0 wt %, so that the proportion of HFC-32 in the liquid phase of the refrigerant mixture in the feeding container falls within a range of ±1.0 wt % of the target composition (x) of HFC-32 during initiation and completion of the transfer. When a=1.0, and 18<x<60, then $y_H$>a; therefore, x is within a range of 10 to 18 wt % or 60 to 90 wt %.

(In the above, x is as defined above; and $y_H$ is a lower limit of a gap between the target composition and the initial composition, and is represented by Equation (10):

$$1000y_H=0.0151x^3-3.2439x^2+178.32x-1263.0 \qquad (10).$$

In this embodiment, referring to Equation (10) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−0.5 wt % to x+1.0 wt %. Changes in the composition in a target container or equipment can thereby fall within the acceptable range of ±1.0 wt % of the target composition until the transfer is completed.

For the same reason as described earlier, HFC-32 is preferably filled into a feeding container before the transfer in an amount greater than that of the target composition. In the method for filling a refrigerant mixture, in which the composition of HFC-32 in the HFC-32/HFO-1234yf refrigerant mixture is made to fall within the acceptable range of ±1.0 wt % of the target composition in a target container or equipment until the transfer is completed, the upper limit of the composition of HFC-32 in the liquid phase of the HFC-32/HFO-1234yf refrigerant mixture immediately before the transfer is +1.0 wt % of the target composition of HFC-32.

Further, when the mixture contains HFC-32 in an amount of 90 wt %, changes in the composition of HFC-32 are small; therefore, even when the initial composition of HFC-32 is about −0.5 wt % of the target composition (90 wt %), the proportion of HFC-32 in the liquid phase of the mixture falls within ±1.0 wt % of the target composition until the transfer is completed.

(2-6) Method for filling a non-azeotropic refrigerant mixture comprising HFC-32 and HFO-1234yf The concept of a filling method of the present invention is shown below, in relation to an embodiment performed when a container is filled with a non-azeotropic refrigerant mixture comprising HFC-32 and HFO-1234yf in an amount equal to or less than 70 wt % of the maximum filling amount.

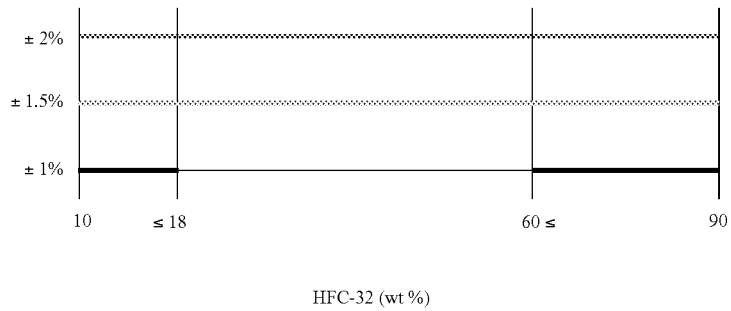

HFC-32 (wt %)

Equation (6) above can be derived from Equations (7) to (10) above. Based on the value of each coefficient of Equations (7) to (10), $L_2$ to $P_2$ of Equation (6) can be calculated from the target composition (x) with respect to the set tolerance (a).

A method of the present invention for filling a refrigerant mixture comprising HFC-32 and HFO-1234yf, the HFC-32 being present in a liquid phase in an amount of 10 to 90 wt % based on 100 wt % of the total of HFC-32 and HFO-1234yf has the following feature. Specifically, in transferring the refrigerant mixture in a liquid state into a target container or equipment from a feeding container that is filled with the refrigerant mixture in an amount equal to or less than 70 wt % of the maximum filling amount of the refrigerant mixture, the proportion (initial composition) of the HFC-32 in the liquid phase of the refrigerant mixture in the feeding container is adjusted immediately before the transfer to $x+y_2$ wt % (minimum value) to $x+a$ wt % (maximum value), so that the proportion of the HFC-32 in the liquid phase of the refrigerant mixture in the feeding container can fall within a set tolerance (±a wt %) of the target composition (x) of HFC-32 during initiation and completion of the transfer.

In view of the concept of the present invention described above, when a=1.0, and 18<x<60, then $y_H$>a; therefore, x is within a range of 10 to 18 wt % or 60 to 90 wt %.

±a: a set tolerance (a≥0);

x: a target composition, with the proviso that 10≤x≤90, excluding a range satisfying the inequality: $y_2$>a $y_2$: a lower limit of a gap between the target composition and the initial composition, $y_2$ being represented by Equation (6) below:

$$1000y_2 = L_2x^3 - M_2x^2 + N_2x - P_2 \qquad (6)$$

$L_2$=−0.0016a+0.0169
$M_2$=−0.1765a+3.4316
$N_2$=−1.87a+180.08
$P_2$=1119.5a+148.9.

(3) Filling method in which a refrigerant mixture is filled into a feeding container in an amount equal to the maximum filling amount calculated by using a value obtained by dividing 1.05 by the specific gravity of the gas at 45° C. as the fill constant The mixture ratio is described below in terms of a refrigerant mixture before being transferred to a target container or equipment from a feeding container that is filled with the refrigerant mixture in an amount equal to or less than 100 wt % of the maximum filling amount calculated by using a value obtained by dividing 1.05 by the specific gravity of the gas at 45° C. as the fill constant.

(3-1) Filling method that enables the composition of HFC-32 to fall within a range of ±a wt % of the target composition (x) of HFC-32

A method (a gas transfer filling method) of the present invention for filling a refrigerant mixture comprising HFC-32 and HFO-1234yf in such a manner that the HFC-32 is present in the liquid phase in an amount of 10 to 90 wt % based on 100 wt % of the total of HFC-32 and HFO-1234yf, the method being performed in transferring the refrigerant mixture in a liquid state to a target container or equipment from a feeding container that is filled with the refrigerant mixture, has the following feature. Specifically, the proportion (initial composition) of HFC-32 in the liquid phase of the refrigerant mixture in the feeding container is adjusted immediately before the transfer to $x+y_3$ wt % (minimum value) to $x±a$ wt % (maximum value), so that the proportion of HFC-32 in the liquid phase of the refrigerant mixture in the feeding container falls within a set tolerance (±a wt %) of the target composition (x) of HFC-32 during initiation and completion of the transfer.

±a: set tolerance (a≥0)

x: target composition (with the proviso that 10≤x≤90, excluding a range satisfying an inequality: $y_3$>a)

$y_3$: a lower limit of a gap between the target composition and the initial composition, $y_3$ being represented by Equation (11) below:

$$1000y_3 = L_3x^3 - M_3x^2 + N_3x - P_3 \qquad (11)$$

$L_3$=0.0003a+0.0172
$M_3$=0.0962a+3.6851
$N_3$=9.704a+196.9
$P_3$=1241.2a−93.54.

The "±a" (set tolerance) is a difference between a reference value (a target composition (x) of HFC-32) and an acceptable maximum or minimum value of the reference value. Specifically, the "±a" is an acceptable gap relative to the target composition.

According to the method for filling a refrigerant mixture of the present invention, the proportion of HFC-32 in the liquid phase of the mixture in a feeding container is adjusted before transfer to a specific range; therefore, even when the feeding container is filled with the refrigerant mixture in an amount equal to 100 wt % of the maximum filling amount of the refrigerant mixture, changes in the composition in a target container or equipment fall within an acceptable range, i.e., ±a wt % of the target composition, until transfer is completed.

The "target composition" of HFC-32 is the concentration of HFC-32 in the overall composition (liquid phase and vapor phase) of the HFC-32/HFO-1234yf refrigerant mixture, and is calculated in a target container or equipment.

The boiling point of HFC-32 is lower than that of HFO-1234yf. Therefore, when the space created due to extraction of refrigerant is refilled with vapor evaporated from the liquid phase during transfer, HFC-32 evaporates in an amount greater than that of HFO-1234yf, causing a reduction in the HFC-32 concentration in the liquid phase. For this reason, HFC-32 is preferably filled into a feeding container before transfer in an amount greater than that of the target composition. The value a above is generally set to $0.5 \leq a \leq 3.0$.

Hereinafter, one example is described regarding a method that performs transfer at a handling temperature of 40° C. For example, according to the High Pressure Gas Safety Act of Japan, etc., handling a container at a temperature of 40° C. or more is prohibited; therefore, the handling temperature is basically 0 to 40° C. when transfer is performed. A higher temperature during transfer (at the time of handling) causes a larger composition change associated with the transfer. Therefore, the conditions for the transfer at a handling temperature of 40° C. can also be applied to the conditions for the transfer at a handling temperature ranging from 0 to 40° C.

(3-2) Filling method that enables the composition of HFC-32 to fall within a range of ±2.5 wt % of the target composition (x) of HFC-32

Hereinafter, an embodiment in which the set tolerance (±a) is ±2.5 is described.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container, the proportion (initial composition) of HFC-32 in the liquid phase of the refrigerant mixture in the feeding container is preferably adjusted, before the transfer, to $x+y_1$ wt % to x+2.5 wt %, so that the proportion of HFC-32 in the liquid phase of the refrigerant mixture in the feeding container falls within a range of ±2.5 wt % of the target composition (x) of HFC-32 during initiation and completion of the transfer.

(In the above, x is a target composition, with the proviso that $10 \leq x \leq 90$; and $y_1$ is a lower limit of a gap between the target composition and the initial composition, and is represented by Equation (12):

$$1000y_1 = 0.0181x^3 - 3.9611x^2 + 223.1x - 3040.4 \quad (12).)$$

In this embodiment, referring to Equation (12) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to x−1.8 wt % to x+2.5 wt %. Changes in the composition in a target container or equipment can thereby fall within the acceptable range of ±2.5 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±2.5 wt % of the target composition in a target container or equipment until the transfer is completed, the upper limit of the composition of HFC-32 in the liquid phase of the HFC-32/HFO-1234yf refrigerant mixture immediately before the transfer is +2.5 wt % of the target composition of HFC-32.

Further, when the mixture contains HFC-32 in an amount of 90 wt %, changes in the composition of HFC-32 are small; therefore, even when the initial composition of HFC-32 is about −1.8 wt % of the target composition (90 wt %), the proportion of HFC-32 in the liquid phase of the mixture falls within ±2.5 wt % of the target composition until the transfer is completed.

(3-3) Filling method that enables the composition of HFC-32 to fall within a range of ±2.0 wt % of the target composition (x) of HFC-32

Hereinafter, an embodiment in which the set tolerance (±a) is ±2.0 is described.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container, the proportion (initial composition) of HFC-32 in the liquid phase of the refrigerant mixture in the feeding container is preferably adjusted, before the transfer, to $x+y_j$ wt % to x+2.0 wt %, so that the proportion of HFC-32 in the liquid phase of the refrigerant mixture in the feeding container falls within a range of ±2.0 wt % of the target composition (x) of HFC-32 during initiation and completion of the transfer.

(In the above, x is a target composition, with the proviso that $10 \leq x \leq 90$; and $y_j$ is a lower limit of a gap between the target composition and the initial composition, and is represented by Equation (13):

$$1000y_j = 0.0177x^3 - 3.8614x^2 + 215.42x - 2373.5 \quad (13).)$$

In this embodiment, referring to Equation (13) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−1.3 wt % to x+2.0 wt %. Changes in the composition in a target container or equipment can thereby fall within the acceptable range of ±2.0 wt % of the target composition until the transfer is completed.

For the same reason as described earlier, HFC-32 is preferably filled into a feeding container before the transfer in an amount greater than that of the target composition. In the method for filling a refrigerant mixture, in which the composition of HFC-32 in the HFC-32/HFO-1234yf refrigerant mixture is made to fall within the acceptable range of ±2.0 wt % of the target composition in a target container or equipment until the transfer is completed, the upper limit of the composition of HFC-32 in the liquid phase of the HFC-32/HFO-1234yf refrigerant mixture immediately before the transfer is +2.0 wt % of the target composition of HFC-32.

Further, when the mixture contains HFC-32 in an amount of 90 wt %, changes in the composition of HFC-32 are small; therefore, even when the initial composition of HFC-32 is about −1.3 wt % of the target composition (90 wt %), the proportion of HFC-32 in the liquid phase of the mixture falls within ±2.0 wt % of the target composition until the transfer is completed.

(3-4) Filling method that enables the composition of HFC-32 to fall within a range of ±1.5 wt % of the target composition (x) of HFC-32

Hereinafter, an embodiment in which the set tolerance (±a) is ±1.5 is described.

In one embodiment of a method of the present invention for filling a refrigerant mixture comprising HFC-32 and HFO-1234yf in such a manner that HFC-32 is present in the liquid phase in an amount of 10 to 26.5 wt % or 47.5 to 90 wt % based on 100 wt % of the total of HFC-32 and HFO-1234yf, in transferring the refrigerant mixture in a liquid state to a target container or equipment from a feeding container, the proportion (initial composition) of HFC-32 in the liquid phase of the refrigerant mixture in the feeding container is preferably adjusted, before the transfer, to $x+y_K$ wt % to $x+1.5$ wt %, so that the proportion of HFC-32 in the liquid phase of the refrigerant mixture in the feeding container falls within a range of ±1.5 wt % of the target composition (x) of HFC-32 during initiation and completion of the transfer. When a=1.5, and 26.5<x<47.5, then $y_K$>a; therefore, x is within a range of 10 to 26.5 wt % or 47.5 to 90 wt %.

(In the above, x is a target composition; and $y_K$ is a lower limit of a gap between the target composition and the initial composition, and is represented by Equation (14):

$$1000y_K=0.0172x^3-3.7549x^2+207.43x-1705.9 \qquad (14).)$$

In this embodiment, referring to Equation (14) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−0.9 wt % to x+1.5 wt %. Changes in the composition in a target container or equipment can thereby fall within the acceptable range of ±1.5 wt % of the target composition until the transfer is completed.

For the same reason as described earlier, HFC-32 is preferably filled into a feeding container before the transfer in an amount greater than that of the target composition. In the method for filling a refrigerant mixture, in which the composition of HFC-32 in the HFC-32/HFO-1234yf refrigerant mixture is made to fall within the acceptable range of ±1.5 wt % of the target composition in a target container or equipment until the transfer is completed, the upper limit of the composition of HFC-32 in the liquid phase of the HFC-32/HFO-1234yf refrigerant mixture immediately before the transfer is +1.5 wt % of the target composition of HFC-32.

Further, when the mixture contains HFC-32 in an amount of 90 wt %, changes in the composition of HFC-32 are small; therefore, even when the initial composition of HFC-32 is about −0.9 wt % of the target composition (90 wt %), the proportion of HFC-32 in the liquid phase of the mixture falls within ±1.5 wt % of the target composition until the transfer is completed.

(3-5) Filling method that enables the composition of HFC-32 to fall within a range of ±1.0 wt % of the target composition (x) of HFC-32

Hereinafter, an embodiment in which the set tolerance (±a) is ±1.0 is described.

In one embodiment of a method of the present invention for filling a refrigerant mixture comprising HFC-32 and HFO-1234yf in such a manner that HFC-32 is present in the liquid phase in an amount of 10 to 13.5 wt % or 67 to 90 wt % based on 100 wt % of the total of HFC-32 and HFO-1234yf, in transferring the refrigerant mixture in a liquid state to a target container or equipment from a feeding container, the proportion (initial composition) of HFC-32 in the liquid phase of the refrigerant mixture in the feeding container is preferably adjusted, before the transfer, to $x+y_L$ wt % to $x+1.0$ wt %, so that the proportion of HFC-32 in the liquid phase of the refrigerant mixture in the feeding container falls within a range of ±1.0 wt % of the target composition (x) of HFC-32 during initiation and completion of the transfer. When a=1.0, and 13.5<x<67, then $y_L$>a; therefore, x is within a range of 10 to 13.5 wt % or 67 to 90 wt %.

(In the above, x is as defined above, with the proviso that 10≤x≤13.5 or 67≤x≤90; and $y_L$ is a lower limit of a gap between the target composition and the initial composition, and is represented by Equation (5):

$$1000y_L=0.0178x^3-3.8363x^2+209.59x-1194.3 \qquad (15).)$$

In this embodiment, referring to Equation (15) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−0.4 wt % to x+1.0 wt %. Changes in the composition in a target container or equipment can thereby fall within the acceptable range of ±1.0 wt % of the target composition until the transfer is completed.

For the same reason as described earlier, HFC-32 is preferably filled into a feeding container before the transfer in an amount greater than that of the target composition. In the method for filling a refrigerant mixture, in which the composition of HFC-32 in the HFC-32/HFO-1234yf refrigerant mixture is made to fall within the acceptable range of ±1.0 wt % of the target composition in a target container or equipment until the transfer is completed, the upper limit of the composition of HFC-32 in the liquid phase of the HFC-32/HFO-1234yf refrigerant mixture immediately before the transfer is +1.0 wt % of the target composition of HFC-32.

Further, when the mixture contains HFC-32 in an amount of 90 wt %, changes in the composition of HFC-32 are small; therefore, even when the initial composition of HFC-32 is about −0.4 wt % of the target composition (90 wt %), the proportion of HFC-32 in the liquid phase of the mixture falls within ±1.0 wt % of the target composition until the transfer is completed.

(3-6) Method for filling a non-azeotropic refrigerant mixture comprising HFC-32 and HFO-1234yf The concept of a filling method of the present invention is shown below, in relation to an embodiment performed when a container is filled with a non-azeotropic refrigerant mixture comprising HFC-32 and HFO-1234yf in an amount equal to or less than 100 wt % of the maximum filling amount.

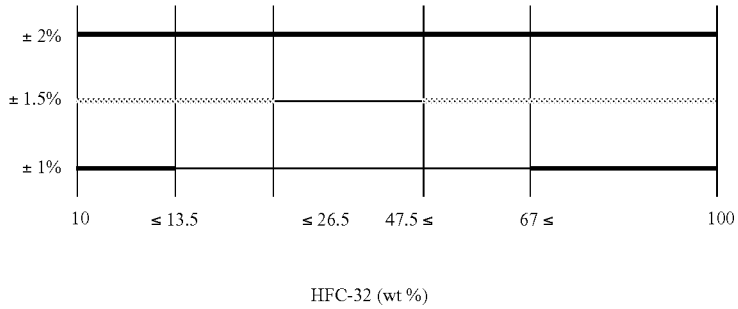

HFC-32 (wt %)

Equation (11) above can be derived from Equations (12) to (15) above. Based on the value of each coefficient of Equations (12) to (15), $L_3$ to $P_3$ of Equation (11) can be calculated from the target composition (x) with respect to the set tolerance (a).

A method of the present invention for filling a refrigerant mixture comprising HFC-32 and HFO-1234yf, the HFC-32 being present in a liquid phase in an amount of 10 to 90 wt % based on 100 wt % of the total of HFC-32 and HFO-1234yf has the following feature. Specifically, in transferring the refrigerant mixture in a liquid state into a target container or equipment from a feeding container, the proportion (initial composition) of the HFC-32 in the liquid phase of the refrigerant mixture in the feeding container is adjusted immediately before the transfer to $x+y_3$ wt % (minimum value) to $x±a$ wt % (maximum value), so that the proportion of the HFC-32 in the liquid phase of the refrigerant mixture in the feeding container can fall within a set tolerance (±a wt %) of the target composition (x) of HFC-32 during initiation and completion of the transfer.

In view of the concept of the present invention described above, when a=1.5, and 26.5<x<47.5, then $y_R$>a; therefore, x is within a range of 10 to 26.5 wt % or 47.5 to 90 wt %. Further, when a=1.0, and 13.5<x<67, then $y_L$>a; therefore, x is within a range of 10 to 13.5 wt % or 67 to 90 wt %.

±a: a set tolerance (a≥0);

x: a target composition, with the proviso that 10≤x≤90, excluding a range satisfying the inequality: $y_3$>a $y_3$: a lower limit of a gap between the target composition and the initial composition, $y_3$ being represented by Equation (11) below:

$$1000y_3 = L_3x^3 - M_3x^2 + N_3x - P_3 \quad (11)$$

$L_3$=0.0003a+0.0172
$M_3$=0.0962a+3.6851
$N_3$=9.704a+196.9
$P_3$=1241.2a−93.54.

(4) Filling method in which the refrigerant mixture is filled into a container in an amount less than the filling amount calculated by using a value obtained by dividing 1.05 by the specific gravity of the gas at 45° C. as the fill constant, and greater than 70 wt % of the filling amount calculated by using a value obtained by dividing 1.05 by the specific gravity of the gas at 65° C. as the fill constant In transfer of a HFC-32/HFO-1234yf refrigerant mixture to a target container or equipment from a feeding container, a smaller amount of the mixture initially filled into the feeding container results in a smaller change in the composition of HFC-32 in the liquid phase of the refrigerant mixture in the feeding container during initiation and completion of the transfer.

In terms of transfer of a HFC-32/HFO-1234yf refrigerant mixture, from the standpoint of a refrigerant mixture as a product, it is less likely to perform transfer when a feeding container is initially filled with the refrigerant mixture in an amount equal to or less than 70 wt % of the maximum filling amount. Specifically, when transfer is performed, the filling is assumed to be 70 to 100 wt %. Therefore, the conditions for transfer performed when the filling amount of the refrigerant mixture is 70 wt % of the maximum filling amount calculated by using a value obtained by dividing 1.05 by the specific gravity of the gas at 65° C. as the fill constant, and the conditions for transfer performed when the filling amount of the refrigerant mixture is 100 wt % of the maximum filling amount calculated by using a value obtained by dividing 1.05 by the specific gravity of the gas at 45° C. as the fill constant, can be applied to obtain conditions for transfer performed when the filling amount of the refrigerant mixture is in a range between 70 wt % of the maximum filling amount calculated by using a value obtained by dividing 1.05 by the specific gravity of the gas at 65° C. as the fill constant and 100 wt % of the maximum filling amount calculated by using a value obtained by dividing 1.05 by the specific gravity of the gas at 45° C. as the fill constant.

[2] Filling method for each set tolerance

The mixture ratio is described below in terms of a refrigerant mixture before being transferred to a target container or equipment from a feeding container that is filled with the refrigerant mixture in an amount equal to a maximum filling amount (100 wt % of a maximum filling amount) of the refrigerant mixture.

The term "maximum filling amount" (100 wt % of the maximum filling amount) used herein refers to a maximum amount that can be filled into a container, as defined in international law regarding transportation or in the High Pressure Gas Safety Act of Japan. According to the High Pressure Gas Safety Act of Japan, the maximum filling amount is calculated as below:

$$G=V/C$$

G: Mass (kg) of fluorocarbon
V: Capacity (L) of the container
C: Constant according to the type of fluorocarbon The fill constant C here is determined in Japan as a value obtained by dividing 1.05 by the specific gravity of the gas at 48° C. When export is involved, according to international law, fill constant C is defined as a value obtained by dividing 1.05 by the specific gravity of the gas at 65° C. when passing through tropical regions, and it is defined as a value obtained by dividing 1.05 by the specific gravity of the gas at 45° C. when only regions other than tropical regions are involved.

In transfer of a HFC-32/HFO-1234yf refrigerant mixture to a target container or equipment from a feeding container, a smaller amount of the mixture initially filled into the feeding container results in a smaller change in the composition of HFC-32 in the liquid phase of the refrigerant mixture in the feeding container during initiation and completion of the transfer.

Hereinafter, the maximum filling amount (100 wt % of the maximum filling amount) of the refrigerant mixture refers to a value calculated by using a fill constant obtained by dividing 1.05 by the specific gravity of the gas at 45° C.

(1) Filling method (set tolerance (±a): ±2.0 wt %)

The mixture ratio is described below in terms of a refrigerant mixture before being transferred to a target container or equipment from a feeding container. The use of the mixture ratio enables the proportion of HFC-32 in the liquid phase of the refrigerant mixture in the feeding container to fall within a range of ±2.0 wt % of the target composition (x) of HFC-32 during initiation and completion of the transfer.

The "±a" (set tolerance) is a difference between a reference value (a target composition (x) of HFC-32) and an acceptable maximum or minimum value of the reference value. Specifically, the "±a" is an acceptable gap relative to the target composition.

The "target composition" of HFC-32 is the concentration of HFC-32 in the overall composition (liquid phase and vapor phase) of the HFC-32/HFO-1234yf refrigerant mixture, and is calculated in a target container or equipment.

(1-1) Filling method that enables the composition of HFC-32 to fall within a range of ±2.0 wt % of the target composition (x) of HFC-32

A method (a gas transfer filling method) of the present invention for filling a refrigerant mixture comprising HFC-32 and HFO-1234yf in such a manner that the HFC-32 is present in the liquid phase in an amount of 10 to 90 wt % based on 100 wt % of the total of HFC-32 and HFO-1234yf, the method being performed in transferring the refrigerant mixture in a liquid state to a target container or equipment from a feeding container that is filled with the refrigerant mixture in an arbitrarily adjusted amount has the following feature. Specifically, the proportion (initial composition) of HFC-32 in the liquid phase of the refrigerant mixture in the feeding container is adjusted immediately before the transfer to $x+y_4$ wt % (minimum value) to $x+2.0$ wt % (maximum value), so that the proportion of HFC-32 in the liquid phase of the refrigerant mixture in the feeding container falls within a range of ±2.0 wt % of a target composition (x) of HFC-32 during initiation and completion of the transfer.

b: an amount (wt %) initially filled into the feeding container x: target composition (with the proviso that $10 \leq x \leq 90$, excluding a range satisfying an inequality: $y_4 > 2$)

$y_4$: a lower limit of a gap between the target composition and the initial composition, $y_4$ being represented by Equation (16) below:

$$1000y_4 = L_4x^3 - M_4x^2 + N_4x - P_4 \quad (16)$$

$L_4 = 0.0001b + 0.0081$
$M_4 = 0.0195b + 1.958$
$N_4 = 0.9878b + 118.91$
$P_4 = -0.176b + 2408.7$.

According to the method for filling a refrigerant mixture of the present invention, the proportion of HFC-32 in the liquid phase of the mixture in a feeding container is adjusted, before transfer, to a specific range; therefore, even when the feeding container is filled with the refrigerant mixture in an amount equal to 100 wt % of the maximum filling amount, changes in the composition in a target container or equipment fall within an acceptable range, i.e., ±2.0 wt % of the target composition, until transfer is completed.

The boiling point of HFC-32 is lower than that of HFO-1234yf. Therefore, when the space created due to extraction of refrigerant is refilled with vapor evaporated from the liquid phase during transfer, HFC-32 evaporates in an amount greater than that of HFO-1234yf, causing a reduction in the HFC-32 concentration in the liquid phase. For this reason, HFC-32 is preferably filled into a feeding container before transfer in an amount greater than that of the target composition.

The value b above is generally set to 60 b 100.

Hereinafter, one example is described regarding a method that performs transfer at a handling temperature of 40° C. For example, according to the High Pressure Gas Safety Act of Japan, handling a container at a temperature of 40° C. or more is prohibited; therefore, particularly in Japan, the handling temperature is 0 to 40° C. when transfer is performed. A higher temperature during transfer (at the time of handling) causes a larger composition change associated with the transfer. Therefore, the conditions for the transfer at a handling temperature of 40° C. can be applied to the conditions for the transfer at a handling temperature ranging from 0 to 40° C.

Moreover, regarding the filling amount in a feeding container, when the refrigerant mixture in a liquid state is transferred to a target container or equipment from the feeding container, a smaller initial filling amount results in a smaller composition change associated with the transfer during initiation and completion of the transfer. Therefore, an equation that satisfies a filling method in which the initial filling amount is b wt % is also satisfied in a filling method in which the initial filling amount is b wt % or less. For example, an equation that satisfies a filling method in which the initial filling amount is 100 wt % is also satisfied in a filling method in which the initial filling amount is 100 to 0 wt %. An equation that satisfies a filling method in which the initial filling amount is 90 wt % is also satisfied in a filling method in which the initial filling amount is 90 to 0 wt %. An equation that satisfies a filling method in which the initial filling amount is 80 wt % is also satisfied in a filling method in which the initial filling amount is 80 to 0 wt %. An equation that satisfies a filling method in which the initial filling amount is 70 wt % is also satisfied in a filling method in which the initial filling amount is 70 to 0 wt %. An equation that satisfies a filling method in which the initial filling amount is 60 wt % is also satisfied in a filling method in which the initial filling amount is 60 to 0 wt %.

(1-2) Filling method in which the refrigerant mixture is filled into a container in an amount equal to 100 wt % of the maximum filling amount Hereinafter, an embodiment is described in which the refrigerant mixture is filled into a container in an amount equal to 100 wt % of the maximum filling amount of the refrigerant mixture and in which the composition of HFC-32 falls within a range of ±2.0 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 100 wt % of the maximum filling amount of the refrigerant mixture, the proportion (initial composition) of HFC-32 in the liquid phase of the refrigerant mixture in the feeding container is preferably adjusted, before the transfer, to $x+y_{P1}$ wt % to $x+2.0$ wt %, so that the proportion of HFC-32 in the liquid phase of the refrigerant mixture in the feeding container falls within a range of ±2.0 wt % of a target composition (x) of HFC-32 during initiation and completion of the transfer.

(In the above, x is a target composition, with the proviso that 10≤x≤90; and $y_{P1}$ is a lower limit of a gap between the target composition and the initial composition, and is represented by Equation (17):

$$1000y_{P1}=0.0177x^3-3.8614x^2+215.42x-2373.5 \qquad (17).$$

In this embodiment, referring to Equation (17) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−1.3 wt % to x+2.0 wt %. Changes in the composition in a target container or equipment can thereby fall within the acceptable range of ±2.0 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±2.0 wt % of the target composition in a target container or equipment until the transfer is completed, the upper limit of the composition of HFC-32 in the liquid phase of the HFC-32/HFO-1234yf refrigerant mixture immediately before the transfer is +2.0 wt % of the target composition of HFC-32.

Further, when the mixture contains HFC-32 in an amount of 90 wt %, changes in the composition of HFC-32 are small; therefore, even when the initial composition of HFC-32 is about −1.3 wt % of the target composition (90 wt %), the proportion of HFC-32 in the liquid phase of the mixture falls within ±2.0 wt % of the target composition until the transfer is completed.

(1-3) Filling method in which the refrigerant mixture is filled into a container in an amount equal to 90 wt % of the maximum filling amount Hereinafter, an embodiment is described in which the refrigerant mixture is filled into a container in an amount equal to 90 wt % of the maximum filling amount of the refrigerant mixture and in which the composition of HFC-32 falls within a range of ±2.0 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 90 wt % of the maximum filling amount of the refrigerant mixture, the proportion (initial composition) of HFC-32 in the liquid phase of the refrigerant mixture in the feeding container is preferably adjusted, before the transfer, to $x+y_1$, 2 wt % to $x+2.0$ wt %, so that the proportion of HFC-32 in the liquid phase of the refrigerant mixture in the feeding container falls within a range of ±2.0 wt % of a target composition (x) of HFC-32 during initiation and completion of the transfer.

(In the above, x is a target composition, with the proviso that 10≤x≤90; and $y_{P2}$ is a lower limit of a gap between the target composition and the initial composition, and is represented by Equation (18):

$$1000y_{P2}=0.0172x^3-3.7532x^2+210.1x-2419.3 \qquad (18).$$

In this embodiment, referring to Equation (18) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−1.3 wt % to x+2.0 wt %. Changes in the composition in a target container or equipment can thereby fall within the acceptable range of ±2.0 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±2.0 wt % of the target composition in a target container or equipment until the transfer is completed, the upper limit of the composition of HFC-32 in the liquid phase of the HFC-32/HFO-1234yf refrigerant mixture immediately before the transfer is +2.0 wt % of the target composition of HFC-32.

Further, when the mixture contains HFC-32 in an amount of 90 wt %, changes in the composition of HFC-32 are small; therefore, even when the initial composition of HFC-32 is about −1.3 wt % of the target composition (90 wt %), the proportion of HFC-32 in the liquid phase of the mixture falls within ±2.0 wt % of the target composition until the transfer is completed.

(1-4) Filling method in which the refrigerant mixture is filled into a container in an amount equal to 80 wt % of the maximum filling amount Hereinafter, an embodiment is described in which the refrigerant mixture is filled into a container in an amount equal to 80 wt % of the maximum filling amount of the refrigerant mixture and in which the composition of HFC-32 falls within a range of ±2.0 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 80 wt % of the maximum filling amount of the refrigerant mixture, the proportion (initial composition) of HFC-32 in the liquid phase of the refrigerant mixture in the feeding container is preferably adjusted, before the transfer, to $x+y_{P3}$ wt % to $x+2.0$ wt %, so that the proportion of HFC-32 in the liquid phase of the refrigerant mixture in the feeding container falls within a range of ±2.0% of a target composition (x) of HFC-32 during initiation and completion of the transfer.

(In the above, x is a target composition, with the proviso that $10 \le x \le 90$; and $y_{P3}$ is a lower limit of a gap between the target composition and the initial composition, and is represented by Equation (19):

$$1000y_{P3}=0.0160x^3-3.5202x^2+198.2x-2382.2 \qquad (19).$$

In this embodiment, referring to Equation (19) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−1.4 wt % to x+2.0 wt %. Changes in the composition in a target container or equipment can thereby fall within the acceptable range of ±2.0 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±2.0 wt % of the target composition in a target container or equipment until the transfer is completed, the upper limit of the composition of HFC-32 in the liquid phase of the HFC-32/HFO-1234yf refrigerant mixture immediately before the transfer is +2.0 wt % of the target composition of HFC-32.

Further, when the mixture contains HFC-32 in an amount of 90 wt %, changes in the composition of HFC-32 are small; therefore, even when the initial composition of HFC-32 is about −1.4 wt % of the target composition (90 wt %), the proportion of HFC-32 in the liquid phase of the mixture falls within ±2.0 wt % of the target composition until the transfer is completed.

(1-5) Filling method in which the refrigerant mixture is filled into a container in an amount equal to 70 wt % of the maximum filling amount Hereinafter, an embodiment is described in which the refrigerant mixture is filled into a container in an amount equal to 70 wt % of the maximum filling amount of the refrigerant mixture and in which the composition of HFC-32 falls within a range of ±2.0 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 70 wt % of the maximum filling amount of the refrigerant mixture, the proportion (initial composition) of HFC-32 in the liquid phase of the refrigerant mixture in the feeding container is preferably adjusted, before the transfer, to $x+y_{P4}$ wt % to $x+2.0$ wt %, so that the proportion of HFC-32 in the liquid phase of the refrigerant mixture in the feeding container falls within a range of ±2.0% of a target composition (x) of HFC-32 during initiation and completion of the transfer.

(In the above, x is a target composition, with the proviso that $10 \le x \le 90$; and $y_{P4}$ is a lower limit of a gap between the target composition and the initial composition, and is represented by Equation (20):

$$1000y_{P4}=0.0152x^3-3.3513x^2+189.76x-2412.5 \qquad (20).$$

In this embodiment, referring to Equation (20) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−1.4 wt % to x+2.0 wt %. Changes in the composition in a target container or equipment can thereby fall within the acceptable range of ±2.0 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±2.0 wt % of the target composition in a target container or equipment until the transfer is completed, the upper limit of the composition of HFC-32 in the liquid phase of the HFC-32/HFO-1234yf refrigerant mixture immediately before the transfer is +2.0 wt % of the target composition of HFC-32.

Further, when the mixture contains HFC-32 in an amount of 90 wt %, changes in the composition of HFC-32 are small; therefore, even when the initial composition of HFC-32 is about −1.4 wt % of the target composition (90 wt %), the proportion of HFC-32 in the liquid phase of the mixture falls within ±2.0 wt % of the target composition until the transfer is completed.

(1-6) Filling method in which the refrigerant mixture is filled into a container in an amount equal to 60 wt % of the maximum filling amount Hereinafter, an embodiment is described in which the refrigerant mixture is filled into a container in an amount equal to 60 wt % of the maximum filling amount of the refrigerant mixture and in which the composition of HFC-32 falls within a range of ±2.0 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 60 wt % of the maximum filling amount of the refrigerant mixture, the proportion (initial composition) of HFC-32 in the liquid phase of the refrigerant mixture in the feeding container is preferably adjusted, before the transfer, to $x+y_{P5}$ wt % to $x+2.0$ wt %, so that the proportion of HFC-32 in the liquid phase of the refrigerant mixture in the feeding container falls within a range of +2.0% of a target composition (x) of HFC-32 during initiation and completion of the transfer.

(In the above, x is a target composition, with the proviso that 10≤x≤90; and $y_{P5}$ is a lower limit of a gap between the target composition and the initial composition, and is represented by Equation (21):

$$1000y_{P5}=0.0138x^3-3.0892x^2+176.2x-2385.7 \qquad (21).)$$

In this embodiment, referring to Equation (21) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−1.4 wt % to x+2.0 wt %. Changes in the composition in a target container or equipment can thereby fall within the acceptable range of ±2.0 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±2.0 wt % of the target composition in a target container or equipment until the transfer is completed, the upper limit of the composition of HFC-32 in the liquid phase of the HFC-32/HFO-1234yf refrigerant mixture immediately before the transfer is +2.0 wt % of the target composition of HFC-32.

Further, when the mixture contains HFC-32 in an amount of 90 wt %, changes in the composition of HFC-32 are small; therefore, even when the initial composition of HFC-32 is about −1.4 wt % of the target composition (90 wt %), the proportion of HFC-32 in the liquid phase of the mixture falls within ±2.0 wt % of the target composition until the transfer is completed.

(1-7) Method for filling a non-azeotropic refrigerant mixture comprising HFC-32 and HFO-1234yf The concept of a filling method of the present invention is shown below, in relation to an embodiment in which the composition of HFC-32 falls within ±2.0 wt % of the target composition (x) of HFC-32 during initiation and completion of transfer.

Equation (16) above can be derived from Equations (17) to (21) above. Based on the value of each coefficient of Equations (17) to (21), $L_4$ to $P_4$ of Equation (16) can be calculated from the target composition (x) with respect to the initial filling amount (b).

A method of the present invention for filling a mixed refrigerant comprising HFC-32 and HFO-1234yf, the HFC-32 being present in a liquid phase in an amount of 10 to 90 wt % based on 100 wt % of the total of HFC-32 and HFO-1234yf, has the following feature. Specifically, in transferring the refrigerant mixture in a liquid state into a target container or equipment from a feeding container, the proportion (initial composition) of the HFC-32 in the liquid phase of the refrigerant mixture in the feeding container is adjusted immediately before the transfer to x+$y_4$ wt % (minimum value) to x+2.0 wt % (maximum value), so that the proportion of the HFC-32 in the liquid phase of the refrigerant mixture in the feeding container falls within a set tolerance (±2.0 wt %) of the target composition (x) of HFC-32 during initiation and completion of the transfer.

b: an amount (wt %) initially filled into the feeding container;

x: a target composition, with the proviso that 10≤x≤90, excluding a range satisfying the inequality: $y_4$>2

$y_4$: a lower limit of a gap between the target composition and the initial composition, $y_4$ being represented by Equation (16) below:

$$1000y_4=L_4x^3-M_4x^2+N_4x-P_4 \qquad (16)$$

$L_4$=0.0001b+0.0081
$M_4$=0.0195b+1.958
$N_4$=0.9878b+118.91
$P_4$=−0.176b+2408.7.

(2) Filling method (set tolerance (±a): ±1.5 wt %)

The mixture ratio is described below in terms of a refrigerant mixture before being transferred to a target container or equipment from a feeding container. The use of the mixture ratio enables the proportion of HFC-32 in the liquid phase of the refrigerant mixture in the feeding container to fall within a range of ±1.5 wt % of the target composition (x) of HFC-32 during initiation and completion of the transfer.

(2-1) Filling method that enables the composition of HFC-32 to fall within a range of ±1.5 wt % of the target composition (x) of HFC-32

A method (a gas transfer filling method) of the present invention for filling a refrigerant mixture comprising HFC-32 and HFO-1234yf in such a manner that the HFC-32 is present in the liquid phase in an amount of 10 to 90 wt % based on 100 wt % of the total of HFC-32 and HFO-1234yf, the method being performed in transferring the refrigerant mixture in a liquid state to a target container or equipment from a feeding container that is filled with the refrigerant mixture in an arbitrarily adjusted amount has the following feature. Specifically, the proportion (initial composition) of HFC-32 in the liquid phase of the refrigerant mixture in the feeding container is adjusted immediately before the transfer to x+$y_5$ wt % (minimum value) to x+1.5 wt % (maximum value), so that the proportion of HFC-32 in the liquid phase of the refrigerant mixture in the feeding container falls within a range of ±1.5 wt % of a target composition (x) of HFC-32 during initiation and completion of the transfer.

b: an amount (wt %) initially filled into the feeding container x: target composition (with the proviso that 10≤x≤90, excluding a range satisfying an inequality: $y_5$>1.5)

$y_5$: a lower limit of a gap between the target composition and the initial composition, $y_5$ being represented by Equation (22) below:

$$1000y_5=L_5x^3-M_5x^2+N_5x-P_5 \qquad (22)$$

$L_5$=0.00005b+0.0092
$M_5$=0.0171b+2.1013
$N_5$=0.8528b+125.11
$P_5$=−2.372b+1972.3.

According to the method for filling a refrigerant mixture of the present invention, the proportion of HFC-32 in the liquid phase of the mixture in a feeding container is adjusted, before transfer, to a specific range; therefore, even when the feeding container is filled with the refrigerant mixture in an amount equal to 100 wt % of the maximum filling amount, changes in the composition in a target container or equipment fall within an acceptable range, i.e., ±1.5 wt % of the target composition, until transfer is completed.

The boiling point of HFC-32 is lower than that of HFO-1234yf. Therefore, when the space created due to extraction of refrigerant is refilled with vapor evaporated from the liquid phase during transfer, HFC-32 evaporates in an amount greater than that of HFO-1234yf, causing a reduction in the HFC-32 concentration in the liquid phase. For this reason, HFC-32 is preferably filled into a feeding container before transfer in an amount greater than that of the target composition.

The value b above is generally set to 60 b 100.

Hereinafter, one example is described regarding a method that performs transfer at a handling temperature of 40° C. For example, according to the High Pressure Gas Safety Act of Japan, handling a container at a temperature of 40° C. or more is prohibited; therefore, particularly in Japan, the handling temperature is 0 to 40° C. when transfer is performed. A higher temperature during transfer (at the time of handling) causes a larger composition change associated with the transfer. Therefore, the conditions for the transfer at a handling temperature of 40° C. can be applied to the conditions for the transfer at a handling temperature ranging from 0 to 40° C.

Moreover, regarding the filling amount in a feeding container, when the refrigerant mixture in a liquid state is transferred to a target container or equipment from the feeding container, a smaller initial filling amount results in a smaller composition change associated with the transfer during initiation and completion of the transfer. Therefore, an equation that satisfies a filling method in which the initial filling amount is b wt % is also satisfied in a filling method in which the initial filling amount is b wt % or less.

(2-2) Filling method in which the refrigerant mixture is filled into a container in an amount equal to 100 wt % of the maximum filling amount Hereinafter, an embodiment is described in which the refrigerant mixture is filled into a container in an amount equal to 100 wt % of the maximum filling amount of the refrigerant mixture and in which the composition of HFC-32 falls within a range of ±1.5 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 26.5 wt % or 47.5 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 100 wt % of the maximum filling amount of the refrigerant mixture, the proportion (initial composition) of HFC-32 in the liquid phase of the refrigerant mixture in the feeding container is preferably adjusted, before the transfer, to $x+y_{Q1}$ wt % to x+1.5 wt %, so that the proportion of HFC-32 in the liquid phase of the refrigerant mixture in the feeding container falls within a range of ±1.5 wt % of a target composition (x) of HFC-32 during initiation and completion of the transfer.

(In the above, x is a target composition with the proviso that 10≤x≤26.5 or 47.5≤x≤90; and $y_{Q1}$ is a lower limit of a gap between the target composition and the initial composition, and is represented by Equation (23):

$$1000y_{Q1}=0.0172x^2-3.7549x^2+207.43x-1705.9 \quad (23).)$$

In this embodiment, referring to Equation (23) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−0.9 wt % to x+1.5 wt %. Changes in the composition in a target container or equipment can thereby fall within the acceptable range of ±1.5 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±1.5 wt % of the target composition in a target container or equipment until the transfer is completed, the upper limit of the composition of HFC-32 in the liquid phase of the HFC-32/HFO-1234yf refrigerant mixture immediately before the transfer is +1.5 wt % of the target composition of HFC-32.

Further, when the mixture contains HFC-32 in an amount of 90 wt %, changes in the composition of HFC-32 are small; therefore, even when the initial composition of HFC-32 is about −0.9 wt % of the target composition (90 wt %), the proportion of HFC-32 in the liquid phase of the mixture falls within ±1.5 wt % of the target composition until the transfer is completed.

(2-3) Filling method in which the refrigerant mixture is filled into a container in an amount equal to 90 wt % of the maximum filling amount Hereinafter, an embodiment is described in which the refrigerant mixture is filled into a container in an amount equal to 90 wt % of the maximum filling amount of the refrigerant mixture and in which the composition of HFC-32 falls within a range of ±1.5 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 30 wt % or 44 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 90 wt % of the maximum filling amount of the refrigerant mixture, the proportion (initial composition) of HFC-32 in the liquid phase of the refrigerant mixture in the feeding container is preferably adjusted, before the transfer, to $x+y_{Q2}$ wt % to x+1.5 wt %, so that the proportion of HFC-32 in the liquid phase of the refrigerant mixture in the feeding container falls within a range of ±1.5% of a target composition (x) of HFC-32 during initiation and completion of the transfer.

(In the above, x is a target composition, with the proviso that 10≤x≤30 or 44≤x≤90; and $y_{Q2}$ is a lower limit of a gap between the target composition and the initial composition, and is represented by Equation (24):

$$1000y_{Q2}=0.0168x^3-3.6698x^2+203.75x-1785.4 \quad (24).)$$

In this embodiment, referring to Equation (24) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−0.9 wt % to x+1.5 wt %. Changes in the composition in a target container or equipment can thereby fall within the acceptable range of ±1.5 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±1.5 wt % of the target composition in a target container or equipment until the transfer is completed, the upper limit of the composition of HFC-32 in the liquid phase of the HFC-32/HFO-1234yf refrigerant mixture immediately before the transfer is +1.5 wt % of the target composition of HFC-32.

Further, when the mixture contains HFC-32 in an amount of 90 wt %, changes in the composition of HFC-32 are small; therefore, even when the initial composition of HFC-32 is about −0.9 wt % of the target composition (90 wt %), the proportion of HFC-32 in the liquid phase of the mixture falls within ±1.5 wt % of the target composition until the transfer is completed.

(2-4) Filling method in which the refrigerant mixture is filled into a container in an amount equal to 80 wt % of the maximum filling amount Hereinafter, an embodiment is described in which the refrigerant mixture is filled into a container in an amount equal to 80 wt % of the maximum filling amount of the refrigerant mixture and in which the composition of HFC-32 falls within a range of ±1.5 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 80 wt % of the maximum filling amount of the refrigerant mixture, the proportion (initial composition) of HFC-32 in the liquid phase of the refrigerant mixture in the feeding container is preferably adjusted, before the transfer, to $x+y_{Q3}$ wt % to $x+1.5$ wt %, so that the proportion of HFC-32 in the liquid phase of the refrigerant mixture in the feeding container falls within a range of ±1.5 wt % of a target composition (x) of HFC-32 during initiation and completion of the transfer.

(In the above, x is a target composition, with the proviso that $10 \leq x \leq 90$; and $y_{Q3}$ is a lower limit of a gap between the target composition and the initial composition, and is represented by Equation (25):

$$1000y_{Q3}=0.0163x^3-3.5445x^2+197.22x-1815.9 \quad (25).)$$

In this embodiment, referring to Equation (25) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−0.9 wt % to x+1.5 wt %. Changes in the composition in a target container or equipment can thereby fall within the acceptable range of ±1.5 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±1.5 wt % of the target composition in a target container or equipment until the transfer is completed, the upper limit of the composition of HFC-32 in the liquid phase of the HFC-32/HFO-1234yf refrigerant mixture immediately before the transfer is +1.5 wt % of the target composition of HFC-32.

Further, when the mixture contains HFC-32 in an amount of 90 wt %, changes in the composition of HFC-32 are small; therefore, even when the initial composition of HFC-32 is about −0.9 wt % of the target composition (90 wt %), the proportion of HFC-32 in the liquid phase of the mixture falls within ±1.5 wt % of the target composition until the transfer is completed.

(2-5) Filling method in which the refrigerant mixture is filled into a container in an amount equal to 70 wt % of the maximum filling amount Hereinafter, an embodiment is described in which the refrigerant mixture is filled into a container in an amount equal to 70 wt % of the maximum filling amount of the refrigerant mixture and in which the composition of HFC-32 falls within a range of ±1.5 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 70 wt % of the maximum filling amount of the refrigerant mixture, the proportion (initial composition) of HFC-32 in the liquid phase of the refrigerant mixture in the feeding container is preferably adjusted, before the transfer, to $x+y_{Q4}$ wt % to $x+1.5$ wt %, so that the proportion of HFC-32 in the liquid phase of the refrigerant mixture in the feeding container falls within a range of ±1.5 wt % of a target composition (x) of HFC-32 during initiation and completion of the transfer.

(In the above, x is a target composition, with the proviso that $10 \leq x \leq 90$; and $y_{Q4}$ is a lower limit of a gap between the target composition and the initial composition, and is represented by Equation (26):

$$1000y_{Q4}=0.0147x^3-3.2607x^2+183.21x-1777.0 \quad (26).)$$

In this embodiment, referring to Equation (26) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−0.9 wt % to x+1.5 wt %. Changes in the composition in a target container or equipment can thereby fall within the acceptable range of ±1.5 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±1.5 wt % of the target composition in a target container or equipment until the transfer is completed, the upper limit of the composition of HFC-32 in the liquid phase of the HFC-32/HFO-1234yf refrigerant mixture immediately before the transfer is +1.5 wt % of the target composition of HFC-32.

Further, when the mixture contains HFC-32 in an amount of 90 wt %, changes in the composition of HFC-32 are small; therefore, even when the initial composition of HFC-32 is about −0.9 wt % of the target composition (90 wt %), the proportion of HFC-32 in the liquid phase of the mixture falls within ±1.5 wt % of the target composition until the transfer is completed.

(2-6) Filling method in which the refrigerant mixture is filled into a container in an amount equal to 60 wt % of the maximum filling amount Hereinafter, an embodiment is described in which the refrigerant mixture is filled into a container in an amount equal to 60 wt % of the maximum filling amount of the refrigerant mixture and in which the composition of HFC-32 falls within a range of ±1.5 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 60 wt % of the maximum filling amount of the refrigerant mixture, the proportion (initial composition) of HFC-32 in the liquid phase of the refrigerant mixture in the feeding container is preferably adjusted, before the transfer, to $x+y_{Q5}$ wt % to $x+1.5$ wt %, so that the proportion of HFC-32 in the liquid phase of the refrigerant mixture in the feeding container falls within a range of ±1.5% of a target composition (x) of HFC-32 during initiation and completion of the transfer.

(In the above, x is a target composition, with the proviso that $10 \le x \le 90$; and $y_{Q5}$ is a lower limit of a gap between the target composition and the initial composition, and is represented by Equation (27):

$$1000 y_{Q5} = 0.0141 x^3 - 3.1058 x^2 + 175.06 x - 1828.7 \quad (27).$$

In this embodiment, referring to Equation (27) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about $x-0.9$ wt % to $x+1.5$ wt %. Changes in the composition in a target container or equipment can thereby fall within the acceptable range of +1.5 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±1.5 wt % of the target composition in a target container or equipment until the transfer is completed, the upper limit of the composition of HFC-32 in the liquid phase of the HFC-32/HFO-1234yf refrigerant mixture immediately before the transfer is +1.5 wt % of the target composition of HFC-32.

Further, when the mixture contains HFC-32 in an amount of 90 wt %, changes in the composition of HFC-32 are small; therefore, even when the initial composition of HFC-32 is about −0.9 wt % of the target composition (90 wt %), the proportion of HFC-32 in the liquid phase of the mixture falls within ±1.5 wt % of the target composition until the transfer is completed.

(2-7) Method for filling a non-azeotropic refrigerant mixture comprising HFC-32 and HFO-1234yf The concept of a filling method of the present invention is shown below, in relation to an embodiment in which the composition of HFC-32 falls within ±1.5 wt % of the target composition (x) of HFC-32 during initiation and completion of transfer.

Equation (22) above can be derived from Equations (23) to (27) above. Based on the value of each coefficient of Equations (23) to (27), $L_5$ to $P_5$ of Equation (22) can be calculated from the target composition (x) with respect to the initial filling amount (b).

A method of the present invention for filling a mixed refrigerant comprising HFC-32 and HFO-1234yf, the HFC-32 being present in a liquid phase in an amount of 10 to 90 wt % based on 100 wt % of the total of HFC-32 and HFO-1234yf, has the following feature. Specifically, in transferring the refrigerant mixture in a liquid state into a target container or equipment from a feeding container, the proportion (initial composition) of the HFC-32 in the liquid phase of the refrigerant mixture in the feeding container is adjusted immediately before the transfer to $x+y_5$ wt % (minimum value) to $x+1.5$ wt % (maximum value), so that the proportion of the HFC-32 in the liquid phase of the refrigerant mixture in the feeding container falls within a set tolerance (±1.5 wt %) of the target composition (x) of HFC-32 during initiation and completion of the transfer.

In view of the concept of the present invention described above, when a=1.5, and the refrigerant mixture is filled into a container in an amount equal to or less than 100 wt % of the maximum filling amount, if $26.5 < x < 47.5$, then $y_{Q1} > 1.5$; therefore, x is within a range of 10 to 26.5 wt % or 47.5 to 90 wt %. Further, when a=1.5, and the refrigerant mixture is filled into a container in an amount equal to or less than 90% of the maximum filling amount, if $30 < x < 44$, then $y_{Q2} > 1.5$; therefore, x is within a range of 10 to 30 wt % or 44 to 90 wt %.

b: an amount (wt %) initially filled into the feeding container;

x: a target composition, with the proviso that $10 \le x \le 90$, excluding a range satisfying the inequality: $y_5 > 1.5$ $y_5$: a lower limit of a gap between the target composition and the initial composition, $y_5$ being represented by Equation (22) below:

$$1000 y_5 = L_5 x^3 - M_5 x^2 + N_5 x - P_5 \quad (22)$$

$L_5 = 0.00005b + 0.0092$ $M_5 = 0.0171b + 2.1013$ $N_5=0.8528b+125.11$ $P_5=-2.372b+1972.3$.

(3) Filling method (set tolerance (±a): ±1.0 wt %)

The mixture ratio is described below in terms of a refrigerant mixture before being transferred to a target container or equipment from a feeding container. The use of the mixture ratio enables the proportion of HFC-32 in the liquid phase of the refrigerant mixture in the feeding container to fall within a range of ±1 wt % of the target composition (x) of HFC-32 during initiation and completion of the transfer.

(3-1) Filling method that enables the composition of HFC-32 to fall within a range of ±1 wt % of the target composition (x) of HFC-32

A method (a gas transfer filling method) of the present invention for filling a refrigerant mixture comprising HFC-32 and HFO-1234yf in such a manner that the HFC-32 is present in the liquid phase in an amount of 10 to 18.5 wt % or 60 to 90 wt % based on 100 wt % of the total of HFC-32 and HFO-1234yf, the method being performed in transferring the refrigerant mixture in a liquid state to a target container or equipment from a feeding container that is filled with the refrigerant mixture in an arbitrarily adjusted amount has the following feature. Specifically, the proportion (initial composition) of HFC-32 in the liquid phase of the refrigerant mixture in the feeding container is adjusted immediately before the transfer to $x+y_6$ wt % (minimum value) to $x+1.0$ wt % (maximum value), so that the proportion of HFC-32 in the liquid phase of the refrigerant mixture in the feeding container falls within a range of ±1.0 wt % of a target composition (x) of HFC-32 during initiation and completion of the transfer.

b: an amount (wt %) initially filled into the feeding container x: target composition (with the proviso that $10 \leq x \leq 18.5$ or $60 \leq x \leq 90$, excluding a range satisfying an inequality: $y_6 > 1$)

$y_6$: a lower limit of a gap between the target composition and the initial composition, $y_6$ being represented by Equation (28) below:

$$1000y_6=L_6x^3-M_6x^2+N_6x-P_6 \qquad (28)$$

$L_6=0.00009b+0.0086$ $M_6=0.0183b+2.003$ $N_6=0.9237b+117.29$ $P_6=-1.055b+1292.7$.

According to the method for filling a refrigerant mixture of the present invention, the proportion of HFC-32 in the liquid phase of the mixture in a feeding container is adjusted, before transfer, to a specific range; therefore, even when the feeding container is filled with the refrigerant mixture in an amount equal to 100 wt % of the maximum filling amount, changes in the composition in a target container or equipment fall within an acceptable range, i.e., ±1.0 wt % of the target composition, until transfer is completed.

The boiling point of HFC-32 is lower than that of HFO-1234yf. Therefore, when the space created due to extraction of refrigerant is refilled with vapor evaporated from the liquid phase during transfer, HFC-32 evaporates in an amount greater than that of HFO-1234yf, causing a reduction in the HFC-32 concentration in the liquid phase. For this reason, HFC-32 is preferably filled into a feeding container before transfer in an amount greater than that of the target composition.

The value b above is generally set to 60 b 100.

Hereinafter, one example is described regarding a method that performs transfer at a handling temperature of 40° C. For example, according to the High Pressure Gas Safety Act of Japan, handling a container at a temperature of 40° C. or more is prohibited; therefore, particularly in Japan, the handling temperature is 0 to 40° C. when transfer is performed. A higher temperature during transfer (at the time of handling) causes a larger composition change associated with the transfer. Therefore, the conditions for the transfer at a handling temperature of 40° C. can be applied to the conditions for the transfer at a handling temperature ranging from 0 to 40° C.

Moreover, regarding the filling amount in a feeding container, when the refrigerant mixture in a liquid state is transferred to a target container or equipment from the feeding container, a smaller initial filling amount results in a smaller composition change associated with the transfer during initiation and completion of the transfer. Therefore, an equation that satisfies a filling method in which the initial filling amount is b wt % is also satisfied in a filling method in which the initial filling amount is b wt % or less.

(3-2) Filling method in which the refrigerant mixture is filled into a container in an amount equal to 100 wt % of the maximum filling amount Hereinafter, an embodiment is described in which the refrigerant mixture is filled into a container in an amount equal to 100 wt % of the maximum filling amount of the refrigerant mixture and in which the composition of HFC-32 falls within a range of ±1 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 13.5 wt % or 67 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 100 wt % of the maximum filling amount of the refrigerant mixture, the proportion (initial composition) of HFC-32 in the liquid phase of the refrigerant mixture in the feeding container is preferably adjusted, before the transfer, to $x+y_{R1}$ wt % to $x+1.0$ wt %, so that the proportion of HFC-32 in the liquid phase of the refrigerant mixture in the feeding container falls within a range of ±1.0 wt % of a target composition (x) of HFC-32 during initiation and completion of the transfer.

(In the above, x is a target composition, with the proviso that $10 \leq x \leq 13.5$ or $67 \leq x \leq 90$; and $y_{R1}$ is a lower limit of a gap between the target composition and the initial composition, and is represented by Equation (29):

$$1000y_{R1}=0.0178x^3-3.8363x^2+209.59x-1194.3 \qquad (29).)$$

In this embodiment, referring to Equation (29) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about $x-0.4$ wt % to $x+1.0$ wt %. Changes in the composition in a target container or equipment can thereby fall within the acceptable range of ±1.0 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±1.0 wt % of the target composition in a target container or equipment until the transfer is completed, the upper limit of the composition of HFC-32 in the liquid phase of the HFC-32/HFO-1234yf refrigerant mixture immediately before the transfer is +1.0 wt % of the target composition of HFC-32.

Further, when the mixture contains HFC-32 in an amount of 90 wt %, changes in the composition of HFC-32 are small; therefore, even when the initial composition of HFC-32 is about −0.4 wt % of the target composition (90 wt %), the proportion of HFC-32 in the liquid phase of the mixture falls within ±1.0 wt % of the target composition until the transfer is completed.

(3-3) Filling method in which the refrigerant mixture is filled into a container in an amount equal to 90 wt % of the maximum filling amount Hereinafter, an embodiment is described in which the refrigerant mixture is filled into a container in an amount equal to 90 wt % of the maximum filling amount of the refrigerant mixture and in which the composition of HFC-32 falls within a range of ±1 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 14 wt % or 66 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 90 wt % of the maximum filling amount of the refrigerant mixture, the proportion (initial composition) of HFC-32 in the liquid phase of the refrigerant mixture in the feeding container is preferably adjusted, before the transfer, to $x+y_{R2}$ wt % to $x+1.0$ wt %, so that the proportion of HFC-32 in the liquid phase of the refrigerant mixture in the feeding container falls within a range of ±1.0 wt % of a target composition (x) of HFC-32 during initiation and completion of the transfer.

(In the above, x is a target composition, with the proviso that $10 \leq x \leq 14$ or $66 \leq x \leq 90$; and $y_{R2}$ is a lower limit of a gap between the target composition and the initial composition, and is represented by Equation (30):

$$1000y_{R2} = 0.0168x^3 - 3.6386x^2 + 200.2x - 1192.8 \qquad (30).)$$

In this embodiment, referring to Equation (30) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about $x-0.4$ wt % to $x+1.0$ wt %. Changes in the composition in a target container or equipment can thereby fall within the acceptable range of ±1.0 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±1.0 wt % of the target composition in a target container or equipment until the transfer is completed, the upper limit of the composition of HFC-32 in the liquid phase of the HFC-32/HFO-1234yf refrigerant mixture immediately before the transfer is +1.0 wt % of the target composition of HFC-32.

Further, when the mixture contains HFC-32 in an amount of 90 wt %, changes in the composition of HFC-32 are small; therefore, even when the initial composition of HFC-32 is about −0.4 wt % of the target composition (90 wt %), the proportion of HFC-32 in the liquid phase of the mixture falls within ±1.0 wt % of the target composition until the transfer is completed.

(3-4) Filling method in which the refrigerant mixture is filled into a container in an amount equal to 80 wt % of the maximum filling amount Hereinafter, an embodiment is described in which the refrigerant mixture is filled into a container in an amount equal to 80 wt % of the maximum filling amount of the refrigerant mixture and in which the composition of HFC-32 falls within a range of ±1 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 15.5 wt % or 65 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 80 wt % of the maximum filling amount of the refrigerant mixture, the proportion (initial composition) of HFC-32 in the liquid phase of the refrigerant mixture in the feeding container is preferably adjusted, before the transfer, to $x+y_{R3}$ wt % to $x+1.0$ wt %, so that the proportion of HFC-32 in the liquid phase of the refrigerant mixture in the feeding container falls within a range of ±1.0 wt % of a target composition (x) of HFC-32 during initiation and completion of the transfer.

(In the above, x is a target composition with the proviso that $10 \leq x \leq 15.5$ or $65 \leq x \leq 90$; and $y_{R3}$ is a lower limit of a gap between the target composition and the initial composition, and is represented by Equation (31):

$$1000y_{R3} = 0.0159x^3 - 3.4616x^2 + 191.19x - 1196.0 \qquad (31).)$$

In this embodiment, referring to Equation (30) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about $x-0.4$ wt % to $x+1.0$ wt %. Changes in the composition in a target container or equipment can thereby fall within the acceptable range of ±1.0 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±1.0 wt % of the target composition in a target container or equipment until the transfer is completed, the upper limit of the composition of HFC-32 in the liquid phase of the HFC-32/HFO-1234yf refrigerant mixture immediately before the transfer is +1.0 wt % of the target composition of HFC-32.

Further, when the mixture contains HFC-32 in an amount of 90 wt %, changes in the composition of HFC-32 are small; therefore, even when the initial composition of HFC-32 is about −0.4 wt % of the target composition (90 wt %), the proportion of HFC-32 in the liquid phase of the mixture falls within ±1.0 wt % of the target composition until the transfer is completed.

(3-5) Filling method in which the refrigerant mixture is filled into a container in an amount equal to 70 wt % of the maximum filling amount Hereinafter, an embodiment is described in which the refrigerant mixture is filled into a container in an amount equal to 70 wt % of the maximum filling amount of the refrigerant mixture and in which the composition of HFC-32 falls within a range of ±1 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 16.5 wt % or 62.5 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 70 wt % of the maximum filling amount of the refrigerant mixture, the proportion (initial composition) of HFC-32 in the liquid phase of the refrigerant mixture in the feeding container is preferably adjusted, before the transfer, to x+$y_{R4}$ wt % to x+1.0 wt %, so that the proportion of HFC-32 in the liquid phase of the refrigerant mixture in the feeding container falls within a range of ±1.0 wt % of a target composition (x) of HFC-32 during initiation and completion of the transfer.

(In the above, x is a target composition, with the proviso that 10≤x≤16.5 or 62.5≤x≤90; and $y_{R4}$ is a lower limit of a gap between the target composition and the initial composition, and is represented by Equation (32):

$$1000y_{R4}=0.015x^3-3.2938x^2+182.87x-1230.1 \quad (32).$$

In this embodiment, referring to Equation (32) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−0.4 wt % to x+1.0 wt %. Changes in the composition in a target container or equipment can thereby fall within the acceptable range of ±1.0 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±1.0 wt % of the target composition in a target container or equipment until the transfer is completed, the upper limit of the composition of HFC-32 in the liquid phase of the HFC-32/HFO-1234yf refrigerant mixture immediately before the transfer is +1.0 wt % of the target composition of HFC-32.

Further, when the mixture contains HFC-32 in an amount of 90 wt %, changes in the composition of HFC-32 are small; therefore, even when the initial composition of HFC-32 is about −0.4 wt % of the target composition (90 wt %), the proportion of HFC-32 in the liquid phase of the mixture falls within ±1.0 wt % of the target composition until the transfer is completed.

(3-6) Filling method in which the refrigerant mixture is filled into a container in an amount equal to 60 wt % of the maximum filling amount Hereinafter, an embodiment is described in which the refrigerant mixture is filled into a container in an amount equal to 60 wt % of the maximum filling amount of the refrigerant mixture and in which the composition of HFC-32 falls within a range of ±1 wt % of the target composition (x) of HFC-32 during initiation and completion of transfer.

In one embodiment of a method of the present invention for filling a refrigerant mixture comprising HFC-32 and HFO-1234yf in such a manner that HFC-32 is present in the liquid phase in an amount of 10 to 18.5 wt % or 60 to 90 wt % based on 100 wt % of the total of HFC-32 and HFO-1234yf, in transferring the refrigerant mixture in a liquid state to a target container or equipment from a feeding container that is filled with the refrigerant mixture in an amount equal to or less than 60 wt % of the maximum filling amount of the refrigerant mixture, the proportion (initial composition) of HFC-32 in the liquid phase of the refrigerant mixture in the feeding container is preferably adjusted, before the transfer, to x+$y_{R5}$ wt % to x+1.0 wt %, so that the proportion of HFC-32 in the liquid phase of the refrigerant mixture in the feeding container falls within a range of ±1.0 wt % of a target composition (x) of HFC-32 during initiation and completion of the transfer.

(In the above, x is a target composition, with the proviso that 10≤x≤18.5 or 60≤x≤90; and $y_{R5}$ is a lower limit of a gap between the target composition and the initial composition, and is represented by Equation (33):

$$1000y_{R5}=0.0141x^3-3.0949x^2+172.07x-1228.4 \quad (33).$$

In this embodiment, referring to Equation (33) above, in transferring the HFC-32/HFO-1234yf refrigerant mixture to a target container or equipment from a feeding container, the proportion of HFC-32 in the liquid phase of the refrigerant mixture in the feeding container is adjusted, before the transfer, to about x−0.5 wt % to x+1.0 wt %. Changes in the composition in a target container or equipment can thereby fall within the acceptable range of ±1.0 wt % of the target composition until the transfer is completed.

The boiling point of HFC-32 is lower than that of HFO-1234yf. Therefore, when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, HFC-32 is preferably filled into a feeding container before the transfer in an amount greater than that of the target composition. In the method for filling a refrigerant mixture in which the composition of HFC-32 in the HFC-32/HFO-1234yf refrigerant mixture is made to fall within the acceptable range of ±1.0 wt % of the target composition in a target container or equipment until the transfer is completed, the upper limit of the composition of HFC-32 in the liquid phase of the HFC-32/HFO-1234yf refrigerant mixture immediately before the transfer is +1.0 wt % of the target composition of HFC-32.

Further, when the mixture contains HFC-32 in an amount of 90 wt %, changes in the composition of HFC-32 are small; therefore, even when the initial composition of HFC-32 is about −0.5 wt % of the target composition (90 wt %), the proportion of HFC-32 in the liquid phase of the mixture falls within ±1.0 wt % of the target composition until the transfer is completed.

(3-7) Method for filling a non-azeotropic refrigerant mixture comprising HFC-32 and HFO-1234 f The concept of a filling method of the present invention is shown below, in relation to an embodiment in which the composition of HFC-32 falls within ±1.0 wt % of the target composition (x) of HFC-32 during initiation and completion of transfer.

Equation (28) above can be derived from Equations (29) to (33) above. Based on the value of each coefficient of Equations (29) to (33), $L_6$ to $P_6$ of Equation (28) can be calculated from the target composition (x) with respect to the initial filling amount (b).

A method of the present invention for filling a mixed refrigerant comprising HFC-32 and HFO-1234yf, the HFC-32 being present in a liquid phase in an amount of 10 to 18.5 wt % or 60 to 90 wt % based on 100 wt % of the total of HFC-32 and HFO-1234yf, has the following feature. Specifically, in transferring the refrigerant mixture in a liquid state into a target container or equipment from a feeding container, the proportion (initial composition) of the HFC-32 in the liquid phase of the refrigerant mixture in the feeding container is adjusted immediately before the transfer to $x+y_6$ wt % (minimum value) to x+1.0 wt % (maximum value), so that the proportion of the HFC-32 in the liquid phase of the refrigerant mixture in the feeding container falls within a set tolerance (±1.0 wt %) of the target composition (x) of HFC-32 during initiation and completion of the transfer.

In view of the concept of the present invention described above, when a set tolerance is ±1.0 wt %, and the refrigerant mixture is filled into a container in an amount equal to or less than 100 wt % of the maximum filling amount, if $13.5<x<67$, then $y_{R1}>1$; therefore, x is within a range of 10 to 13.5 wt % or 67 to 90 wt %. Further, when a set tolerance is ±1.0 wt %, and the refrigerant mixture is filled into a container in an amount equal to or less than 90 wt % of the maximum filling amount, if $14<x<66$, then $y_{R2}>1$; therefore, x is within a range of 10 to 14 wt % or 66 to 90 wt %. When a set tolerance is ±1.0 wt %, and the refrigerant mixture is filled into a container in an amount equal to or less than 80 wt % of the maximum filling amount, if $15.5<x<65$, then $y_{R3}>1$; therefore, x is within a range of 10 to 15.5 wt % or 65 to 90 wt %. When a set tolerance is ±1.0 wt %, and the refrigerant mixture is filled into a container in an amount equal to or less than 70 wt % of the maximum filling amount, if $16.5<x<62.5$, then $y_{R4}>1$; therefore, x is within a range of 10 to 16.5 wt % or 62.5 to 90 wt %. When a set tolerance is ±1.0 wt %, and the refrigerant mixture is filled into a container in an amount equal to or less than 60 wt % of the maximum filling amount, if $18.5<x<60$, then $y_{R5}>1$; therefore, x is within a range of 10 to 18.5 wt % or 60 to 90 wt %.

b: an amount (wt %) initially filled into the feeding container;

x: a target composition, with the proviso that $10 \leq x \leq 18.5$ or $60 \leq x \leq 90$, excluding a range satisfying the inequality: $y_6 > 1$ $y_6$: a lower limit of a gap between the target composition and the initial composition, $y_6$ being represented by Equation (28) below:

$$1000 y_6 = L_6 x^3 - M_6 x^2 + N_6 x - P_6 \qquad (28)$$

$L_6 = 0.00009b + 0.0086$
$M_6 = 0.0183b + 2.003$
$N_6 = 0.9237b + 117.29$
$P_6 = -1.055b + 1292.7$.

[3] Application of method for filling a refrigerant mixture

Among HFC-32/HFO-1234yf refrigerant mixtures, the target of the present invention is a mixed composition comprising HFC-32 in an amount of 10 to 90 wt %. However, the idea of the present invention can also be applied to a non-azeotropic mixture comprising HFO-1234yf and any HFC compound having a different boiling point from HFO-1234yf. Examples of a non-azeotropic mixture comprising HFO-1234yf include HFCs such as pentafluoroethane (HFC-125), HFC-152, and HFC-143a; HFOs such as HFO-1234ze(E), HFO-1243zf, and HFO-1225ye; and propane, $CO_2$, and the like.

The feeding container of the present invention is not particularly limited insofar as it is a hermetically sealed container that can store a refrigerant mixture. Examples thereof include a tank, a tanker, a storage tank, and the like. The composition of the mixture is likely to undergo a change when a feeding container has a small capacity, or when a large amount of a mixture is extracted each time.

In this method, as long as the amount initially filled into a feeding container is 60 to 100 wt % of the maximum filling amount, transfer can be performed several times in divided portions until it is completed. This method plays a role even when the transfer is stopped before the liquid phase is entirely transferred.

The equipment to which a refrigerant mixture is transferred may be any device as long as it uses a vapor compression refrigeration cycle. Such a device is not particularly limited, and may be, for example, a refrigeration air-conditioning system, a refrigerator, or a hot-water supplier.

Vapor compression refrigeration equipment produced by the method of the present invention comprises refrigerant and the main body of the refrigeration equipment. The main body of the refrigeration equipment is not particularly limited, and a known body of refrigeration equipment can be used as is.

To perform the transfer, known means may be used. For example, the transfer may be performed by using a pressure difference, a pump, or the like.

Further, for example, according to the High Pressure Gas Safety Act of Japan, handling a container at a temperature of 40° C. or more is prohibited; therefore, the handling temperature is basically 0 to 40° C. when transfer is performed. Also in international law, etc., it is required to avoid handling high-pressure gas at a high temperature. A higher temperature during transfer (at the time of handling) causes a larger composition change associated with the transfer. Therefore, the conditions for the transfer at a handling temperature of 40° C. can also be applied to the conditions for the transfer at a handling temperature ranging from 0 to 40° C.

Advantageous Effects of Invention

When a non-azeotropic refrigerant mixture comprising 2,3,3,3-tetrafluoropropene and difluoromethane is filled by the method of the present invention, composition changes associated with the transfer of the refrigerant mixture can fall within an acceptable range.

DESCRIPTION OF EMBODIMENTS

The present invention is described with reference to Examples; however, the present invention is not limited thereto, without departing from the scope of the invention.

(1) Reference Example 1

A 10-L hermetically sealed container was filled with 2,3,3,3-tetrafluoropropene (HFO-1234yf) and difluoromethane (HFC-32) in the maximum amount that could be filled with the composition immediately before transfer so that the liquid phase had a fixed composition at 40° C., and the container was maintained at 40° C. The maximum filling amount is defined by law and calculated as below:

$$G = V/C$$

G: Mass of fluorocarbon (kg)
V: Capacity (L) of the container
C: Constant according to the type of fluorocarbon The fill constant C here is determined in Japan as a value obtained by dividing 1.05 by the specific gravity of the gas at 48° C.

When export is involved, according to international law, the fill constant C is defined as a value obtained by dividing 1.05 by the specific gravity of the gas at 65° C. when passing through tropical regions, and it is defined as a value obtained by dividing 1.05 by the specific gravity of the gas at 45° C. when only regions other than tropical regions are involved.

In Reference Example 1, a value obtained by dividing 1.05 by the specific gravity of the gas at 45° C. or 65° C. was used as the fill constant.

The reasons for selecting 40° C. as the temperature during the transfer are that the use of containers at a temperature over 40° C. is prohibited by the High Pressure Gas Safety Act of Japan, that international law, etc., also require avoiding the use of containers at a high temperature, and that since a larger composition change develops at a higher temperature, data obtained at a temperature of 40° C. is assumed to be data from the severest conditions.

Subsequently, the liquid phase was gradually transferred from the container to another empty container using a pump. Part of the gas was collected through a sampling valve disposed in the middle of a pipe for extracting the liquid phase, and the component composition was analyzed by gas chromatography.

Tables 1 and 2 show the results of composition changes during the transfer in Reference Example 1 when the filling amount is calculated by using, as the fill constant, values obtained by dividing 1.05 by the specific gravity of the gas at 45° C. and 65° C.

45° C.

TABLE 1

| HFC-32 target composition wt. % | HFC-32 composition before transfer wt. % | HFC-32 composition after extraction of liquid wt. % | Gap from HFC-32 target composition wt. % |
|---|---|---|---|
| 90.0 | 90.0 | 89.5 | −0.5 |
| 80.0 | 80.0 | 78.8 | −1.2 |
| 70.0 | 70.0 | 68.1 | −1.9 |

TABLE 1-continued

| HFC-32 target composition wt. % | HFC-32 composition before transfer wt. % | HFC-32 composition after extraction of liquid wt. % | Gap from HFC-32 target composition wt. % |
|---|---|---|---|
| 60.0 | 60.0 | 57.5 | −2.5 |
| 50.0 | 50.0 | 47.0 | −3.0 |
| 40.0 | 40.0 | 36.8 | −3.2 |
| 30.0 | 30.0 | 26.9 | −3.1 |
| 20.0 | 20.0 | 17.5 | −2.5 |
| 10.0 | 10.0 | 8.5 | −1.5 |

65° C.

TABLE 2

| HFC-32 target composition wt. % | HFC-32 composition before transfer wt. % | HFC-32 composition after extraction of liquid wt. % | Gap from HFC-32 target composition wt. % |
|---|---|---|---|
| 90.0 | 90.0 | 89.5 | −0.5 |
| 80.0 | 80.0 | 78.9 | −1.1 |
| 70.0 | 70.0 | 68.3 | −1.7 |
| 60.0 | 60.0 | 57.7 | −2.3 |
| 50.0 | 50.0 | 47.2 | −2.8 |
| 40.0 | 40.0 | 37.0 | −3.0 |
| 30.0 | 30.0 | 27.1 | −2.9 |
| 20.0 | 20.0 | 17.6 | −2.4 |
| 10.0 | 10.0 | 8.6 | −1.4 |

As shown in Tables 1 and 2, when the refrigerant mixture is transferred without taking any measure, a composition gap (composition change) of up to 3 to 4 wt. % from the target composition develops when the entire liquid before transfer is extracted (at the time of the completion of the transfer). Thus, refrigeration capacity and refrigerant capacity (e.g., COP) expected from the target composition cannot be ensured during start and completion of the transfer.

Table 1 reveals that the concentration of HFC-32 in the HFC-32/HFO-1234yf refrigerant mixture at the time of the completion of the transfer was lower than that at the time of the start of the transfer. This is because the boiling point of HFC-32 is lower than the boiling point of HFO-1234yf, and when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, it was found that HFC-32 was preferably filled into a feeding container before the transfer in an amount greater than that of the target composition. Even when the composition change during the transfer was the lowest (HFC-32: 90 wt. %), the width of the composition change during start and completion of the transfer was about 0.5 wt. %.

(2) Filling Method when the Filling Amount is 100 Wt % of the Maximum Filling Amount The filling amount was calculated by using a value obtained by dividing 1.05 by the specific gravity of the gas at 65° C. as the fill constant.

(2-1) Example 1

Initial Composition: +2.5 wt. % of the Target Composition

A 10-L hermetically sealed container was filled with 2,3,3,3-tetrafluoropropene (HFO-1234yf) and difluoromethane (HFC-32) in the maximum amount (100 wt % of the maximum filling amount) that could be filled with the composition immediately before transfer so that the liquid phase had a fixed composition at 40° C., and the container was maintained at 40° C. In this case, the initial composition of HFC-32 in the liquid phase before the transfer was adjusted to +2.5 wt. % of the target composition. Subsequently, as in Reference Example 1, the liquid phase was gradually transferred from the container to another empty container by using a pump, and the component composition was analyzed. Table 2 shows the results of composition changes during the transfer when the initial composition was adjusted to +2.5 wt. % of the target composition.

TABLE 3

| HFC-32 target composition wt. % | HFC-32 composition before transfer wt. % | HFC-32 composition after extraction of liquid wt. % | Gap from HFC-32 target composition wt. % |
|---|---|---|---|
| 90.0 | 92.5 | 92.1 | +2.1 |
| 80.0 | 82.5 | 81.5 | +1.5 |
| 70.0 | 72.5 | 70.9 | +0.9 |
| 60.0 | 62.5 | 60.3 | +0.3 |
| 50.0 | 52.5 | 49.8 | −0.2 |
| 40.0 | 42.5 | 39.5 | −0.5 |
| 30.0 | 32.5 | 29.5 | −0.5 |
| 20.0 | 22.5 | 19.9 | −0.1 |
| 10.0 | 12.5 | 10.8 | +0.8 |

As shown in Table 3, by adjusting the initial composition to +2.5 wt. % of the target composition, the gap between the target composition and the initial composition before the transfer falls within a range of ±2.5 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −2.5 wt. % of the target composition (x) was determined. Table 4 shows the lower limit ($y_A$) of the gap between the target composition and the initial composition in this case.

TABLE 4

| HFC-32 target composition (x) | HFC-32 composition before transfer | HFC-32 composition after extraction of liquid | Lower limit of gap ($y_A$) |
|---|---|---|---|
| 90.0 | 88.1 | 87.5 | −1.9 |
| 80.0 | 78.7 | 77.5 | −1.3 |
| 70.0 | 69.3 | 67.5 | −0.7 |
| 60.0 | 59.9 | 57.5 | −0.1 |
| 50.0 | 50.3 | 47.5 | +0.3 |
| 40.0 | 40.5 | 37.5 | +0.5 |
| 30.0 | 30.4 | 27.5 | +0.4 |
| 20.0 | 19.9 | 17.5 | −0.1 |
| 10.0 | 8.7 | 7.5 | −1.3 |

The results show that HFC-32 undergoes the least composition change when the target composition is 90 wt. %, and that even when the initial composition of HFC-32 in the HFC-32/HFO-1234yf refrigerant mixture in the liquid phase is −1.9 wt. % of the target composition, the gap from the target composition falls within a range of ±2.5 wt. % of the target composition from before the transfer to the completion of the transfer.

Based on these results, the lower limit ($y_A$) of the gap between the target composition and the initial composition is represented by the following equation using the target composition (x):

$$1000 y_A = 0.0166 x^3 - 3.6757 x^2 + 208.97 x - 3006.3 \qquad (2)$$

Therefore, when the initial composition of HFC-32 in the HFC-32/HFO-1234yf refrigerant mixture in the liquid phase is adjusted within a range of $y_A$ to 2.5 wt. % of the target composition, the gap from the target composition falls within a range of ±2.5 wt. % of the target composition from before the transfer to the completion of the transfer.

(2-2) Example 2

Initial Composition: +2.0 wt. % of the Target Composition

Analysis was performed as in Example 1, except that the initial composition of HFC-32 in the liquid phase before the transfer was adjusted to +2.0 wt. % of the target composition. Table 5 shows the results of composition changes during the transfer when the initial composition was adjusted to +2.0 wt. % of the target composition.

TABLE 5

| HFC-32 target composition wt. % | HFC-32 composition before transfer wt. % | HFC-32 composition after extraction of liquid wt. % | Gap from HFC-32 target composition wt. % |
|---|---|---|---|
| 90.0 | 92.0 | 91.6 | +1.6 |
| 80.0 | 82.0 | 81.0 | +1.0 |
| 70.0 | 72.0 | 70.4 | +0.4 |
| 60.0 | 62.0 | 59.8 | −0.2 |
| 50.0 | 52.0 | 49.3 | −0.7 |
| 40.0 | 42.0 | 39.0 | −1.0 |
| 30.0 | 32.0 | 29.0 | −1.0 |
| 20.0 | 22.0 | 19.5 | −0.5 |
| 10.0 | 12.0 | 10.4 | +0.4 |

As shown in Table 5, by adjusting the initial composition to +2.0 wt. % of the target composition, the gap between the target composition and the initial composition before the transfer falls within a range of ±2.0 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −2.0 wt. % of the target composition (x) was determined. Table 6 shows the lower limit ($y_B$) of the gap between the target composition and the initial composition in this case.

TABLE 6

| HFC-32 target composition (x) | HFC-32 composition before transfer | HFC-32 composition after extraction of liquid | Lower limit of gap ($y_B$) |
| --- | --- | --- | --- |
| 90.0 | 88.6 | 88.0 | −1.4 |
| 80.0 | 79.2 | 78.0 | −0.8 |
| 70.0 | 69.8 | 68.0 | −0.2 |
| 60.0 | 60.3 | 58.0 | +0.3 |
| 50.0 | 50.8 | 48.0 | +0.8 |
| 40.0 | 41.0 | 38.0 | +1.0 |
| 30.0 | 30.9 | 28.0 | +0.9 |
| 20.0 | 20.4 | 18.0 | +0.4 |
| 10.0 | 9.3 | 8.0 | −0.7 |

The results show that HFC-32 undergoes the least composition change when the target composition is 90 wt. %, and that even when the initial composition of HFC-32 in the HFC-32/HFO-1234yf refrigerant mixture in the liquid phase is −1.4 wt. % of the target composition, the gap from the target composition falls within a range of ±2.0 wt. % of the target composition from before the transfer to the completion of the transfer.

Based on these results, the lower limit ($y_B$) of the gap between the target composition and the initial composition is represented by the following equation using the target composition (x):

$$1000 y_B = 0.0162 x^3 - 3.5639 x^2 + 200.6 x - 2347.6 \quad (3)$$

Therefore, when the initial composition of HFC-32 in the HFC-32/HFO-1234yf refrigerant mixture in the liquid phase is adjusted within a range of $y_B$ to 2.0 wt. % of the target composition, the gap from the target composition falls within a range of ±2.0 wt. % of the target composition from before the transfer to the completion of the transfer.

(2-3) Example 3

Initial Composition: +1.5 wt. % of the Target Composition

Analysis was performed as in Example 1, except that the initial composition of HFC-32 in the liquid phase before the transfer was adjusted to +1.5 wt. % of the target composition. Table 7 shows the result of composition changes during the transfer when the initial composition was adjusted to +1.5 wt. % of the target composition.

TABLE 7

| HFC-32 target composition wt. % | HFC-32 composition before transfer wt. % | HFC-32 composition after extraction of liquid wt. % | Gap from HFC-32 target composition wt. % |
| --- | --- | --- | --- |
| 90.0 | 91.5 | 91.1 | +1.1 |
| 80.0 | 81.5 | 80.5 | +0.5 |
| 70.0 | 71.5 | 69.8 | −0.2 |
| 60.0 | 61.5 | 59.2 | −0.8 |
| 50.0 | 51.5 | 48.8 | −1.2 |
| 42.0 | 43.5 | 40.5 | −1.5 |
| 41.0 | 42.5. | 39.5 | −1.6 |
| 33.0 | 34.5 | 31.5 | −1.6 |
| 32.0 | 33.5 | 30.5 | −1.5 |
| 30.0 | 31.5 | 28.5 | −1.5 |
| 20.0 | 21.5 | 19.0 | −1.0 |
| 10.0 | 11.5 | 9.9 | −0.1 |

As shown in Table 7, by adjusting the initial composition to +1.5 wt. % of the target composition, the gap between the target composition and the initial composition before the transfer falls within a range of ±1.5 wt. % of the target composition when the HFC-32 composition, among the compositions from the start of filling (before the transfer) until the entire liquid is extracted (until the transfer is completed), is within a range of 10 to 32 wt. % or 42 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −1.5 wt. % of the target composition (x) was determined. Table 8 shows the lower limit ($y_C$) of the gap between the target composition and the initial composition in this case.

TABLE 8

| HFC-32 target composition (x) | HFC-32 composition before transfer | HFC-32 composition after extraction of liquid | Lower limit of gap ($y_C$) |
| --- | --- | --- | --- |
| 90.0 | 89.1 | 88.5 | −0.9 |
| 80.0 | 79.6 | 78.5 | −0.4 |
| 70.0 | 70.2 | 68.5 | +0.2 |
| 60.0 | 60.8 | 58.5 | +0.8 |
| 50.0 | 51.3 | 48.5 | +1.3 |
| 42.0 | 43.5 | 40.5 | +1.5 |
| 32.0 | 33.5 | 30.5 | +1.5 |
| 30.0 | 31.5 | 28.5 | +1.5 |
| 20.0 | 20.9 | 18.5 | +0.9 |
| 10.0 | 9.9 | 8.5 | −0.1 |

The results show that HFC-32 undergoes the least composition change when the target composition is 90 wt. %, and that even when the initial composition of HFC-32 in the HFC-32/HFO-1234yf refrigerant mixture in the liquid phase is −0.9 wt. % of the target composition, the gap from the target composition falls within a range of ±1.5 wt. % of the target composition from before the transfer to the completion of the transfer.

Based on these results, the lower limit ($y_C$) of the gap between the target composition and the initial composition is represented by the following equation using the target composition (x):

$$1000 y_C = 0.0169 x^3 - 3.6374 x^2 + 199.88 x - 1760.3 \quad (4)$$

Therefore, when the initial composition of HFC-32 in the HFC-32/HFO-1234yf refrigerant mixture in the liquid phase is adjusted within a range of $y_C$ to 1.5 wt. % of the target composition, the gap from the target composition falls within a range of ±1.5 wt. % of the target composition from before the transfer to the completion of the transfer.

(2-4) Example 4

Initial Composition: +1.0 wt. % of the Target Composition

Analysis was performed as in Example 1, except that the initial composition of HFC-32 in the liquid phase before the transfer was adjusted to ±1.0 wt. % of the target composition. Table 9 shows the result of composition changes during the transfer when the initial composition was adjusted to ±1.0 wt. % of the target composition.

TABLE 9

| HFC-32 target composition wt. % | HFC-32 composition before transfer wt. % | HFC-32 composition after extraction of liquid wt. % | Gap from HFC-32 target composition wt. % |
|---|---|---|---|
| 90.0 | 91.0 | 90.5 | +0.5 |
| 80.0 | 81.0 | 79.9 | −0.1 |
| 70.0 | 71.0 | 69.3 | −0.7 |
| 65.0 | 66.0 | 64.0 | −1.0 |
| 64.0 | 65.0 | 62.9 | −1.1 |
| 15.0 | 16.0 | 14.0 | −1.0 |
| 14.0 | 15.0 | 13.1 | −0.9 |
| 10.0 | 11.0 | 9.5 | −0.5 |

As shown in Table 9, by adjusting the initial composition to +1.0 wt. % of the target composition, the gap between the target composition and the initial composition before the transfer falls within a range of ±1.0 wt. % of the target composition when the HFC-32 composition, among the compositions from the start of filling (before the transfer) until the entire liquid is extracted (until the transfer is completed), is within a range of 10 to 14 wt. % or 65 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −1.0 wt. % of the target composition (x) was determined. Table 10 shows the lower limit ($y_D$) of the gap between the target composition and the initial composition in this case.

TABLE 10

| HFC-32 target composition (x) | HFC-32 composition before transfer | HFC-32 composition after extraction of liquid | Lower limit of gap ($y_D$) |
|---|---|---|---|
| 90.0 | 89.5 | 89.0 | −0.5 |
| 80.0 | 80.1 | 79.0 | +0.1 |
| 70.0 | 70.7 | 69.0 | +0.7 |
| 65.0 | 66.0 | 64.0 | +1.0 |
| 14.0 | 14.9 | 13.0 | +0.9 |
| 10.0 | 10.4 | 9.0 | +0.4 |

The results show that HFC-32 undergoes the least composition change when the target composition is 90 wt. %, and that even when the initial composition of HFC-32 in the HFC-32/HFO-1234yf refrigerant mixture in the liquid phase is −0.5 wt. % of the target composition, the gap from the target composition falls within a range of ±1.5 wt. % of the target composition from before the transfer to the completion of the transfer.

Based on these results, the lower limit ($y_D$) of the gap between the target composition and the initial composition is represented by the following equation using the target composition (x):

$$1000 y_D = 0.0160 x^3 - 3.5312 x^2 + 196.02 x - 1210.8 \quad (5)$$

Therefore, when the initial composition of HFC-32 in the HFC-32/HFO-1234yf refrigerant mixture in the liquid phase is adjusted within a range of $y_r$ to 1.0 wt. % of the target composition, the gap from the target composition falls within a range of ±1.0 wt. % of the target composition from before the transfer to the completion of the transfer.

(3) Filling Method when the Filling Amount is 70 wt % of the Maximum Filling Amount The filling amount was calculated by using a value obtained by dividing 1.05 by the specific gravity of the gas at 65° C. as the fill constant.

(3-1) Example 5

Initial Composition: +2.5 wt. % of the Target Composition

Analysis was performed as in Example 1, except that the initial composition of HFC-32 in the liquid phase before the transfer was adjusted to +2.5 wt. % of the target composition, and that the filling amount was 70 wt % of the maximum filling amount. Table 11 shows the result of composition changes during the transfer when the initial composition was adjusted to ±2.5 wt. % of the target composition.

TABLE 11

| HFC-32 target composition wt. % | HFC-32 composition before transfer wt. % | HFC-32 composition after extraction of liquid wt. % | Gap from HFC-32 target composition wt. % |
|---|---|---|---|
| 90.0 | 92.5 | 92.2 | +2.2 |
| 80.0 | 82.5 | 81.7 | +1.7 |
| 70.0 | 72.5 | 71.1 | +1.1 |
| 60.0 | 62.5 | 60.6 | +0.6 |
| 50.0 | 52.5 | 50.2 | +0.2 |
| 40.0 | 42.5 | 39.9 | −0.1 |
| 30.0 | 32.5 | 29.9 | −0.1 |
| 20.0 | 22.5 | 20.3 | +0.3 |
| 10.0 | 12.5 | 11.1 | +1.1 |

As shown in Table 11, by adjusting the initial composition to +2.5 wt. % of the target composition, the gap between the target composition and the initial composition before the transfer falls within a range of ±2.5 wt. % of the target composition when the HFC-32 composition, among the compositions from the start of filling (before the transfer) until the entire liquid is extracted (until the transfer is completed), is in a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −2.5 wt. % of the target composition (x) was determined. Table 12 shows the lower limit ($y_E$) of the gap between the target composition and the initial composition in this case.

TABLE 12

| HFC-32 target composition (x) | HFC-32 composition before transfer | HFC-32 composition after extraction of liquid | Lower limit of gap ($y_E$) |
|---|---|---|---|
| 90.0 | 88.0 | 87.5 | −2.0 |
| 80.0 | 78.6 | 77.5 | −1.4 |
| 70.0 | 69.1 | 67.5 | −0.9 |
| 60.0 | 59.6 | 57.5 | −0.4 |
| 50.0 | 50.0 | 47.5 | +0.0 |
| 40.0 | 40.1 | 37.5 | +0.1 |
| 30.0 | 30.0 | 27.5 | +0.0 |
| 20.0 | 19.5 | 17.5 | −0.5 |
| 10.0 | 8.5 | 7.5 | −1.5 |

The results show that HFC-32 undergoes the least composition change when the target composition is 90 wt. %, and that even when the initial composition of HFC-32 in the HFC-32/HFO-1234yf refrigerant mixture in the liquid phase is −2.0 wt. % of the target composition, the gap from the target composition falls within a range of ±2.5 wt. % of the target composition from before the transfer to the completion of the transfer.

Based on these results, the lower limit ($y_E$) of the gap between the target composition and the initial composition is represented by the following equation using the target composition (x):

$$1000 y_E = 0.013 x^3 - 3.0285 x^2 + 177.93 x - 2975.4 \quad (7)$$

Therefore, when the initial composition of HFC-32 in the HFC-32/HFO-1234yf refrigerant mixture in the liquid phase is adjusted within a range of $y_E$ to 2.5 wt. % of the target composition, the gap from the target composition falls within a range of ±2.5 wt. % of the target composition from before the transfer to the completion of the transfer.

(3-2) Example 6

Initial Composition: +2.0 wt. % of the Target Composition

Analysis was performed as in Example 5, except that the initial composition of HFC-32 in the liquid phase before the transfer was adjusted to +2.0 wt. % of the target composition. Table 13 shows the result of composition changes during the transfer when the initial composition was adjusted to +2.0 wt. % of the target composition.

TABLE 13

| HFC-32 target composition wt. % | HFC-32 composition before transfer wt. % | HFC-32 composition after extraction of liquid wt. % | Gap from HFC-32 target composition wt. % |
|---|---|---|---|
| 90.0 | 92.0 | 91.6 | +1.6 |
| 80.0 | 82.0 | 81.1 | +1.1 |
| 70.0 | 72.0 | 70.6 | +0.6 |
| 60.0 | 62.0 | 60.1 | +0.1 |
| 50.0 | 52.0 | 49.6 | −0.4 |
| 40.0 | 42.0 | 39.4 | −0.6 |

TABLE 13-continued

| HFC-32 target composition wt. % | HFC-32 composition before transfer wt. % | HFC-32 composition after extraction of liquid wt. % | Gap from HFC-32 target composition wt. % |
|---|---|---|---|
| 30.0 | 32.0 | 29.4 | −0.6 |
| 20.0 | 22.0 | 19.8 | −0.2 |
| 10.0 | 12.0 | 10.6 | +0.6 |

As shown in Table 13, by adjusting the initial composition to +2.0 wt. % of the target composition, the gap between the target composition and the initial composition before the transfer falls within a range of ±2.0 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −2.0 wt. % of the target composition (x) was determined. Table 14 shows the lower limit ($y_F$) of the gap between the target composition and the initial composition in this case.

TABLE 14

| HFC-32 target composition (x) | HFC-32 composition before transfer | HFC-32 composition after extraction of liquid | Lower limit of gap ($y_F$) |
|---|---|---|---|
| 90.0 | 88.5 | 88.0 | −1.5 |
| 80.0 | 79.0 | 78.0 | −1.0 |
| 70.0 | 69.6 | 68.0 | −0.4 |
| 60.0 | 60.0 | 58.0 | −0.4 |
| 50.0 | 50.4 | 48.0 | +0.4 |
| 40.0 | 40.6 | 38.0 | +0.6 |
| 30.0 | 30.5 | 28.0 | +0.5 |
| 20.0 | 20.0 | 18.0 | +0.0 |
| 10.0 | 9.1 | 8.0 | −0.9 |

The results show that HFC-32 undergoes the least composition change when the target composition is 90 wt. %, and that even when the initial composition of HFC-32 in the HFC-32/HFO-1234yf refrigerant mixture in the liquid phase is −1.5 wt. % of the target composition, the gap from the target composition falls within a range of ±2.0 wt. % of the target composition from before the transfer to the completion of the transfer.

Based on these results, the lower limit ($y_F$) of the gap between the target composition and the initial composition is represented by the following equation using the target composition (x):

$$1000 y_F = 0.0132 x^3 - 2.991 x^2 + 171.39 x - 2327.0 \quad (8)$$

Therefore, when the initial composition of HFC-32 in the HFC-32/HFO-1234yf refrigerant mixture in the liquid phase is adjusted within a range of $y_F$ to 2.0 wt. % of the target composition, the gap from the target composition falls within a range of ±2.0 wt. % of the target composition from before the transfer to the completion of the transfer.

(3-3) Example 7

Initial Composition: +1.5 wt. % of the Target Composition

Analysis was performed as in Example 5, except that the initial composition of HFC-32 in the liquid phase before the transfer was adjusted to +1.5 wt. % of the target composition. Table 15 shows the result of composition changes during the transfer when the initial composition was adjusted to +1.5 wt. % of the target composition.

TABLE 15

| HFC-32 target composition wt. % | HFC-32 composition before transfer wt. % | HFC-32 composition after extraction of liquid wt. % | Gap from HFC-32 target composition wt. % |
|---|---|---|---|
| 90.0 | 91.5 | 91.1 | +1.1 |
| 80.0 | 81.5 | 80.6 | +0.6 |
| 70.0 | 71.5 | 70.0 | +0.0 |
| 60.0 | 61.5 | 59.5 | −0.5 |
| 50.0 | 51.5 | 49.1 | −0.9 |
| 40.0 | 41.5 | 38.9 | −1.1 |
| 30.0 | 31.5 | 29.0 | −1.0 |
| 20.0 | 21.5 | 19.4 | −0.6 |
| 10.0 | 11.5 | 10.2 | +0.2 |

As shown in Table 15, by adjusting the initial composition to +1.5 wt. % of the target composition, the gap between the target composition and the initial composition before the transfer falls within a range of ±1.5 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase. 0

Moreover, the HFC-32 composition in the HFC-32/HFO-1234yf refrigerant mixture in the liquid phase before the transfer that enabled the HFC-32 composition at the time of the completion of the transfer to be −1.5 wt. % of the target composition (x) was determined. Table 16 shows the lower limit ($y_G$) of the gap between the target composition and the initial composition in this case.

TABLE 16

| HFC-32 target composition (x) | HFC-32 composition before transfer | HFC-32 composition after extraction of liquid | Lower limit of gap ($y_G$) |
|---|---|---|---|
| 90.0 | 89.0 | 88.5 | −1.0 |
| 80.0 | 79.5 | 78.5 | −0.5 |
| 70.0 | 70.0 | 68.5 | +0.0 |
| 60.0 | 60.5 | 58.5 | +0.5 |
| 50.0 | 50.9 | 48.5 | +0.9 |
| 40.0 | 41.1 | 38.5 | +1.1 |
| 30.0 | 31.0 | 28.5 | +1.0 |
| 20.0 | 20.6 | 18.5 | +0.6 |
| 10.0 | 9.6 | 8.5 | −0.4 |

The results show that HFC-32 undergoes the least composition change when the target composition is 90 wt. %, and that even when the initial composition of HFC-32 in the HFC-32/HFO-1234yf refrigerant mixture in the liquid phase is −1.0 wt. % of the target composition, the gap from the target composition falls within a range of ±1.5 wt. % of the target composition from before the transfer to the completion of the transfer.

Based on these results, the lower limit ($y_G$) of the gap between the target composition and the initial composition is represented by the following equation using the target composition (x):

$$1000 y_G = 0.0149 x^3 - 3.2273 x^2 + 179.57 x - 1866.7 \qquad (9)$$

Therefore, when the initial composition of HFC-32 in the HFC-32/HFO-1234yf refrigerant mixture in the liquid phase is adjusted within a range of $y_G$ to 1.5 wt. % of the target composition, the gap from the target composition falls within a range of ±1.5 wt. % of the target composition from before the transfer to the completion of the transfer.

(3-4) Example 8

Initial Composition: +1.0 wt. % of the Target Composition

Analysis was performed as in Example 5, except that the initial composition of HFC-32 in the liquid phase before the transfer was adjusted to +1.0 wt. % of the target composition. Table 17 shows the result of composition changes during the transfer when the initial composition was adjusted to +1.0 wt. % of the target composition.

TABLE 17

| HFC-32 target composition wt. % | HFC-32 composition before transfer wt. % | HFC-32 composition after extraction of liquid wt. % | Gap from HFC-32 target composition wt. % |
|---|---|---|---|
| 90.0 | 91.0 | 90.6 | +0.6 |
| 80.0 | 81.0 | 80.1 | +0.1 |
| 70.0 | 71.0 | 69.5 | −0.5 |
| 60.0 | 61.0 | 59.0 | −1.0 |
| 59.0 | 60.0 | 58.0 | −1.1 |
| 19.0 | 20.0 | 18.0 | −1.1 |
| 18.0 | 19.0 | 17.0 | −1.0 |
| 10.0 | 11.0 | 9.7 | −0.3 |

As shown in Table 17, by adjusting the initial composition to +1.0 wt. % of the target composition, the gap between the target composition and the initial composition before the transfer falls within a range of ±1.0 wt. % of the target composition when the HFC-32 composition, among the compositions from the start of filling (before the transfer) until the entire liquid is extracted (until the transfer is completed), is within a range of 10 to 18 wt. % or 60 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −1.0 wt. % of the target composition (x) was determined. Table 18 shows the lower limit ($y_H$) of the gap between the target composition and the initial composition in this case.

TABLE 18

| HFC-2 target composition (x) | HFC-32 composition before transfer | HFC-32 composition after extraction of liquid | Lower limit of gap ($y_H$) |
| --- | --- | --- | --- |
| 90.0 | 89.5 | 89.0 | −0.5 |
| 80.0 | 80.0 | 79.0 | +0.0 |
| 70.0 | 70.5 | 69.0 | +0.5 |
| 60.0 | 61.0 | 59.0 | +1.0 |
| 18.0 | 19.0 | 17.0 | +1.0 |
| 10.0 | 10.2 | 9.0 | +0.2 |

The results show that HFC-32 undergoes the least composition change when the target composition is 90 wt. %, and that even when the initial composition of HFC-32 in the HFC-32/HFO-1234yf refrigerant mixture in the liquid phase is −0.5 wt. % of the target composition, the gap from the target composition falls within a range of ±1.5 wt. % of the target composition from before the transfer to the completion of the transfer.

Based on these results, the lower limit ($y_H$) of the gap between the target composition and the initial composition is represented by the following equation using the target composition (x):

$$1000y_H = 0.0151x^3 - 3.2439x^2 + 178.32x - 1263.0 \quad (10)$$

Therefore, when the initial composition of HFC-32 in the HFC-32/HFO-1234yf refrigerant mixture in the liquid phase is adjusted within a range of $y_H$ to 1.0 wt. % of the target composition, the gap from the target composition falls within a range of ±1.0 wt. % of the target composition from before the transfer to the completion of the transfer.

(4) Filling Method when the Filling Amount is 100 wt % of the Maximum Filling Amount The filling amount was calculated by using a value obtained by dividing 1.05 by the specific gravity of the gas at 45° C. as the fill constant.

(4-1) Example 9

Initial Composition: +2.5 wt. % of the Target Composition

A 10-L hermetically sealed container was filled with 2,3,3,3-tetrafluoropropene (HFO-1234yf) and difluoromethane (HFC-32) in the maximum amount (100 wt % of the maximum filling amount) that could be filled with the composition immediately before transfer so that the liquid phase had a fixed composition at 40° C., and the container was maintained at 40° C. In this case, the initial composition of HFC-32 in the liquid phase before the transfer was adjusted to +2.5 wt. % of the target composition. Subsequently, as in Reference Example 1, the liquid phase was gradually transferred from the container to another empty container by using a pump, and the component composition was analyzed. Table 2 shows the results of composition changes during the transfer when the initial composition was adjusted to +2.5 wt. % of the target composition.

TABLE 19

| HFC-32 target composition wt. % | HFC-32 composition before transfer wt. % | HFC-32 composition after extraction of liquid wt.% | Gap from HFC-32 target composition wt. % |
| --- | --- | --- | --- |
| 90.0 | 92.5 | 92.1 | +2.1 |
| 80.0 | 82.5 | 81.5 | +1.5 |
| 70.0 | 72.5 | 70.8 | +0.8 |
| 60.0 | 62.5 | 60.2 | +0.2 |
| 50.0 | 52.5 | 49.6 | −0.4 |
| 40.0 | 42.5 | 39.3 | −0.7 |
| 30.0 | 32.5 | 29.4 | −0.6 |
| 20.0 | 22.5 | 19.8 | −0.2 |
| 10.0 | 12.5 | 10.7 | +0.7 |

As shown in Table 19, by adjusting the initial composition to +2.5 wt. % of the target composition, the gap between the target composition and the initial composition before the transfer falls within a range of ±2.5 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −2.5 wt. % of the target composition (x) was determined. Table 20 shows the lower limit ($y_I$) of the gap between the target composition and the initial composition in this case.

TABLE 20

| HFC-32 target composition (x) | HFC-32 composition before transfer | HFC-32 composition after extraction of liquid | Lower limit of gap ($y_I$) |
| --- | --- | --- | --- |
| 90.0 | 88.2 | 87.5 | −1.8 |
| 80.0 | 78.8 | 77.5 | −1.2 |
| 70.0 | 69.4 | 67.5 | −0.6 |
| 60.0 | 60.0 | 57.5 | +0.0 |
| 50.0 | 50.5 | 47.5 | +0.5 |
| 40.0 | 40.7 | 37.5 | +0.7 |
| 30.0 | 30.6 | 27.5 | +0.6 |
| 20.0 | 20.0 | 17.5 | +0.0 |
| 10.0 | 8.8 | 7.5 | −1.2 |

The results show that HFC-32 undergoes the least composition change when the target composition is 90 wt. %, and that even when the initial composition of HFC-32 in the HFC-32/HFO-1234yf refrigerant mixture in the liquid phase is −1.8 wt. % of the target composition, the gap from the target composition falls within a range of ±2.5 wt. % of the target composition from before the transfer to the completion of the transfer.

Based on these results, the lower limit ($y_I$) of the gap between the target composition and the initial composition is represented by the following equation using the target composition (x):

$$1000y_I = 0.0181x^3 - 3.9611x^2 + 223.1x - 3040.4 \quad (12)$$

Therefore, when the initial composition of HFC-32 in the HFC-32/HFO-1234yf refrigerant mixture in the liquid phase is adjusted within a range of $y_I$ to 2.5 wt. % of the target composition, the gap from the target composition falls within a range of ±2.5 wt. % of the target composition from before the transfer to the completion of the transfer.

(4-2) Example 10

Initial Composition: +2.0 wt. % of the Target Composition

Analysis was performed as in Example 1, except that the initial composition of HFC-32 in the liquid phase before the transfer was adjusted to +2.0 wt. % of the target composition. Table 21 shows the results of composition changes during the transfer when the initial composition was adjusted to +2.0 wt. % of the target composition.

TABLE 21

| HFC-32 target composition wt. % | HFC-32 composition before transfer wt. % | HFC-32 composition after extraction of liquid wt.% | Gap from HFC-32 target composition wt. % |
| --- | --- | --- | --- |
| 90.0 | 92.0 | 91.6 | +1.6 |
| 80.0 | 82.0 | 80.9 | +0.9 |
| 70.0 | 72.0 | 70.3 | +0.3 |
| 60.0 | 62.0 | 59.6 | −0.4 |
| 50.0 | 52.0 | 49.1 | −0.9 |
| 40.0 | 42.0 | 38.8 | −1.2 |
| 30.0 | 32.0 | 28.9 | −1.1 |
| 20.0 | 22.0 | 19.4 | −0.6 |
| 10.0 | 12.0 | 10.3 | +0.3 |

As shown in Table 21, by adjusting the initial composition to +2.0 wt. % of the target composition, the gap between the target composition and the initial composition before the transfer falls within a range of ±2.0 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −2.0 wt. % of the target composition (x) was determined. Table 22 shows the lower limit ($y_j$) of the gap between the target composition and the initial composition in this case.

TABLE 22

| HFC-32 target composition (x) | HFC-32 composition before transfer | HFC-32 composition after extraction of liquid | Lower limit of gap ($y_j$) |
| --- | --- | --- | --- |
| 90.0 | 88.6 | 88.0 | −1.3 |
| 80.0 | 79.2 | 78.0 | −0.7 |
| 70.0 | 69.8 | 68.0 | −0.1 |
| 60.0 | 60.3 | 58.0 | +0.5 |
| 50.0 | 50.8 | 48.0 | +1.0 |
| 40.0 | 41.0 | 38.0 | +1.2 |
| 30.0 | 30.9 | 28.0 | +1.1 |
| 20.0 | 20.4 | 18.0 | +0.6 |
| 10.0 | 9.3 | 8.0 | −0.6 |

The results show that HFC-32 undergoes the least composition change when the target composition is 90 wt. %, and that even when the initial composition of HFC-32 in the HFC-32/HFO-1234yf refrigerant mixture in the liquid phase is −1.3 wt. % of the target composition, the gap from the target composition falls within a range of ±2.0 wt. % of the target composition from before the transfer to the completion of the transfer.

Based on these results, the lower limit ($y_j$) of the gap between the target composition and the initial composition is represented by the following equation using the target composition (x):

$$1000y_j = 0.0177x^2 - 3.8614x^2 + 215.42x - 2373.5 \tag{13}$$

Therefore, when the initial composition of HFC-32 in the HFC-32/HFO-1234yf refrigerant mixture in the liquid phase is adjusted within a range of $y_j$ to 2.0 wt. % of the target composition, the gap from the target composition falls within a range of ±2.0 wt. % of the target composition from before the transfer to the completion of the transfer.

(4-3) Example 11

Initial Composition: +1.5 wt. % of the Target Composition

Analysis was performed as in Example 1, except that the initial composition of HFC-32 in the liquid phase before the transfer was adjusted to +1.5 wt. % of the target composition. Table 7 shows the result of composition changes during the transfer when the initial composition was adjusted to +1.5 wt. % of the target composition.

TABLE 23

| HFC-32 target composition wt. % | HFC-32 composition before transfer wt. % | HFC-32 composition after extraction of liquid wt. % | Gap from HFC-32 target composition wt.% |
| --- | --- | --- | --- |
| 90.0 | 91.5 | 91.0 | +1.0 |
| 80.0 | 81.5 | 80.4 | +0.4 |
| 70.0 | 71.5 | 69.7 | −0.3 |
| 60.0 | 61.5 | 59.1 | −0.9 |
| 50.0 | 51.5 | 48.6 | −1.4 |
| 47.5 | 49.0 | 46.0 | −1.5 |
| 26.5 | 28.0 | 25.0 | −1.5 |
| 20.0 | 21.5 | 18.9 | −1.1 |
| 10.0 | 11.5 | 9.9 | −0.1 |

As shown in Table 7, by adjusting the initial composition to +1.5 wt. % of the target composition, the gap between the target composition and the initial composition before the transfer falls within a range of ±1.5 wt. % of the target composition when the HFC-32 composition, among the compositions from the start of filling (before the transfer) until the entire liquid is extracted (until the transfer is completed), is within a range of 10 to 26.5 wt. % or 47.5 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −1.5 wt. % of the target composition (x) was determined. Table 24 shows the lower limit ($y_K$) of the gap between the target composition and the initial composition in this case.

TABLE 24

| HFC-32 target composition (x) | HFC-32 composition before transfer | HFC-32 composition after extraction of liquid | Lower limit of gap ($y_K$) |
|---|---|---|---|
| 90.0 | 89.1 | 88.5 | −0.9 |
| 80.0 | 79.8 | 78.5 | −0.2 |
| 70.0 | 70.4 | 68.5 | +0.4 |
| 60.0 | 61.0 | 58.5 | +1.0 |
| 50.0 | 51.5 | 48.5 | +1.5 |
| 47.5 | 49.0 | 46.0 | +1.5 |
| 26.5 | 28.0 | 25.0 | +1.5 |
| 20.0 | 21.1 | 18.5 | +1.1 |
| 10.0 | 10.0 | 8.5 | 0.0 |

The results show that HFC-32 undergoes the least composition change when the target composition is 90 wt. %, and that even when the initial composition of HFC-32 in the HFC-32/HFO-1234yf refrigerant mixture in the liquid phase is −0.9 wt. % of the target composition, the gap from the target composition falls within a range of ±1.5 wt. % of the target composition from before the transfer to the completion of the transfer.

Based on these results, the lower limit ($y_K$) of the gap between the target composition and the initial composition is represented by the following equation using the target composition (x):

$$1000y_K = 0.0172x^3 - 3.7549x^2 + 207.43x - 1705.9 \quad (14)$$

Therefore, when the initial composition of HFC-32 in the HFC-32/HFO-1234yf refrigerant mixture in the liquid phase is adjusted within a range of $y_K$ to 1.5 wt. % of the target composition, the gap from the target composition falls within a range of ±1.5 wt. % of the target composition from before the transfer to the completion of the transfer.

(4-4) Example 12

Initial Composition: +1.0 wt. % of the Target Composition

Analysis was performed as in Example 1, except that the initial composition of HFC-32 in the liquid phase before the transfer was adjusted to +1.0 wt. % of the target composition. Table 25 shows the result of composition changes during the transfer when the initial composition was adjusted to +1.0 wt. % of the target composition.

TABLE 25

| HFC-32 target composition wt. % | HFC-32 composition before transfer wt. % | HFC-32 composition after extraction of liquid wt. % | Gap from HFC-32 target composition wt. % |
|---|---|---|---|
| 90.0 | 91.0 | 90.5 | +0.5 |
| 80.0 | 81.0 | 79.9 | −0.1 |
| 70.0 | 71.0 | 69.2 | −0.8 |
| 67.0 | 68.0 | 66.0 | −1.0 |
| 13.5 | 14.5 | 12.5 | −1.0 |
| 10.0 | 11.0 | 9.4 | −0.6 |

As shown in Table 25, by adjusting the initial composition to +1.0 wt. % of the target composition, the gap between the target composition and the initial composition before the transfer falls within a range of ±1.0 wt. % of the target composition when the HFC-32 composition, among the compositions from the start of filling (before the transfer) until the entire liquid is extracted (until the transfer is completed), is within a range of 10 to 13.5 wt. % or 67 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −1.0 wt. % of the target composition (x) was determined. Table 26 shows the lower limit ($y_L$) of the gap between the target composition and the initial composition in this case.

TABLE 26

| HFC-32 target composition (x) | HFC-32 composition before transfer | HFC-32 composition after extraction of liquid | Lower limit of gap ($y_L$) |
|---|---|---|---|
| 90.0 | 89.6 | 89.0 | −0.4 |
| 80.0 | 80.2 | 79.0 | +0.2 |
| 70.0 | 70.8 | 69.0 | +0.8 |
| 67.0 | 68.0 | 66.0 | +1.0 |
| 13.5 | 14.5 | 12.5 | +1.0 |
| 10.0 | 10.6 | 9.0 | +0.6 |

The results show that HFC-32 undergoes the least composition change when the target composition is 90 wt. %, and that even when the initial composition of HFC-32 in the HFC-32/HFO-1234yf refrigerant mixture in the liquid phase is −0.4 wt. % of the target composition, the gap from the target composition falls within a range of ±1.0 wt. % of the target composition from before the transfer to the completion of the transfer.

Based on these results, the lower limit ($y_L$) of the gap between the target composition and the initial composition is represented by the following equation using the target composition (x):

$$1000y_L = 0.0178x^3 - 3.8363x^2 + 209.59x - 1194.3 \quad (15)$$

Therefore, when the initial composition of HFC-32 in the HFC-32/HFO-1234yf refrigerant mixture in the liquid phase is adjusted within a range of $y_L$ to 1.0 wt. % of the target composition, the gap from the target composition falls within a range of ±1.0 wt. % of the target composition from before the transfer to the completion of the transfer.

(5) Reference Example 2

A 10-L hermetically sealed container was filled with 2,3,3,3-tetrafluoropropene (HFO-1234yf) and difluoromethane (HFC-32) in the maximum amount that could be filled with the composition immediately before transfer so that the liquid phase had a fixed composition at 40° C., and the container was maintained at 40° C. The maximum filling amount is calculated as below:

$G = V/C$

G: Mass of fluorocarbon (kg)
V: Capacity (L) of the container
C: Constant according to the type of fluorocarbon The fill constant C here is determined in Japan as a value obtained by dividing 1.05 by the specific gravity of the gas at 48° C.

When export is involved, according to international law, the fill constant C is defined as a value obtained by dividing 1.05 by the specific gravity of the gas at 65° C. when passing through tropical regions, and it is defined as a value obtained by dividing 1.05 by the specific gravity of the gas at 45° C. when only regions other than tropical regions are involved.

In Reference Example 2, a value obtained by dividing 1.05 by the specific gravity of the gas at 45° C. was used as the fill constant.

The reasons for selecting 40° C. as the temperature during the transfer are that the use of containers at a temperature over 40° C. is prohibited by the High Pressure Gas Safety Act of Japan, the Regulations for the Carriage and Storage of Dangerous Goods in Ship, the International Maritime Dangerous Goods Code, etc., and that since a larger composition change develops at a higher temperature, data obtained at a temperature of 40° C. is assumed to be data from the severest conditions.

Subsequently, the liquid phase was gradually transferred from the container to another empty container using a pump. Part of the gas was collected through a sampling valve disposed in the middle of a pipe for extracting the liquid phase, and the component composition was analyzed by gas chromatography.

Table 27 shows the results of composition changes during the transfer in Reference Example 2 when the filling amount is calculated by using, as the fill constant, a value obtained by dividing 1.05 by the specific gravity of the gas at 45° C. 45° C. (100 wt. % of the Maximum Filling Amount)

TABLE 27

| HFC-32 target composition (x) wt. % | HFC-32 composition before transfer wt.% | HFC-32 composition after extraction of liquid wt. % | Gap from HFC-32 target composition wt. % |
|---|---|---|---|
| 90.0 | 90.0 | 89.5 | −0.5 |
| 80.0 | 80.0 | 78.8 | −1.2 |
| 70.0 | 70.0 | 68.1 | −1.9 |
| 60.0 | 60.0 | 57.5 | −2.5 |
| 50.0 | 50.0 | 47.0 | −3.0 |
| 40.0 | 40.0 | 36.8 | −3.2 |
| 30.0 | 30.0 | 26.9 | −3.1 |
| 20.0 | 20.0 | 17.5 | −2.5 |
| 10.0 | 10.0 | 8.5 | −1.5 |

As shown in Table 27, when the refrigerant mixture is transferred without taking any measure, a composition gap (composition change) of up to 3 to 4 wt. % from the target composition develops when the entire liquid before transfer is extracted (at the time of the completion of the transfer). Thus, refrigeration capacity and refrigerant capacity (e.g., COP) expected from the target composition cannot be ensured during start and completion of the transfer.

Table 27 reveals that the concentration of HFC-32 in the HFC-32/HFO-1234yf refrigerant mixture at the time of the completion of the transfer was lower than that at the time of the start of the transfer. This is because the boiling point of HFC-32 is lower than the boiling point of HFO-1234yf, and when the space created due to extraction of refrigerant is refilled with vapor evaporated from the liquid phase during the transfer, HFC-32 evaporates in an amount greater than that of HFO-1234yf, causing a reduction in the HFC-32 concentration in the liquid phase. For this reason, it was found that HFC-32 was preferably filled into a feeding container before the transfer in an amount greater than that of the target composition. Even when the composition change during the transfer was the lowest (HFC-32: 90 wt. %), the width of the composition change during start and completion of the transfer was about 0.5 wt. %.

(6) Filling Method (Tolerance: ±2.0)

(6-1) Example 5

Initial Filling Amount in the Feeding Container: 100 wt. %

A 10-L hermetically sealed container was filled with 2,3,3,3-tetrafluoropropene (HFO-1234yf) and difluoromethane (HFC-32) in the maximum amount (100 wt % of the maximum filling amount) that could be filled with the composition immediately before transfer so that the liquid phase had a fixed composition at 40° C., and the container was maintained at 40° C. In this case, the initial composition of HFC-32 in the liquid phase before the transfer was adjusted to +2.0 wt. % of the target composition. Subsequently, as in Reference Example 2, the liquid phase was gradually transferred from the container to another empty container by using a pump, and the component composition was analyzed. Table 28 shows the results of composition changes during the transfer when the initial composition was adjusted to +2.0 wt. % of the target composition.

TABLE 28

| HFC-32 target composition (x) wt. % | HFC-32 composition before transfer wt. % | HFC-32 composition after extraction of liquid wt. % | Gap from HFC-32 target composition wt. % |
|---|---|---|---|
| 90.0 | 92.0 | 91.6 | 1.6 |
| 80.0 | 82.0 | 80.9 | 0.9 |
| 70.0 | 72.0 | 70.3 | 0.3 |
| 60.0 | 62.0 | 59.6 | −0.4 |
| 50.0 | 52.0 | 49.1 | −0.9 |
| 40.0 | 42.0 | 38.8 | −1.2 |
| 30.0 | 32.0 | 28.9 | −1.1 |
| 20.0 | 22.0 | 19.4 | −0.6 |
| 10.0 | 12.0 | 10.3 | 0.3 |

As shown in Table 28, by adjusting the initial composition to +2.0 wt. % of the target composition, the gap between the target composition and the initial composition before the transfer falls within a range of ±2.0 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −2 wt. % of the target composition (x) was determined. Table 29 shows the lower limit ($y_{P1}$) of the gap between the target composition and the initial composition in this case.

TABLE 29

| HFC-32 target composition (x) wt. % | HFC-32 composition before transfer wt. % | HFC-32 composition after extraction of liquid wt. % | Lower limit of gap ($y_{P1}$) wt. % |
|---|---|---|---|
| 90.0 | 88.7 | 88.0 | −1.3 |
| 80.0 | 79.3 | 78.0 | −0.7 |

TABLE 29-continued

| HFC-32 target composition (x) wt. % | HFC-32 composition before transfer wt. % | HFC-32 composition after extraction of liquid wt. % | Lower limit of gap ($y_{p1}$) wt. % |
|---|---|---|---|
| 70.0 | 69.9 | 68.0 | −0.1 |
| 60.0 | 60.5 | 58.0 | 0.5 |
| 50.0 | 51.0 | 48.0 | 1.0 |
| 47.5 | 41.2 | 38.0 | 1.2 |
| 26.5 | 31.1 | 28.0 | 1.1 |
| 20.0 | 20.6 | 18.0 | 0.6 |
| 10.0 | 9.4 | 8.0 | −0.6 |

The results show that HFC-32 undergoes the least composition change when the target composition is 90 wt. %, and that even when the initial composition of HFC-32 in the HFC-32/HFO-1234yf refrigerant mixture in the liquid phase is −1.3 wt. % of the target composition, the gap from the target composition falls within a range of ±2.0 wt. % of the target composition from before the transfer to the completion of the transfer.

Based on these results, the lower limit ($y_{P1}$) of the gap between the target composition and the initial composition is represented by the following equation using the target composition (x):

$$1000 y_{P1} = 0.0177 x^3 - 3.8614 x^2 + 215.42 x - 2373.5 \quad (17)$$

Therefore, when the initial composition of HFC-32 in the HFC-32/HFO-1234yf refrigerant mixture in the liquid phase is adjusted within a range of $y_n$ to 2 wt. % of the target composition, the gap from the target composition falls within a range of ±2.0 wt. % of the target composition from before the transfer to the completion of the transfer.

(6-2) Example 14

Initial Filling Amount in the Feeding Container: 90 wt. %

A 10-L hermetically sealed container was filled with HFO-1234yf and HFC-32 in an amount equal to 90 wt % of the maximum filling amount that could be filled with the composition immediately before transfer so that the liquid phase had a fixed composition at 40° C., and the container was maintained at 40° C. In this case, the initial composition of HFC-32 in the liquid phase before the transfer was adjusted to +2.0 wt. % of the target composition. Subsequently, as in Example 5, the liquid phase was gradually transferred from the container to another empty container by using a pump, and the component composition was analyzed. Table 30 shows the results of composition changes during the transfer when the initial composition was adjusted to +2.0 wt. % of the target composition.

TABLE 30

| HFC-32 target composition (x) wt. % | HFC-32 composition before transfer wt. % | HFC-32 composition after extraction of liquid wt. % | Gap from HFC-32 target composition wt. % |
|---|---|---|---|
| 90.0 | 92.0 | 91.6 | 1.6 |
| 80.0 | 82.0 | 81.0 | 1.0 |
| 70.0 | 72.0 | 70.3 | 0.3 |
| 60.0 | 62.0 | 59.7 | −0.3 |

TABLE 30-continued

| HFC-32 target composition (x) wt. % | HFC-32 composition before transfer wt. % | HFC-32 composition after extraction of liquid wt. % | Gap from HFC-32 target composition wt. % |
|---|---|---|---|
| 50.0 | 52.0 | 49.2 | −0.8 |
| 40.0 | 42.0 | 38.9 | −1.1 |
| 30.0 | 32.0 | 29.0 | −1.0 |
| 20.0 | 22.0 | 19.5 | −0.5 |
| 10.0 | 12.0 | 10.4 | 0.4 |

As shown in Table 30, by adjusting the initial composition to +2 wt. % of the target composition, the gap between the target composition and the initial composition before the transfer falls within a range of ±2.0 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −2.0 wt. % of the target composition (x) was determined. Table 31 shows the lower limit ($y_{P2}$) of the gap between the target composition and the initial composition in this case.

TABLE 31

| HFC-32 target composition (x) wt. % | HFC-32 composition before transfer wt. % | HFC-32 composition after extraction of liquid wt. % | Lower limit of gap ($y_{p2}$) wt. % |
|---|---|---|---|
| 90.0 | 88.7 | 88.0 | −1.3 |
| 80.0 | 79.2 | 78.0 | −0.8 |
| 70.0 | 69.8 | 68.0 | −0.2 |
| 60.0 | 60.4 | 58.0 | 0.4 |
| 50.0 | 50.9 | 48.0 | 0.9 |
| 40.0 | 41.1 | 38.0 | 1.1 |
| 30.0 | 31.0 | 28.0 | 1.0 |
| 20.0 | 20.5 | 18.0 | 0.5 |
| 10.0 | 9.4 | 8.0 | −0.6 |

The results show that HFC-32 undergoes the least composition change when the target composition is 90 wt. %, and that even when the initial composition of HFC-32 in the HFC-32/HFO-1234yf refrigerant mixture in the liquid phase is −1.3 wt. % of the target composition, the gap from the target composition falls within a range of ±2.0 wt. % of the target composition from before the transfer to the completion of the transfer.

Based on these results, the lower limit ($y_{P2}$) of the gap between the target composition and the initial composition is represented by the following equation using the target composition (x):

$$1000 y_{P2} = 0.0172 x^3 - 3.7532 x^2 + 210.1 x - 2419.3 \quad (18)$$

Therefore, when the initial composition of HFC-32 in the HFC-32/HFO-1234yf refrigerant mixture in the liquid phase is adjusted within a range of $y_{P2}$ to 2.0 wt. % of the target composition, the gap from the target composition falls within a range of ±2.0 wt. % of the target composition from before the transfer to the completion of the transfer.

(6-3) Example 15

Initial Filling Amount in the Feeding Container: 80 wt. %

A 10-L hermetically sealed container was filled with HFO-1234yf and HFC-32 in an amount equal to 80 wt % of the maximum filling amount that could be filled with the composition immediately before transfer so that the liquid phase had a fixed composition at 40° C., and the container was maintained at 40° C. In this case, the initial composition of HFC-32 in the liquid phase before the transfer was adjusted to +2.0 wt. % of the target composition. Subsequently, as in Example 5, the liquid phase was gradually transferred from the container to another empty container by using a pump, and the component composition was analyzed. Table 32 shows the results of composition changes during the transfer when the initial composition was adjusted to +2.0 wt. % of the target composition.

TABLE 32

| HFC-32 target composition (x) wt. % | HFC-32 composition before transfer wt. % | HFC-32 composition after extraction of liquid wt. % | Gap from HFC-32 target composition wt. % |
|---|---|---|---|
| 90.0 | 92.0 | 91.6 | 1.6 |
| 80.0 | 82.0 | 81.0 | 1.0 |
| 70.0 | 72.0 | 70.4 | 0.4 |
| 60.0 | 62.0 | 59.8 | −0.2 |
| 50.0 | 52.0 | 49.3 | −0.7 |
| 40.0 | 42.0 | 39.1 | −0.9 |
| 30.0 | 32.0 | 29.1 | −0.9 |
| 20.0 | 22.0 | 19.6 | −0.4 |
| 10.0 | 12.0 | 10.4 | 0.4 |

As shown in Table 32, by adjusting the initial composition to +2 wt. % of the target composition, the gap between the target composition and the initial composition before the transfer falls within a range of ±2 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −2 wt. % of the target composition (x) was determined. Table 33 shows the lower limit ($y_{P3}$) of the gap between the target composition and the initial composition in this case.

TABLE 33

| HFC-32 target composition (x) wt. % | HFC-32 composition before transfer wt. % | HFC-32 composition after extraction of liquid wt. % | Lower limit of gap ($y_{p3}$) wt. % |
|---|---|---|---|
| 90.0 | 88.6 | 88.0 | −1.4 |
| 80.0 | 79.2 | 78.0 | −0.8 |
| 70.0 | 69.8 | 68.0 | −0.2 |
| 60.0 | 60.3 | 58.0 | 0.3 |
| 50.0 | 50.7 | 48.0 | 0.7 |
| 40.0 | 41.0 | 38.0 | 1.0 |
| 30.0 | 30.9 | 28.0 | 0.9 |
| 20.0 | 20.3 | 18.0 | 0.3 |
| 10.0 | 9.3 | 8.0 | −0.7 |

The results show that HFC-32 undergoes the least composition change when the target composition is 90 wt. %, and that even when the initial composition of HFC-32 in the HFC-32/HFO-1234yf refrigerant mixture in the liquid phase is −1.4 wt. % of the target composition, the gap from the target composition falls within a range of ±2.0 wt. % of the target composition from before the transfer to the completion of the transfer.

Based on these results, the lower limit ($y_{P3}$) of the gap between the target composition and the initial composition is represented by the following equation using the target composition (x):

$$1000y_{P3} = 0.016x^3 - 3.5202x^2 + 198.2x - 2382.2 \qquad (19)$$

Therefore, when the initial composition of HFC-32 in the HFC-32/HFO-1234yf refrigerant mixture in the liquid phase is adjusted within a range of $y_{P3}$ to 2 wt. % of the target composition, the gap from the target composition falls within a range of ±2.0 wt. % of the target composition from before the transfer to the completion of the transfer.

(6-4) Example 16

Initial Filling Amount in the Feeding Container: 70 wt. %

A 10-L hermetically sealed container was filled with HFO-1234yf and HFC-32 in an amount equal to 70 wt % of the maximum filling amount that could be filled with the composition immediately before transfer so that the liquid phase had a fixed composition at 40° C., and the container was maintained at 40° C. In this case, the initial composition of HFC-32 in the liquid phase before the transfer was adjusted to +2.0 wt. % of the target composition. Subsequently, as in Example 5, the liquid phase was gradually transferred from the container to another empty container by using a pump, and the component composition was analyzed. Table 34 shows the results of composition changes during the transfer when the initial composition was adjusted to +2.0 wt. % of the target composition.

TABLE 34

| HFC-32 target composition (x) wt. % | HFC-32 composition before transfer wt. % | HFC-32 composition after extraction of liquid wt. % | Gap from HFC-32 target composition wt. % |
|---|---|---|---|
| 90.0 | 92.0 | 91.6 | 1.6 |
| 80.0 | 82.0 | 81.1 | 1.1 |
| 70.0 | 72.0 | 70.5 | 0.5 |
| 60.0 | 62.0 | 59.9 | −0.1 |
| 50.0 | 52.0 | 49.5 | −0.5 |
| 40.0 | 42.0 | 39.2 | −0.8 |
| 30.0 | 32.0 | 29.3 | −0.7 |

TABLE 34-continued

| HFC-32 target composition (x) wt. % | HFC-32 composition before transfer wt. % | HFC-32 composition after extraction of liquid wt. % | Gap from HFC-32 target composition wt. % |
|---|---|---|---|
| 20.0 | 22.0 | 19.7 | −0.3 |
| 10.0 | 12.0 | 10.5 | 0.5 |

As shown in Table 34, by adjusting the initial composition to +2.0 wt. % of the target composition, the gap between the target composition and the initial composition before the transfer falls within a range of ±2.0 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −2 wt. % of the target composition (x) was determined. Table 35 shows the lower limit ($y_{P4}$) of the gap between the target composition and the initial composition in this case.

TABLE 35

| HFC-32 target composition (x) wt. % | HFC-32 composition before transfer wt. % | HFC-32 composition after extraction of liquid wt. % | Lower limit of gap ($y_{P4}$) wt. % |
|---|---|---|---|
| 90.0 | 88.6 | 88.0 | −1.4 |
| 80.0 | 79.1 | 78.0 | −0.9 |
| 70.0 | 69.7 | 68.0 | −0.3 |
| 60.0 | 60.2 | 58.0 | 0.2 |
| 50.0 | 50.6 | 48.0 | 0.6 |
| 40.0 | 40.8 | 38.0 | 0.8 |
| 30.0 | 30.7 | 28.0 | 0.7 |
| 20.0 | 20.2 | 18.0 | 0.2 |
| 10.0 | 9.2 | 8.0 | −0.8 |

The results show that HFC-32 undergoes the least composition change when the target composition is 90 wt. %, and that even when the initial composition of HFC-32 in the HFC-32/HFO-1234yf refrigerant mixture in the liquid phase is −1.4 wt. % of the target composition, the gap from the target composition falls within a range of ±2.0 wt. % of the target composition from before the transfer to the completion of the transfer.

Based on these results, the lower limit ($y_{P4}$) of the gap between the target composition and the initial composition is represented by the following equation using the target composition (x):

$$1000 y_{P4} = 0.0152 x^3 - 3.3513 x^2 + 189.76 x - 2412.5 \quad (20)$$

Therefore, when the initial composition of HFC-32 in the HFC-32/HFO-1234yf refrigerant mixture in the liquid phase is adjusted within a range of $y_{P4}$ to 2 wt. % of the target composition, the gap from the target composition falls within a range of ±2.0 wt. % of the target composition from before the transfer to the completion of the transfer.

(6-5) Example 17

Initial Filling Amount in the Feeding Container: 60 wt %

A 10-L hermetically sealed container was filled with HFO-1234yf and HFC-32 in an amount equal to 60% of the maximum filling amount that could be filled with the composition immediately before transfer so that the liquid phase had a fixed composition at 40° C., and the container was maintained at 40° C. In this case, the initial composition of HFC-32 in the liquid phase before the transfer was adjusted to +2.0 wt. % of the target composition. Subsequently, as in Example 5, the liquid phase was gradually transferred from the container to another empty container by using a pump, and the component composition was analyzed. Table 36 shows the results of composition changes during the transfer when the initial composition was adjusted to +2.0 wt. % of the target composition.

TABLE 36

| HFC-32 target composition (x) wt. % | HFC-32 composition before transfer wt. % | HFC-32 composition after extraction of liquid wt. % | Gap from HFC-32 target composition wt. % |
|---|---|---|---|
| 90.0 | 92.0 | 91.6 | 1.6 |
| 80.0 | 82.0 | 81.1 | 1.1 |
| 70.0 | 72.0 | 70.6 | 0.6 |
| 60.0 | 62.0 | 60.1 | 0.1 |
| 50.0 | 52.0 | 49.6 | −0.4 |
| 40.0 | 42.0 | 39.4 | −0.6 |
| 30.0 | 32.0 | 29.5 | −0.5 |
| 20.0 | 22.0 | 19.9 | −0.1 |
| 10.0 | 12.0 | 10.6 | 0.6 |

As shown in Table 36, by adjusting the initial composition to +2 wt. % of the target composition, the gap between the target composition and the initial composition before the transfer falls within a range of ±2.0 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −2 wt. % of the target composition (x) was determined. Table 35 shows the lower limit ($y_{P5}$) of the gap between the target composition and the initial composition in this case.

TABLE 37

| HFC-32 target composition (x) wt. % | HFC-32 composition before transfer wt. % | HFC-32 composition after extraction of liquid wt. % | Lower limit of gap ($y_{P5}$) wt. % |
|---|---|---|---|
| 90.0 | 88.6 | 88.0 | −1.4 |
| 80.0 | 79.1 | 78.0 | −0.9 |
| 70.0 | 69.6 | 68.0 | −0.4 |
| 60.0 | 60.1 | 58.0 | 0.1 |
| 50.0 | 50.5 | 48.0 | 0.5 |

TABLE 37-continued

| HFC-32 target composition (x) wt. % | HFC-32 composition before transfer wt. % | HFC-32 composition after extraction of liquid wt. % | Lower limit of gap ($y_{P5}$) wt. % |
|---|---|---|---|
| 47.5 | 40.7 | 38.0 | 0.7 |
| 26.5 | 30.5 | 28.0 | 0.5 |
| 20.0 | 20.1 | 18.0 | 0.1 |
| 10.0 | 9.1 | 8.0 | -0.9 |

The results show that HFC-32 undergoes the least composition change when the target composition is 90 wt. %, and that even when the initial composition of HFC-32 in the HFC-32/HFO-1234yf refrigerant mixture in the liquid phase is -1.4 wt. % of the target composition, the gap from the target composition falls within a range of ±2.0 wt. % of the target composition from before the transfer to the completion of the transfer.

Based on these results, the lower limit ($y_{P5}$) of the gap between the target composition and the initial composition is represented by the following equation using the target composition (x):

$$1000y_{P5}=0.0138x^3-3.0892x^2+176.2x-2385.7 \qquad (21)$$

Therefore, when the initial composition of HFC-32 in the HFC-32/HFO-1234yf refrigerant mixture in the liquid phase is adjusted within a range of $y_{P5}$ to 2 wt. % of the target composition, the gap from the target composition falls within a range of ±2.0 wt. % of the target composition from before the transfer to the completion of the transfer.

(7) Filling Method (Tolerance: ±1.5)

(7-1) Example 18

Initial Filling Amount in the Feeding Container: 100 wt %

A 10-L hermetically sealed container was filled with HFO-1234yf and HFC-32 in the maximum amount (100% of the maximum filling amount) that could be filled with the composition immediately before transfer so that the liquid phase had a fixed composition at 40° C., and the container was maintained at 40° C. In this case, the initial composition of HFC-32 in the liquid phase before the transfer was adjusted to +1.5 wt. % of the target composition. Subsequently, as in Reference Example 2, the liquid phase was gradually transferred from the container to another empty container by using a pump, and the component composition was analyzed. Table 38 shows the results of composition changes during the transfer when the initial composition was adjusted to +1.5 wt. % of the target composition.

TABLE 38

| HFC-32 target composition (x) wt. % | HFC-32 composition before transfer wt. % | HFC-32 composition after extraction of liquid wt. % | Gap from HFC-32 target composition wt. % |
|---|---|---|---|
| 90.0 | 91.5 | 91.0 | 1.0 |
| 80.0 | 81.5 | 80.4 | 0.4 |
| 70.0 | 71.5 | 69.7 | -0.3 |
| 60.0 | 61.5 | 59.1 | -0.9 |

TABLE 38-continued

| HFC-32 target composition (x) wt. % | HFC-32 composition before transfer wt. % | HFC-32 composition after extraction of liquid wt. % | Gap from HFC-32 target composition wt. % |
|---|---|---|---|
| 50.0 | 51.5 | 48.6 | -1.4 |
| 47.5 | 49.0 | 46.0 | -1.5 |
| 26.5 | 28.0 | 25.0 | -1.5 |
| 20.0 | 21.5 | 18.9 | -1.1 |
| 10.0 | 11.5 | 9.9 | -0.1 |

As shown in Table 38, by adjusting the initial composition to +1.5 wt. % of the target composition, the gap between the target composition and the initial composition before the transfer falls within a range of ±1.5 wt. % of the target composition when the HFC-32 composition, among the compositions from the start of filling (before the transfer) until the entire liquid is extracted (until the transfer is completed), is within a range of 10 to 26.5 wt. % or 47.5 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be -1.5 wt. % of the target composition (x) was determined. Table 39 shows the lower limit ($y_{Q1}$) of the gap between the target composition and the initial composition in this case.

TABLE 39

| HFC-32 target composition (x) wt. % | HFC-32 composition before transfer wt. % | HFC-32 composition after extraction of liquid wt. % | Lower limit of gap ($y_{Q1}$) wt. % |
|---|---|---|---|
| 90.0 | 89.1 | 88.5 | -0.9 |
| 80.0 | 79.8 | 78.5 | -0.2 |
| 70.0 | 70.4 | 68.5 | 0.4 |
| 60.0 | 61.0 | 58.5 | 1.0 |
| 50.0 | 51.5 | 48.5 | 1.5 |
| 47.5 | 49.0 | 46.0 | 1.5 |
| 26.5 | 28.0 | 25.0 | 1.5 |
| 20.0 | 21.1 | 18.5 | 1.1 |
| 10.0 | 10.0 | 8.5 | 0.0 |

The results show that HFC-32 undergoes the least composition change when the target composition is 90 wt. %, and that even when the initial composition of HFC-32 in the HFC-32/HFO-1234yf refrigerant mixture in the liquid phase is -0.9 wt. % of the target composition, the gap from the target composition falls within a range of ±1.5 wt. % of the target composition from before the transfer to the completion of the transfer.

Based on these results, the lower limit ($y_{Q1}$) of the gap between the target composition and the initial composition is represented by the following equation using the target composition (x):

$$1000y_{Q1}=0.0172x^3-3.7549x^2+207.43x-1705.9 \qquad (23)$$

Therefore, when the initial composition of HFC-32 in the HFC-32/HFO-1234yf refrigerant mixture in the liquid phase is adjusted within a range of $y_{Q1}$ to 1.5 wt. % of the target composition, the gap from the target composition falls within a range of ±1.5 wt. % of the target composition from before the transfer to the completion of the transfer.

(7-2) Example 19

Initial Filling Amount in the Feeding Container: 90 wt %

A 10-L hermetically sealed container was filled with HFO-1234yf and HFC-32 in an amount equal to 90% of the maximum filling amount that could be filled with the composition immediately before transfer so that the liquid phase had a fixed composition at 40° C., and the container was maintained at 40° C. In this case, the initial composition of HFC-32 in the liquid phase before the transfer was adjusted to +1.5 wt. % of the target composition. Subsequently, as in Example 10, the liquid phase was gradually transferred from the container to another empty container by using a pump, and the component composition was analyzed. Table 40 shows the results of composition changes during the transfer when the initial composition was adjusted to +1.5 wt. % of the target composition.

TABLE 40

| HFC-32 target composition (x) wt. % | HFC-32 composition before transfer wt. % | HFC-32 composition after extraction of liquid wt. % | Gap from HFC-32 target composition wt. % |
|---|---|---|---|
| 90.0 | 91.5 | 91.1 | 1.1 |
| 80.0 | 81.5 | 80.5 | 0.5 |
| 70.0 | 71.5 | 69.8 | -0.2 |
| 60.0 | 61.5 | 59.2 | -0.8 |
| 50.0 | 51.5 | 48.7 | -1.3 |
| 44.0 | 45.5 | 42.5 | -1.5 |
| 30.0 | 31.5 | 28.5 | -1.5 |
| 20.0 | 21.5 | 19.0 | -1.0 |
| 10.0 | 11.5 | 9.9 | -0.1 |

As shown in Table 40, by adjusting the initial composition to +1.5 wt. % of the target composition, the gap between the target composition and the initial composition before the transfer falls within a range of ±1.5 wt. % of the target composition when the HFC-32 composition, among the compositions from the start of filling (before the transfer) until the entire liquid is extracted (until the transfer is completed), is within a range of 10 to 30 wt. % or 44 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be -1.5 wt. % of the target composition (x) was determined. Table 41 shows the lower limit ($y_{Q2}$) of the gap between the target composition and the initial composition in this case.

TABLE 41

| HFC-32 target composition (x) wt. % | HFC-32 composition before transfer wt. % | HFC-32 composition after extraction of liquid wt. % | Lower limit of gap ($y_{Q2}$) wt. % |
|---|---|---|---|
| 90.0 | 89.1 | 88.5 | -0.9 |
| 80.0 | 79.7 | 78.5 | -0.3 |
| 70.0 | 70.3 | 68.5 | 0.3 |
| 60.0 | 60.9 | 58.5 | 0.9 |
| 50.0 | 51.4 | 48.5 | 1.4 |
| 44.0 | 45.5 | 42.5 | 1.5 |
| 30.0 | 31.5 | 28.5 | 1.5 |
| 20.0 | 21.0 | 18.5 | 1.0 |
| 10.0 | 9.9 | 8.5 | -0.1 |

The results show that HFC-32 undergoes the least composition change when the target composition is 90 wt. %, and that even when the initial composition of HFC-32 in the HFC-32/HFO-1234yf refrigerant mixture in the liquid phase is -0.9 wt. % of the target composition, the gap from the target composition falls within a range of ±1.5 wt. % of the target composition from before the transfer to the completion of the transfer.

Based on these results, the lower limit ($y_{Q2}$) of the gap between the target composition and the initial composition is represented by the following equation using the target composition (x):

$$1000 y_{Q2} = 0.0168 x^3 - 3.6698 x^2 + 203.75 x - 1785.4 \quad (24)$$

Therefore, when the initial composition of HFC-32 in the HFC-32/HFO-1234yf refrigerant mixture in the liquid phase is adjusted within a range of $y_{Q2}$ to 1.5 wt. % of the target composition, the gap from the target composition falls within a range of ±1.5 wt. % of the target composition from before the transfer to the completion of the transfer.

(7-3) Example 20

Initial Filling Amount in the Feeding Container: 80 wt %

A 10-L hermetically sealed container was filled with HFO-1234yf and HFC-32 in an amount equal to 80% of the maximum filling amount that could be filled with the composition immediately before transfer so that the liquid phase had a fixed composition at 40° C., and the container was maintained at 40° C. In this case, the initial composition of HFC-32 in the liquid phase before the transfer was adjusted to +1.5 wt. % of the target composition. Subsequently, as in Example 10, the liquid phase was gradually transferred from the container to another empty container by using a pump, and the component composition was analyzed. Table 42 shows the results of composition changes during the transfer when the initial composition was adjusted to +1.5 wt. % of the target composition.

TABLE 42

| HFC-32 target composition (x) wt. % | HFC-32 composition before transfer wt. % | HFC-32 composition after extraction of liquid wt. % | Gap from HFC-32 target composition wt. % |
|---|---|---|---|
| 90.0 | 91.5 | 91.1 | 1.1 |
| 80.0 | 81.5 | 80.5 | 0.5 |
| 70.0 | 71.5 | 69.9 | -0.1 |
| 60.0 | 61.5 | 59.3 | -0.7 |
| 50.0 | 51.5 | 48.8 | -1.2 |
| 40.0 | 41.5 | 38.6 | -1.4 |
| 30.0 | 31.5 | 28.6 | -1.4 |

TABLE 42-continued

| HFC-32 target composition (x) wt. % | HFC-32 composition before transfer wt. % | HFC-32 composition after extraction of liquid wt. % | Gap from HFC-32 target composition wt. % |
|---|---|---|---|
| 20.0 | 21.5 | 19.1 | −0.9 |
| 10.0 | 11.5 | 10.0 | 0.0 |

As shown in Table 42, by adjusting the initial composition to +1.5 wt. % of the target composition, the gap between the target composition and the initial composition before the transfer falls within a range of ±1.5 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −1.5 wt. % of the target composition (x) was determined. Table 43 shows the lower limit ($y_{Q3}$) of the gap between the target composition and the initial composition in this case.

TABLE 43

| HFC-32 target composition (x) wt. % | HFC-32 composition before transfer wt. % | HFC-32 composition after extraction of liquid wt. % | Lower limit of gap ($y_{Q3}$) wt. % |
|---|---|---|---|
| 90.0 | 89.1 | 88.5 | −0.9 |
| 80.0 | 79.7 | 78.5 | −0.3 |
| 70.0 | 70.2 | 68.5 | 0.2 |
| 60.0 | 60.8 | 58.5 | 0.8 |
| 50.0 | 51.2 | 48.5 | 1.2 |
| 40.0 | 41.5 | 38.5 | 1.5 |
| 30.0 | 31.4 | 28.5 | 1.4 |
| 20.0 | 20.9 | 18.5 | 0.9 |
| 10.0 | 9.9 | 8.5 | −0.1 |

The results show that HFC-32 undergoes the least composition change when the target composition is 90 wt. %, and that even when the initial composition of HFC-32 in the HFC-32/HFO-1234yf refrigerant mixture in the liquid phase is −0.9 wt. % of the target composition, the gap from the target composition falls within a range of ±1.5 wt. % of the target composition from before the transfer to the completion of the transfer.

Based on these results, the lower limit ($y_{Q3}$) of the gap between the target composition and the initial composition is represented by the following equation using the target composition (x):

$$1000 y_{Q3} = 0.0163 x^3 - 3.5445 x^2 + 197.22 x - 1815.9 \quad (25)$$

Therefore, when the initial composition of HFC-32 in the HFC-32/HFO-1234yf refrigerant mixture in the liquid phase is adjusted within a range of $y_{Q3}$ to 1.5 wt. % of the target composition, the gap from the target composition falls within a range of ±1.5 wt. % of the target composition from before the transfer to the completion of the transfer.

(7-4) Example 21

Initial Filling Amount in the Feeding Container: 70 wt %

A 10-L hermetically sealed container was filled with HFO-1234yf and HFC-32 in an amount equal to 70% of the maximum filling amount that could be filled with the composition immediately before transfer so that the liquid phase had a fixed composition at 40° C., and the container was maintained at 40° C. In this case, the initial composition of HFC-32 in the liquid phase before the transfer was adjusted to +1.5 wt. % of the target composition. Subsequently, as in Example 10, the liquid phase was gradually transferred from the container to another empty container by using a pump, and the component composition was analyzed. Table 44 shows the results of composition changes during the transfer when the initial composition was adjusted to +1.5 wt. % of the target composition.

TABLE 44

| HFC-32 target composition (x) wt. % | HFC-32 composition before transfer wt. % | HFC-32 composition after extraction of liquid wt. % | Gap from HFC-32 target composition wt. % |
|---|---|---|---|
| 90.0 | 91.5 | 91.1 | 1.1 |
| 80.0 | 81.5 | 80.5 | 0.5 |
| 70.0 | 71.5 | 70.0 | 0.0 |
| 60.0 | 61.5 | 59.4 | −0.6 |
| 50.0 | 51.5 | 49.0 | −1.0 |
| 40.0 | 41.5 | 38.7 | −1.3 |
| 30.0 | 31.5 | 28.8 | −1.2 |
| 20.0 | 21.5 | 19.2 | −0.8 |
| 10.0 | 11.5 | 10.1 | 0.1 |

As shown in Table 44, by adjusting the initial composition to +1.5 wt. % of the target composition, the gap between the target composition and the initial composition before the transfer falls within a range of ±1.5 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −1.5 wt. % of the target composition (x) was determined. Table 45 shows the lower limit ($y_C$) of the gap between the target composition and the initial composition in this case.

TABLE 45

| HFC-32 target composition (x) wt. % | HFC-32 composition before transfer wt. % | HFC-32 composition after extraction of liquid wt. % | Lower limit of gap ($y_{Q4}$) wt. % |
|---|---|---|---|
| 90.0 | 89.1 | 88.5 | −0.9 |
| 80.0 | 79.6 | 78.5 | −0.4 |
| 70.0 | 70.2 | 68.5 | 0.2 |
| 60.0 | 60.7 | 58.5 | 0.7 |
| 50.0 | 51.1 | 48.5 | 1.1 |

TABLE 45-continued

| HFC-32 target composition (x) wt. % | HFC-32 composition before transfer wt. % | HFC-32 composition after extraction of liquid wt. % | Lower limit of gap ($y_{Q4}$) wt. % |
|---|---|---|---|
| 40.0 | 41.3 | 38.5 | 1.3 |
| 30.0 | 31.2 | 28.5 | 1.2 |
| 20.0 | 20.7 | 18.5 | 0.7 |
| 10.0 | 9.8 | 8.5 | −0.2 |

The results show that HFC-32 undergoes the least composition change when the target composition is 90 wt. %, and that even when the initial composition of HFC-32 in the HFC-32/HFO-1234yf refrigerant mixture in the liquid phase is −0.9 wt. % of the target composition, the gap from the target composition falls within a range of ±1.5 wt. % of the target composition from before the transfer to the completion of the transfer.

Based on these results, the lower limit ($y_{Q4}$) of the gap between the target composition and the initial composition is represented by the following equation using the target composition (x):

$$1000y_{Q4} = 0.0147x^3 - 3.2607x^2 + 183.21x - 1777.0 \quad (26)$$

Therefore, when the initial composition of HFC-32 in the HFC-32/HFO-1234yf refrigerant mixture in the liquid phase is adjusted within a range of $y_{Q4}$ to 1.5 wt. % of the target composition, the gap from the target composition falls within a range of ±1.5 wt. % of the target composition from before the transfer to the completion of the transfer.

(7-5) Example 22

Initial Filling Amount in the Feeding Container: 60 wt %

A 10-L hermetically sealed container was filled with HFO-1234yf and HFC-32 in an amount equal to 60% of the maximum filling amount that could be filled with the composition immediately before transfer so that the liquid phase had a fixed composition at 40° C., and the container was maintained at 40° C. In this case, the initial composition of HFC-32 in the liquid phase before the transfer was adjusted to +1.5 wt. % of the target composition. Subsequently, as in Example 10, the liquid phase was gradually transferred from the container to another empty container by using a pump, and the component composition was analyzed. Table 46 shows the results of composition changes during the transfer when the initial composition was adjusted to +1.5 wt. % of the target composition.

TABLE 46

| HFC-32 target composition (x) wt. % | HFC-32 composition before transfer wt. % | HFC-32 composition after extraction of liquid wt. % | Gap from HFC-32 target composition wt. % |
|---|---|---|---|
| 90.0 | 91.5 | 91.1 | 1.1 |
| 80.0 | 81.5 | 80.6 | 0.6 |
| 70.0 | 71.5 | 70.0 | 0.0 |
| 60.0 | 61.5 | 59.5 | −0.5 |
| 50.0 | 51.5 | 49.1 | −0.9 |
| 40.0 | 41.5 | 38.9 | −1.1 |
| 30.0 | 31.5 | 29.0 | −1.0 |

TABLE 46-continued

| HFC-32 target composition (x) wt. % | HFC-32 composition before transfer wt. % | HFC-32 composition after extraction of liquid wt. % | Gap from HFC-32 target composition wt. % |
|---|---|---|---|
| 20.0 | 21.5 | 19.4 | −0.6 |
| 10.0 | 11.5 | 10.2 | 0.2 |

As shown in Table 46, by adjusting the initial composition to +1.5 wt. % of the target composition, the gap between the target composition and the initial composition before the transfer falls within a range of ±1.5 wt. % of the target composition when the HFC-32 composition, among the compositions from the start of filling (before the transfer) until the entire liquid is extracted (until the transfer is completed), is within a range of 10 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −1.5 wt. % of the target composition (x) was determined. Table 47 shows the lower limit ($y_{Q5}$) of the gap between the target composition and the initial composition in this case.

TABLE 47

| HFC-32 target composition (x) wt. % | HFC-32 composition before transfer wt. % | HFC-32 composition after extraction of liquid wt. % | Lower limit of gap ($y_{Q5}$) wt. % |
|---|---|---|---|
| 90.0 | 89.1 | 88.5 | −0.9 |
| 80.0 | 79.6 | 78.5 | −0.4 |
| 70.0 | 70.1 | 68.5 | 0.1 |
| 60.0 | 60.6 | 58.5 | 0.6 |
| 50.0 | 50.9 | 48.5 | 0.9 |
| 40.0 | 41.2 | 38.5 | 1.2 |
| 30.0 | 31.1 | 28.5 | 1.1 |
| 20.0 | 20.6 | 18.5 | 0.6 |
| 10.0 | 9.7 | 8.5 | −0.3 |

The results show that HFC-32 undergoes the least composition change when the target composition is 90 wt. %, and that even when the initial composition of HFC-32 in the HFC-32/HFO-1234yf refrigerant mixture in the liquid phase is −0.9 wt. % of the target composition, the gap from the target composition falls within a range of ±1.5 wt. % of the target composition from before the transfer to the completion of the transfer.

Based on these results, the lower limit ($y_{Q5}$) of the gap between the target composition and the initial composition is represented by the following equation using the target composition (x):

$$1000y_{Q5} = 0.0141x^3 - 3.1058x^2 + 175.06x - 1828.7 \quad (27)$$

Therefore, when the initial composition of HFC-32 in the HFC-32/HFO-1234yf refrigerant mixture in the liquid phase is adjusted within a range of $y_{Q5}$ to 1.5 wt. % of the target composition, the gap from the target composition falls within a range of ±1.5 wt. % of the target composition from before the transfer to the completion of the transfer.

(8) Filling Method (Tolerance: ±1.0)

(8-1) Example 23

Initial Filling Amount in the Feeding Container: 100 wt %

A 10-L hermetically sealed container was filled with HFO-1234yf and HFC-32 in the maximum amount (100% of the maximum filling amount) that could be filled with the composition immediately before transfer so that the liquid phase had a fixed composition at 40° C., and the container was maintained at 40° C. In this case, the initial composition of HFC-32 in the liquid phase before the transfer was adjusted to +1 wt. % of the target composition. Subsequently, as in Reference Example 2, the liquid phase was gradually transferred from the container to another empty container by using a pump, and the component composition was analyzed. Table 48 shows the results of composition changes during the transfer when the initial composition was adjusted to +1.0 wt. % of the target composition.

TABLE 48

| HFC-32 target composition (x) wt. % | HFC-32 composition before transfer wt. % | HFC-32 composition after extraction of liquid wt. % | Gap from HFC-32 target composition wt. % |
| --- | --- | --- | --- |
| 90.0 | 91.0 | 90.5 | 0.5 |
| 80.0 | 81.0 | 79.9 | −0.1 |
| 70.0 | 71.0 | 69.2 | −0.8 |
| 67.0 | 68.0 | 66.0 | −1.0 |
| 13.5 | 14.5 | 12.5 | −1.0 |
| 10.0 | 11.0 | 9.4 | −0.6 |

As shown in Table 48, by adjusting the initial composition to +1.0 wt. % of the target composition, the gap between the target composition and the initial composition before the transfer falls within a range of ±1.0 wt. % of the target composition when the HFC-32 composition, among the compositions from the start of filling (before the transfer) until the entire liquid is extracted (until the transfer is completed), is within a range of 10 to 13.5 wt. % or 67 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −1 wt. % of the target composition (x) was determined. Table 49 shows the lower limit ($y_{R1}$) of the gap between the target composition and the initial composition in this case.

TABLE 49

| HFC-32 target composition (x) wt. % | HFC-32 composition before transfer wt. % | HFC-32 composition after extraction of liquid wt. % | Lower limit of gap ($y_{R1}$) wt. % |
| --- | --- | --- | --- |
| 90.0 | 89.6 | 89.0 | −0.4 |
| 80.0 | 80.2 | 79.0 | 0.2 |
| 70.0 | 70.8 | 69.0 | 0.8 |
| 67.0 | 68.0 | 66.0 | 1.0 |
| 13.5 | 14.5 | 12.5 | 1.0 |
| 10.0 | 10.6 | 9.0 | 0.6 |

The results show that HFC-32 undergoes the least composition change when the target composition is 90 wt. %, and that even when the initial composition of HFC-32 in the HFC-32/HFO-1234yf refrigerant mixture in the liquid phase is −0.4 wt. % of the target composition, the gap from the target composition falls within a range of ±1.0 wt. % of the target composition from before the transfer to the completion of the transfer.

Based on these results, the lower limit ($y_{R1}$) of the gap between the target composition and the initial composition is represented by the following equation using the target composition (x):

$$1000y_{R1} = 0.0178x^3 - 3.8363x^2 + 209.59x - 1194.3 \quad (29)$$

Therefore, when the initial composition of HFC-32 in the HFC-32/HFO-1234yf refrigerant mixture in the liquid phase is adjusted within a range of $y_{R1}$ to 1 wt. % of the target composition, the gap from the target composition falls within a range of ±1.0 wt. % of the target composition from before the transfer to the completion of the transfer.

(8-2) Example 24

Initial Filling Amount in the Feeding Container: 90 wt %

A 10-L hermetically sealed container was filled with HFO-1234yf and HFC-32 in an amount equal to 900 of the maximum filling amount that could be filled with the composition immediately before transfer so that the liquid phase had a fixed composition at 40° C., and the container was maintained at 40° C. In this case, the initial composition of HFC-32 in the liquid phase before the transfer was adjusted to +1.0 wt. % of the target composition. Subsequently, as in Example 15, the liquid phase was gradually transferred from the container to another empty container by using a pump, and the component composition was analyzed. Table 50 shows the results of composition changes during the transfer when the initial composition was adjusted to +1.0 wt. % of the target composition.

TABLE 50

| HFC-32 target composition (x) wt. % | HFC-32 composition before transfer wt. % | HFC-32 composition after extraction of liquid wt. % | Gap from HFC-32 target composition wt. % |
| --- | --- | --- | --- |
| 90.0 | 91.0 | 90.5 | 0.5 |
| 80.0 | 81.0 | 79.9 | −0.1 |
| 70.0 | 71.0 | 69.3 | −0.7 |
| 66.0 | 67.0 | 65.0 | −1.0 |
| 14.0 | 15.0 | 13.0 | −1.0 |
| 10.0 | 11.0 | 9.5 | −0.5 |

As shown in Table 50, by adjusting the initial composition to +1.0 wt. % of the target composition, the gap between the target composition and the initial composition before the transfer falls within a range of ±1.0 wt. % of the target composition when the HFC-32 composition, among the compositions from the start of filling (before the transfer) until the entire liquid is extracted (until the transfer is completed), is within a range of 10 to 14 wt. % or 66 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −1 wt. % of the target composition (x) was determined. Table 51 shows the lower limit ($y_{R2}$) of the gap between the target composition and the initial composition in this case.

TABLE 51

| HFC-32 target composition (x) wt. % | HFC-32 composition before transfer wt. % | HFC-32 composition after extraction of liquid wt. % | Lower limit of gap ($y_{R2}$) wt. % |
| --- | --- | --- | --- |
| 90.0 | 89.6 | 89.0 | −0.4 |
| 80.0 | 80.2 | 79.0 | 0.2 |
| 70.0 | 70.8 | 69.0 | 0.8 |
| 66.0 | 67.0 | 65.0 | 1.0 |
| 15.0 | 16.1 | 14.0 | 1.1 |
| 10.0 | 10.5 | 9.0 | 0.5 |

The results show that HFC-32 undergoes the least composition change when the target composition is 90 wt. %, and that even when the initial composition of HFC-32 in the HFC 32/HFO-1234yf refrigerant mixture in the liquid phase is −0.4 wt. % of the target composition, the gap from the target composition falls within a range of ±1.0 wt. % of the target composition from before the transfer to the completion of the transfer.

Based on these results, the lower limit ($y_{R2}$) of the gap between the target composition and the initial composition is represented by the following equation using the target composition (x):

$$1000 y_{R2} = 0.0168 x^3 - 3.6386 x^2 + 200.2 x - 1192.8 \quad (30)$$

Therefore, when the initial composition of HFC-32 in the HFC-32/HFO-1234yf refrigerant mixture in the liquid phase is adjusted within a range of $y_{R2}$ to 1 wt. % of the target composition, the gap from the target composition falls within a range of ±1.0 wt. % of the target composition from before the transfer to the completion of the transfer.

(8-3) Example 25

Initial Filling Amount in the Feeding Container: 80 wt %

A 10-L hermetically sealed container was filled with HFO-1234yf and HFC-32 in an amount equal to 80 wt % of the maximum filling amount that could be filled with the composition immediately before transfer so that the liquid phase had a fixed composition at 40° C., and the container was maintained at 40° C. In this case, the initial composition of HFC-32 in the liquid phase before the transfer was adjusted to +1.0 wt. % of the target composition. Subsequently, as in Example 15, the liquid phase was gradually transferred from the container to another empty container by using a pump, and the component composition was analyzed. Table 52 shows the results of composition changes during the transfer when the initial composition was adjusted to +1.0 wt. % of the target composition.

TABLE 52

| HFC-32 target composition (x) wt. % | HFC-32 composition before transfer wt. % | HFC-32 composition after extraction of liquid wt. % | Gap from HFC-32 target composition wt. % |
| --- | --- | --- | --- |
| 90.0 | 91.0 | 90.5 | 0.5 |
| 80.0 | 81.0 | 80.0 | 0.0 |
| 70.0 | 71.0 | 69.3 | −0.7 |
| 65.0 | 66.0 | 64.0 | −1.0 |
| 15.5 | 16.5 | 14.5 | −1.0 |
| 10.0 | 11.0 | 9.6 | −0.4 |

As shown in Table 52, by adjusting the initial composition to +1.0 wt. % of the target composition, the gap between the target composition and the initial composition before the transfer falls within a range of ±1.0 wt. % of the target composition when the HFC-32 composition, among the compositions from the start of filling (before the transfer) until the entire liquid is extracted (until the transfer is completed), is within a range of 10 to 15.5 wt. % or 65 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −1 wt. % of the target composition (x) was determined. Table 53 shows the lower limit ($y_{R3}$) of the gap between the target composition and the initial composition in this case.

TABLE 53

| HFC-32 target composition (x) wt. % | HFC-32 composition before transfer wt. % | HFC-32 composition after extraction of liquid wt. % | Lower limit of gap ($y_{R3}$) wt. % |
| --- | --- | --- | --- |
| 90.0 | 89.6 | 89.0 | −0.4 |
| 80.0 | 80.1 | 79.0 | 0.1 |
| 70.0 | 70.7 | 69.0 | 0.7 |
| 65.0 | 66.0 | 64.0 | 1.0 |
| 15.0 | 16.0 | 14.0 | 1.0 |
| 10.0 | 10.4 | 9.0 | 0.4 |

The results show that HFC-32 undergoes the least composition change when the target composition is 90 wt. %, and that even when the initial composition of HFC-32 in the HFC-32/HFO-1234yf refrigerant mixture in the liquid phase is −0.4 wt. % of the target composition, the gap from the target composition falls within a range of ±1.0 wt. % of the target composition from before the transfer to the completion of the transfer.

Based on these results, the lower limit ($y_{R3}$) of the gap between the target composition and the initial composition is represented by the following equation using the target composition (x):

$$1000 y_{R3} = 0.0159 x^3 - 3.4616 x^2 + 191.19 x - 1196.0 \quad (31)$$

Therefore, when the initial composition of HFC-32 in the HFC-32/HFO-1234yf refrigerant mixture in the liquid phase is adjusted within a range of $y_{R3}$ to 1 wt. % of the target composition, the gap from the target composition falls within a range of ±1.0 wt. % of the target composition from before the transfer to the completion of the transfer.

(8-4) Example 26

Initial Filling Amount in the Feeding Container: 70 wt %

A 10-L hermetically sealed container was filled with HFO-1234yf and HFC-32 in an amount equal to 70 wt % of the maximum filling amount that could be filled with the composition immediately before transfer so that the liquid phase had a fixed composition at 40° C., and the container was maintained at 40° C. In this case, the initial composition of HFC-32 in the liquid phase before the transfer was adjusted to +1.0 wt. % of the target composition. Subsequently, as in Example 15, the liquid phase was gradually transferred from the container to another empty container by using a pump, and the component composition was analyzed. Table 54 shows the results of composition changes during the transfer when the initial composition was adjusted to +1.0 wt. % of the target composition.

TABLE 54

| HFC-32 target composition (x) wt. % | HFC-32 composition before transfer wt. % | HFC-32 composition after extraction of liquid wt. % | Gap from HFC-32 target composition wt. % |
|---|---|---|---|
| 90.0 | 91.0 | 90.6 | 0.6 |
| 80.0 | 81.0 | 80.0 | 0.0 |
| 70.0 | 71.0 | 69.4 | −0.6 |
| 62.5 | 63.5 | 61.5 | −1.0 |
| 16.5 | 17.5 | 15.5 | −1.0 |
| 10.0 | 11.0 | 9.6 | −0.4 |

As shown in Table 54, by adjusting the initial composition to +1.0 wt. % of the target composition, the gap between the target composition and the initial composition before the transfer tails within a range of ±1.0 wt. % of the target composition when the HFC-32 composition, among the compositions from the start of filling (before the transfer) until the entire liquid is extracted (until the transfer is completed), is within a range of 10 to 16.5 wt. % or 62.5 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −1 wt. % of the target composition (x) was determined. Table 55 shows the lower limit ($y_{R4}$) of the gap between the target composition and the initial composition in this case.

TABLE 55

| HFC-32 target composition (x) wt. % | HFC-32 composition before transfer wt. % | HFC-32 composition after extraction of liquid wt. % | Lower limit of gap ($y_{R4}$) wt. % |
|---|---|---|---|
| 90.0 | 89.6 | 89.0 | −0.4 |
| 80.0 | 80.1 | 79.0 | 0.1 |
| 70.0 | 70.6 | 69.0 | 0.6 |
| 62.5 | 63.5 | 61.5 | 1.0 |
| 16.5 | 17.5 | 15.5 | 1.0 |
| 10.0 | 10.3 | 9.0 | 0.3 |

The results show that HFC-32 undergoes the least composition change when the target composition is 90 wt. %, and that even when the initial composition of HFC-32 in the HFC-32/HFO-1234yf refrigerant mixture in the liquid phase is −0.4 wt. % of the target composition, the gap from the target composition falls within a range of ±1.0 wt. % of the target composition from before the transfer to the completion of the transfer.

Based on these results, the lower limit ($y_{R4}$) of the gap between the target composition and the initial composition is represented by the following equation using the target composition (x):

$$1000 y_{R4} = 0.015 x^3 - 3.2938 x^2 + 182.87 x - 1230.1 \tag{32}$$

Therefore, when the initial composition of HFC-32 in the HFC-32/HFO-1234yf refrigerant mixture in the liquid phase is adjusted within a range of $y_{R4}$ to 1 wt. % of the target composition, the gap from the target composition falls within a range of ±1.0 wt. % of the target composition from before the transfer to the completion of the transfer.

(8-5) Example 27

Initial Filling Amount in the Feeding Container: 60 wt %

A 10-L hermetically sealed container was filled with HFO-1234yf and HFC-32 in an amount equal to 60 wt % of the maximum filling amount that could be filled with the composition immediately before transfer so that the liquid phase had a fixed composition at 40° C., and the container was maintained at 40° C. In this case, the initial composition of HFC-32 in the liquid phase before the transfer was adjusted to +1.0 wt. % of the target composition. Subsequently, as in Example 15, the liquid phase was gradually transferred from the container to another empty container by using a pump, and the component composition was analyzed. Table 56 shows the results of composition changes during the transfer when the initial composition was adjusted to +1.0 wt. % of the target composition.

TABLE 56

| HFC-32 target composition (x) wt. % | HFC-32 composition before transfer wt. % | HFC-32 composition after extraction of liquid wt. % | Gap from HFC-32 target composition wt. % |
|---|---|---|---|
| 90.0 | 91.0 | 90.6 | 0.6 |
| 80.0 | 81.0 | 80.1 | 0.1 |
| 70.0 | 71.0 | 69.5 | −0.5 |
| 60.0 | 61.0 | 59.0 | −1.0 |
| 18.5 | 19.5 | 17.5 | −1.0 |
| 10.0 | 11.0 | 9.7 | −0.3 |

As shown in Table 56, by adjusting the initial composition to +1.0 wt. % of the target composition, the gap between the target composition and the initial composition before the transfer falls within a range of ±1.0 wt. % of the target composition when the HFC-32 composition, among the compositions from the start of filling (before the transfer) until the entire liquid is extracted (until the transfer is completed), is within a range of 10 to 18.5 wt. % or 60 to 90 wt. % in the HFC-32/HFO-1234yf refrigerant mixture in the liquid phase.

Moreover, the HFC-32 composition in the HFC-32/HFO-1234yf refrigerant mixture in the liquid phase before the transfer that enabled the HFC-32 composition at the time of the completion of the transfer to be −1 wt. % of the target composition (x) was determined. Table 57 shows the lower limit ($y_{R5}$) of the gap between the target composition and the initial composition in this case.

TABLE 57

| HFC-32 target composition (x) wt. % | HFC-32 composition before transfer wt. % | HFC-32 composition after extraction of liquid wt. % | Lower limit of gap ($y_{R5}$) wt. % |
|---|---|---|---|
| 90.0 | 89.5 | 89.0 | −0.5 |
| 80.0 | 80.0 | 79.0 | 0.0 |
| 70.0 | 70.6 | 69.0 | 0.6 |
| 60.0 | 61.0 | 59.0 | 1.0 |
| 18.5 | 19.5 | 17.5 | 1.0 |
| 10.0 | 10.2 | 9.0 | 0.2 |

The results show that HFC-32 undergoes the least composition change when the target composition is 90 wt. %, and that even when the initial composition of HFC-32 in the HFC-32/HFO-1234yf refrigerant mixture in the liquid phase is −0.5 wt. % of the target composition, the gap from the target composition falls within a range of ±1.0 wt. % of the target composition from before the transfer to the completion of the transfer.

Based on these results, the lower limit ($y_{R5}$) of the gap between the target composition and the initial composition is represented by the following equation using the target composition (x):

$$1000 y_{R5} = 0.0141 x^3 - 3.0949 x^2 + 172.07 x - 1228.4 \quad (33)$$

Therefore, when the initial composition of HFC-32 in the HFC-32/HFO-1234yf refrigerant mixture in the liquid phase is adjusted within a range of $y_{R5}$ to 1 wt. % of the target composition, the gap from the target composition falls within a range of ±1.0 wt. % of the target composition from before the transfer to the completion of the transfer.

(5) Discussion

As is clear from the results of the above Examples, the present invention provides a novel method for filling a non-azeotropic refrigerant mixture that enables composition changes associated with the transfer of the refrigerant mixture to fall within a fixed range of the target composition from before the transfer to the completion of the transfer, as compared to when the refrigerant mixture is transferred without taking any measures, and that also enables the use of the entire amount of the liquid phase.

Performing the method of the present invention leads to a significant result in which composition changes that occur during the transfer of a non-azeotropic HFO-1234yf/HFC-32 refrigerant mixture, which is used as a working medium for a vapor compression refrigeration cycle, fall within a range that does not impair refrigerant capacity.

The invention claimed is:

1. A method for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to x+$y_1$ wt % (minimum value) to x+a wt % (maximum value), so that the proportion of the difluoromethane in the liquid phase of the refrigerant mixture in the feeding container falls within a range of ±a wt % of a target composition (x) of the difluoromethane during initiation and completion of the transfer, wherein ±a is a set tolerance (a≥0); x is a target composition with the proviso that 10≤x≤90, excluding a range satisfying an inequality: $y_1$>a; and $y_1$ is a lower limit of a gap between the target composition and the initial composition, and is represented by Equation (1) below:

$$1000 y_1 = L_1 x^3 - M_1 x^2 + N_1 x - P_1 \quad (1),$$

wherein $L_1$=0.0002a+0.016, $M_1$=0.072a+3.4761, $N_1$=7.914a+187.52, and $P_1$=1194.8a−9.58.

2. The method for filling a refrigerant mixture according to claim 1, wherein the value a satisfies 0.5≤a≤3.0.

3. A method for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container that is filled with the refrigerant mixture in an amount equal to or less than 70 wt % of a maximum filling amount of the refrigerant mixture, adjusting, immediately before the transfer, the proportion (initial composition) of the difluoromethane in the liquid phase of the refrigerant mixture in the feeding container to x+$y_2$ wt % (minimum value) to x+a wt % (maximum value), so that the proportion of the difluoromethane in the liquid phase of the refrigerant mixture in the feeding container falls within a range of ±a wt % of a target composition (x) of the difluoromethane during initiation and completion of the transfer, wherein ±a is a set tolerance (a≥0); x is a target composition with the proviso that 10≤x≤90, excluding a range satisfying $y_2$>a; and $y_2$ is a lower limit of a gap between the target composition and the initial composition, and is represented by Equation (6) below:

$$1000 y_2 = L_2 x^3 - M_2 x^2 + N_2 x - P_2 \quad (6),$$

wherein $L_2$=−0.0016a+0.0169, $M_2$=−0.1765a+3.4316, $N_2$=−1.87a+180.08, and $P_2$=1119.5a+148.9.

4. The method for filling a refrigerant mixture according to claim 3, wherein the value a satisfies 0.5≤a≤3.0.

5. A method for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to x+$y_3$ wt % (minimum value) to x+a wt % (maximum value), so that the proportion of the difluoromethane in the liquid phase of the refrigerant mixture in the feeding container falls within a range of ±a wt % of a target composition (x) of the difluoromethane during initiation and completion of the transfer, wherein ±a is a set tolerance (a≥0); x is a target composition with the proviso that 10≤x≤90, excluding a range satisfying an inequality: $y_3$>a; and $y_3$ is a lower limit of a gap between the target composition and the initial composition, and is represented by Equation (11) below:

$$1000y_3 = L_3 x^3 - M_3 x^2 + N_3 x - P_3 \quad (11),$$

wherein $L_3$=0.0003a+0.0172, $M_3$=0.0962a+3.6851, $N_3$=9.704a+196.9, and $P_3$=1241.2a−93.54.

6. The method for filling a refrigerant mixture according to claim 5, wherein the value a satisfies 0.5≤a≤3.0.

7. A method for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to x+$y_4$ wt % (minimum value) to x+2.0 wt % (maximum value), so that the proportion of the difluoromethane in the liquid phase of the refrigerant mixture in the feeding container falls within a range of ±2.0 wt % of a target composition (x) of the difluoromethane during initiation and completion of the transfer, wherein b is an amount (wt %) initially filled into the feeding container; x is a target composition with the proviso that 10≤x≤90, excluding a range satisfying an inequality: $y_4$>2; and $y_4$ is a lower limit of a gap between the target composition and the initial composition, and is represented by Equation (16) below:

$$1000y_4 = L_4 x^3 - M_4 x^2 + N_4 x - P_4 \quad (16),$$

wherein $L_4$=0.0001b+0.0081, $M_4$=0.0195b+1.958, $N_4$=0.9878b+118.91, and $P_4$=−0.176b+2408.7.

8. A method for filling a refrigerant mixture comprising difluoromethane and 2,3,3,3-tetrafluoropropene, the difluoromethane being present in a liquid phase in an amount of 10 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to x+$y_5$ wt % (minimum value) to x+1.5 wt % (maximum value), so that the proportion of the difluoromethane in the liquid phase of the refrigerant mixture in the feeding container falls within a range of ±1.5 wt % of a target composition (x) of the difluoromethane during initiation and completion of the transfer, wherein b is an amount (wt %) initially filled into the feeding container; x is a target composition with the proviso that 10≤x≤90, excluding a range satisfying an inequality: $y_5$>1.5; and $y_6$ is a lower limit of a gap between the target composition and the initial composition, and is represented by Equation (22) below:

$$1000y_6 = L_5 x^3 - M_5 x^2 + N_5 x - P_5 \quad (22),$$

wherein $L_5$=0.00005b 0.0092, $M_5$=0.0171b+2.1013, $N_5$=0.8528b+125.11, and $P_5$=−2.372b+1972.3.

9. A method for filling a refrigerant mixture comprising difluoromethane and 2,3,3,3-tetrafluoropropene, the difluoromethane being present in a liquid phase in an amount of 10 to 18.5 wt % or 60 to 90 wt % based on 100 wt % of the total of the difluoromethane and 2,3,3,3-tetrafluoropropene, the method comprising, in transferring the refrigerant mixture in a liquid state to a target container or equipment from a feeding container, adjusting, immediately before the transfer, the proportion (initial composition) of the difluoromethane in the liquid phase of the refrigerant mixture in the feeding container to x+$y_6$ wt % (minimum value) to x+1.0 wt % (maximum value), so that the proportion of the difluoromethane in the liquid phase of the refrigerant mixture in the feeding container falls within a range of ±1.0 wt % of a target composition (x) of the difluoromethane during initiation and completion of the transfer, wherein b is an amount (wt %) initially filled into the feeding container; x is a target composition with the proviso that 10≤x≤18.5 wt % or 60≤x≤90 wt %, excluding a range satisfying an inequality: $y_6$>1; and $y_6$ is a lower limit of a gap between the target composition and the initial composition, and is represented by Equation (28) below:

$$1000y_6 = L_6 x^3 - M_6 x^2 + N_6 x - P_6 \quad (28),$$

wherein $L_6$=0.00009b+0.0086, $M_6$=0.0183b 2.003, $N_6$=0.9237b+117.29, and $P_6$=−1.055b+1292.7.

* * * * *